United States Patent
Vescovi et al.

(10) Patent No.: US 10,956,666 B2
(45) Date of Patent: Mar. 23, 2021

(54) UNCONVENTIONAL VIRTUAL ASSISTANT INTERACTIONS

(71) Applicant: Apple Inc., Cupertino, CA (US)

(72) Inventors: Marcos Regis Vescovi, Cupertino, CA (US); Tomás A. Vega Galvez, Cupertino, CA (US); Pierre Karashchuk, Cupertino, CA (US); Thomas R. Gruber, Emerald Hills, CA (US); Didier R. Guzzoni, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/164,630

(22) Filed: May 25, 2016

(65) Prior Publication Data
US 2017/0132199 A1 May 11, 2017

Related U.S. Application Data

(60) Provisional application No. 62/252,835, filed on Nov. 9, 2015.

(51) Int. Cl.
*G06F 40/186* (2020.01)
*G06F 16/33* (2019.01)
(Continued)

(52) U.S. Cl.
CPC ........ *G06F 40/186* (2020.01); *G06F 3/04842* (2013.01); *G06F 3/167* (2013.01);
(Continued)

(58) Field of Classification Search
CPC .... G06Q 10/10; G06Q 30/0269; G06F 17/28; G06F 17/30734; G06F 9/4446;
(Continued)

(56) References Cited

U.S. PATENT DOCUMENTS 7,493,251 B2  2/2009  Gao et al.
7,529,677 B1  5/2009  Wittenber
(Continued)

FOREIGN PATENT DOCUMENTS

AU  2015203483 A1  7/2015
AU  2015101171 A4  10/2015
(Continued)

OTHER PUBLICATIONS

International Preliminary Report on Patentability received for PCT Patent Application No. PCT/US2016/051151, dated Mar. 13, 2018, 17 pages.
(Continued)

*Primary Examiner* — Kyle R Stork
(74) *Attorney, Agent, or Firm* — Dentons US LLP

(57) ABSTRACT

An exemplary method of using a virtual assistant may include receiving an unstructured natural-language user request for a service from a virtual assistant; determining whether the user request corresponds to at least one of a plurality of plan templates accessible to the virtual assistant, based on the content of the user request and the content of the plan templates; in accordance with a determination that the user request corresponds to at least one of the plurality of plan templates, selecting one of the plurality of plan templates; and in accordance with a determination the user request fails to correspond to at least one of the plurality of plan templates, foregoing selection of a plan template; and in response to selection of one of the plan templates, beginning to respond to the user request according to the selected plan template.

37 Claims, 38 Drawing Sheets

(51) Int. Cl.
*G06Q 10/06* (2012.01)
*G06F 3/16* (2006.01)
*G06Q 10/10* (2012.01)
*G06F 3/0484* (2013.01)
*G10L 15/22* (2006.01)

(52) U.S. Cl.
CPC ... *G06F 16/3344* (2019.01); *G06Q 10/06311* (2013.01); *G06Q 10/101* (2013.01); *G10L 2015/223* (2013.01)

(58) Field of Classification Search
CPC ......... G06F 17/30976; G06F 17/30867; G06F 17/271; G06F 17/30401; G06F 3/04842; G06F 17/30684
See application file for complete search history.

(56) References Cited

U.S. PATENT DOCUMENTS

| | | |
|---|---|---|
| 7,568,151 B2 | 7/2009 | Bargeron et al. |
| 7,584,092 B2 | 9/2009 | Brockett et al. |
| 7,606,712 B1 | 10/2009 | Smith et al. |
| 7,607,083 B2 | 10/2009 | Gong et al. |
| 7,630,900 B1 | 12/2009 | Strom |
| 7,660,715 B1 | 2/2010 | Thambiratnam |
| 7,668,710 B2 | 2/2010 | Doyle |
| 7,673,251 B1 | 3/2010 | Wibisono |
| 7,689,412 B2 | 3/2010 | Wu et al. |
| 7,707,226 B1 | 4/2010 | Tonse |
| 7,756,707 B2 | 7/2010 | Garner et al. |
| 7,774,202 B2 | 8/2010 | Spengler et al. |
| 7,831,246 B1 | 11/2010 | Smith et al. |
| 7,869,998 B1 | 1/2011 | Di Fabbrizio et al. |
| 7,873,149 B2 | 1/2011 | Schultz et al. |
| 7,889,101 B2 | 2/2011 | Yokota |
| 7,895,039 B2 | 2/2011 | Braho et al. |
| 7,904,297 B2 | 3/2011 | Mirkovic et al. |
| 7,936,863 B2 | 5/2011 | John et al. |
| 7,937,075 B2 | 5/2011 | Zellner |
| 7,949,752 B2 | 5/2011 | Lange et al. |
| 7,974,835 B2 | 7/2011 | Balchandran et al. |
| 8,019,604 B2 | 9/2011 | Ma |
| 8,020,104 B2 | 9/2011 | Robarts et al. |
| 8,054,180 B1 | 11/2011 | Scofield et al. |
| 8,130,929 B2 | 3/2012 | Wilkes et al. |
| 8,140,330 B2 | 3/2012 | Cevik et al. |
| 8,145,489 B2 | 3/2012 | Freeman et al. |
| 8,160,877 B1 | 4/2012 | Nucci et al. |
| 8,175,872 B2 | 5/2012 | Kristjansson et al. |
| 8,175,876 B2 | 5/2012 | Bou-Ghazale et al. |
| 8,190,596 B2 | 5/2012 | Nambiar et al. |
| 8,200,489 B1 | 6/2012 | Baggenstoss |
| 8,213,911 B2 | 7/2012 | Williams et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,250,071 B1 | 8/2012 | Killalea et al. |
| 8,254,829 B1 | 8/2012 | Kindred et al. |
| 8,255,216 B2 | 8/2012 | White |
| 8,260,247 B2 | 9/2012 | Lazaridis et al. |
| 8,271,287 B1 | 9/2012 | Kermani |
| 8,280,438 B2 | 10/2012 | Barbera |
| 8,300,776 B2 | 10/2012 | Davies et al. |
| 8,311,189 B2 | 11/2012 | Champlin et al. |
| 8,326,627 B2 | 12/2012 | Kennewick et al. |
| 8,332,205 B2 | 12/2012 | Krishnan et al. |
| 8,335,689 B2 | 12/2012 | Wittenstein et al. |
| 8,346,563 B1 | 1/2013 | Hjelm et al. |
| 8,370,145 B2 | 2/2013 | Endo et al. |
| 8,401,163 B1 | 3/2013 | Kirchhoff et al. |
| 8,433,572 B2 | 4/2013 | Caskey et al. |
| 8,433,778 B1 | 4/2013 | Shreesha et al. |
| 8,442,821 B1 | 5/2013 | Vanhoucke |
| 8,457,959 B2 | 6/2013 | Kaiser |
| 8,473,289 B2 | 6/2013 | Jitkoff et al. |
| 8,521,531 B1 | 8/2013 | Kim |
| 8,537,033 B2 | 9/2013 | Gueziec |
| 8,543,375 B2 | 9/2013 | Hong |
| 8,543,397 B1 | 9/2013 | Nguyen |
| 8,543,398 B1 | 9/2013 | Strope et al. |
| 8,583,511 B2 | 11/2013 | Hendrickson |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,576 B1 | 12/2013 | Barr et al. |
| 8,638,363 B2 | 1/2014 | King et al. |
| 8,639,516 B2 | 1/2014 | Lindahl et al. |
| 8,645,138 B1 | 2/2014 | Weinstein et al. |
| 8,687,777 B1 | 4/2014 | Lavian et al. |
| 8,695,074 B2 | 4/2014 | Saraf et al. |
| 8,706,474 B2 | 4/2014 | Blume et al. |
| 8,719,039 B1 | 5/2014 | Sharifi |
| 8,775,154 B2 | 7/2014 | Clinchant et al. |
| 8,781,456 B2 | 7/2014 | Prociw |
| 8,798,255 B2 | 8/2014 | Lubowich et al. |
| 8,812,302 B2 | 8/2014 | Xiao et al. |
| 8,862,252 B2 | 10/2014 | Rottler et al. |
| 8,886,534 B2 | 11/2014 | Nakano et al. |
| 8,893,023 B2 | 11/2014 | Perry et al. |
| 8,898,568 B2 | 11/2014 | Bull et al. |
| 8,909,693 B2 | 12/2014 | Frissora et al. |
| 8,930,176 B2 | 1/2015 | Li et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,972,240 B2 | 3/2015 | Brockett et al. |
| 8,972,432 B2 | 3/2015 | Shaw et al. |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,639 B1 | 3/2015 | Faaborg et al. |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,037,967 B1 | 5/2015 | Al-Jefri et al. |
| 9,043,208 B2 | 5/2015 | Koch et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,071,701 B2 | 6/2015 | Donaldson et al. |
| 9,076,448 B2 | 7/2015 | Bennett et al. |
| 9,076,450 B1 | 7/2015 | Sadek et al. |
| 9,082,402 B2 | 7/2015 | Yadgar et al. |
| 9,101,279 B2 | 8/2015 | Ritchey et al. |
| 9,112,984 B2 | 8/2015 | Sejnoha et al. |
| 9,164,983 B2 | 10/2015 | Liu et al. |
| 9,171,541 B2 | 10/2015 | Kennewick et al. |
| 9,171,546 B1 | 10/2015 | Pike |
| 9,190,062 B2 | 11/2015 | Haughay |
| 9,208,153 B1 | 12/2015 | Zaveri et al. |
| 9,218,819 B1 | 12/2015 | Stekkelpak et al. |
| 9,262,612 B2 | 2/2016 | Cheyer |
| 9,280,535 B2 | 3/2016 | Varma et al. |
| 9,286,910 B1 | 3/2016 | Li et al. |
| 9,292,489 B1 | 3/2016 | Sak et al. |
| 9,300,718 B2 | 3/2016 | Khanna |
| 9,325,809 B1 | 4/2016 | Barros et al. |
| 9,330,659 B2 | 5/2016 | Ju et al. |
| 9,330,720 B2 | 5/2016 | Lee |
| 9,367,541 B1 | 6/2016 | Servan et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,412,392 B2 | 8/2016 | Lindahl |
| 9,424,840 B1 | 8/2016 | Hart et al. |
| 9,436,918 B2 | 9/2016 | Pantel et al. |

(56) References Cited

U.S. PATENT DOCUMENTS

| | | |
|---|---|---|
| 9,437,189 B2 | 9/2016 | Epstein et al. |
| 9,454,957 B1 | 9/2016 | Mathias et al. |
| 9,465,833 B2 | 10/2016 | Aravamudan et al. |
| 9,466,294 B1 * | 10/2016 | Tunstall-Pedoe ............... G06F 16/3329 |
| 9,471,566 B1 | 10/2016 | Zhang et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,720,907 B2 | 8/2017 | Bangalore et al. |
| 9,721,566 B2 | 8/2017 | Newendorp et al. |
| 9,734,839 B1 | 8/2017 | Adams |
| 9,741,343 B1 | 8/2017 | Miles et al. |
| 9,747,083 B1 | 8/2017 | Roman et al. |
| 9,755,605 B1 | 9/2017 | Li et al. |
| 9,842,584 B1 | 12/2017 | Hart et al. |
| 9,934,785 B1 | 4/2018 | Hulaud |
| 9,948,728 B2 | 4/2018 | Linn et al. |
| 9,966,068 B2 | 5/2018 | Cash et al. |
| 9,967,381 B1 | 5/2018 | Kashimba et al. |
| 9,990,176 B1 | 6/2018 | Gray |
| 10,037,758 B2 | 7/2018 | Jing et al. |
| 10,049,663 B2 | 8/2018 | Orr et al. |
| 10,074,360 B2 | 9/2018 | Kim |
| 10,096,319 B1 | 10/2018 | Jin et al. |
| 10,102,359 B2 | 10/2018 | Cheyer |
| 2004/0229569 A1 | 11/2004 | Franz |
| 2007/0043687 A1 * | 2/2007 | Bodart .................. G06Q 10/107 |
| 2009/0006096 A1 | 1/2009 | Li et al. |
| 2009/0030685 A1 | 1/2009 | Cerra et al. |
| 2009/0048841 A1 | 2/2009 | Pollet et al. |
| 2009/0055380 A1 | 2/2009 | Peng et al. |
| 2009/0076798 A1 | 3/2009 | Oh et al. |
| 2009/0077047 A1 | 3/2009 | Cooper et al. |
| 2009/0077464 A1 | 3/2009 | Goldsmith et al. |
| 2009/0091537 A1 | 4/2009 | Huang et al. |
| 2009/0098903 A1 | 4/2009 | Donaldson et al. |
| 2009/0112596 A1 | 4/2009 | Syrdal et al. |
| 2009/0125602 A1 | 5/2009 | Bhatia et al. |
| 2009/0125813 A1 | 5/2009 | Shen et al. |
| 2009/0125947 A1 | 5/2009 | Ibaraki |
| 2009/0138263 A1 | 5/2009 | Shozakai et al. |
| 2009/0138430 A1 | 5/2009 | Nambiar et al. |
| 2009/0144036 A1 | 6/2009 | Jorgensen et al. |
| 2009/0160761 A1 | 6/2009 | Moosavi et al. |
| 2009/0163243 A1 | 6/2009 | Barbera |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0190774 A1 | 7/2009 | Wang et al. |
| 2009/0192798 A1 | 7/2009 | Basson et al. |
| 2009/0204402 A1 | 8/2009 | Marhawa et al. |
| 2009/0215466 A1 | 8/2009 | Ahl et al. |
| 2009/0216528 A1 | 8/2009 | Gemello et al. |
| 2009/0219166 A1 | 9/2009 | MacFarlane et al. |
| 2009/0233264 A1 | 9/2009 | Rogers et al. |
| 2009/0234651 A1 | 9/2009 | Basir et al. |
| 2009/0248456 A1 | 10/2009 | Fahmy et al. |
| 2009/0259472 A1 | 10/2009 | Schroeter |
| 2009/0259475 A1 | 10/2009 | Yamagami et al. |
| 2009/0265171 A1 | 10/2009 | Davis |
| 2009/0274376 A1 | 11/2009 | Selvaraj et al. |
| 2009/0278804 A1 | 11/2009 | Rubanovich et al. |
| 2009/0284471 A1 | 11/2009 | Longe et al. |
| 2009/0305203 A1 | 12/2009 | Okumura et al. |
| 2009/0307594 A1 | 12/2009 | Kosonen et al. |
| 2009/0309352 A1 | 12/2009 | Walker et al. |
| 2009/0313020 A1 | 12/2009 | Koivunen |
| 2009/0319257 A1 | 12/2009 | Blume et al. |
| 2009/0319342 A1 | 12/2009 | Shilman et al. |
| 2010/0004930 A1 | 1/2010 | Strope et al. |
| 2010/0010948 A1 | 1/2010 | Ito et al. |
| 2010/0020035 A1 | 1/2010 | Ryu et al. |
| 2010/0023331 A1 | 1/2010 | Duta et al. |
| 2010/0036829 A1 | 2/2010 | Leyba |
| 2010/0036928 A1 | 2/2010 | Granito et al. |
| 2010/0057435 A1 | 3/2010 | Kent et al. |
| 2010/0057443 A1 | 3/2010 | Di Cristo et al. |
| 2010/0058200 A1 | 3/2010 | Jablokov et al. |
| 2010/0066546 A1 | 3/2010 | Aaron |
| 2010/0066684 A1 | 3/2010 | Shahraray et al. |
| 2010/0070517 A1 | 3/2010 | Ghosh et al. |
| 2010/0070521 A1 | 3/2010 | Clinchant et al. |
| 2010/0082567 A1 | 4/2010 | Rosenblatt et al. |
| 2010/0094632 A1 | 4/2010 | Davis et al. |
| 2010/0100385 A1 | 4/2010 | Davis et al. |
| 2010/0114887 A1 | 5/2010 | Conway et al. |
| 2010/0138798 A1 | 6/2010 | Wilson et al. |
| 2010/0145707 A1 | 6/2010 | Ljolje et al. |
| 2010/0153114 A1 | 6/2010 | Shih et al. |
| 2010/0161311 A1 | 6/2010 | Massuh |
| 2010/0161337 A1 | 6/2010 | Pulz et al. |
| 2010/0169093 A1 | 7/2010 | Washio |
| 2010/0211379 A1 | 8/2010 | Gorman et al. |
| 2010/0211644 A1 | 8/2010 | Lavoie et al. |
| 2010/0227642 A1 | 9/2010 | Kim et al. |
| 2010/0235780 A1 | 9/2010 | Westerman et al. |
| 2010/0263015 A1 | 10/2010 | Pandey et al. |
| 2010/0268537 A1 | 10/2010 | Al-Telmissani |
| 2010/0286984 A1 | 11/2010 | Wandinger et al. |
| 2010/0290632 A1 | 11/2010 | Lin |
| 2010/0318366 A1 | 12/2010 | Sullivan et al. |
| 2010/0330908 A1 | 12/2010 | Maddern et al. |
| 2011/0006876 A1 | 1/2011 | Moberg et al. |
| 2011/0015928 A1 | 1/2011 | Odell et al. |
| 2011/0016421 A1 | 1/2011 | Krupka et al. |
| 2011/0021211 A1 | 1/2011 | Ohki |
| 2011/0034183 A1 | 2/2011 | Haag et al. |
| 2011/0040707 A1 | 2/2011 | Theisen et al. |
| 2011/0047266 A1 | 2/2011 | Yu et al. |
| 2011/0047605 A1 | 2/2011 | Sontag et al. |
| 2011/0066436 A1 | 3/2011 | Bezar |
| 2011/0072033 A1 | 3/2011 | White et al. |
| 2011/0080260 A1 | 4/2011 | Wang et al. |
| 2011/0087685 A1 | 4/2011 | Lin et al. |
| 2011/0092187 A1 | 4/2011 | Miller |
| 2011/0093272 A1 | 4/2011 | Isobe et al. |
| 2011/0105097 A1 | 5/2011 | Tadayon et al. |
| 2011/0111724 A1 | 5/2011 | Baptiste |
| 2011/0112825 A1 | 5/2011 | Bellegarda |
| 2011/0112838 A1 | 5/2011 | Adibi |
| 2011/0119623 A1 | 5/2011 | Kim |
| 2011/0125701 A1 | 5/2011 | Nair et al. |
| 2011/0143726 A1 | 6/2011 | de Silva |
| 2011/0153329 A1 | 6/2011 | Moorer |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0196670 A1 | 8/2011 | Dang et al. |

(56) References Cited

U.S. PATENT DOCUMENTS

| | | |
|---|---|---|
| 2011/0199312 A1 | 8/2011 | Okuta |
| 2011/0216093 A1 | 9/2011 | Griffin |
| 2011/0238191 A1 | 9/2011 | Kristjansson et al. |
| 2011/0244888 A1 | 10/2011 | Ohki |
| 2011/0257966 A1 | 10/2011 | Rychlik |
| 2011/0260829 A1 | 10/2011 | Lee |
| 2011/0264999 A1 | 10/2011 | Bells et al. |
| 2011/0276595 A1 | 11/2011 | Kirkland et al. |
| 2011/0282663 A1 | 11/2011 | Talwar et al. |
| 2011/0283189 A1 | 11/2011 | McCarty |
| 2011/0288852 A1 | 11/2011 | Dymetman et al. |
| 2011/0288855 A1 | 11/2011 | Roy |
| 2011/0288863 A1 | 11/2011 | Rasmussen |
| 2011/0288866 A1 | 11/2011 | Rasmussen |
| 2011/0302645 A1 | 12/2011 | Headley |
| 2011/0307254 A1 | 12/2011 | Hunt et al. |
| 2011/0314003 A1 | 12/2011 | Ju et al. |
| 2012/0035935 A1 | 2/2012 | Park et al. |
| 2012/0053829 A1 | 3/2012 | Agarwal et al. |
| 2012/0059813 A1 | 3/2012 | Sejnoha et al. |
| 2012/0062473 A1 | 3/2012 | Xiao et al. |
| 2012/0066212 A1 | 3/2012 | Jennings |
| 2012/0075054 A1 | 3/2012 | Ge et al. |
| 2012/0077479 A1 | 3/2012 | Sabotta et al. |
| 2012/0078611 A1 | 3/2012 | Soltani et al. |
| 2012/0078635 A1 | 3/2012 | Rothkopf et al. |
| 2012/0078747 A1 | 3/2012 | Chakrabarti et al. |
| 2012/0101823 A1 | 4/2012 | Weng et al. |
| 2012/0108166 A1 | 5/2012 | Hymel |
| 2012/0110456 A1 | 5/2012 | Larco et al. |
| 2012/0130709 A1 | 5/2012 | Bocchieri et al. |
| 2012/0136649 A1 | 5/2012 | Freising et al. |
| 2012/0136855 A1 | 5/2012 | Ni et al. |
| 2012/0149342 A1 | 6/2012 | Cohen et al. |
| 2012/0150544 A1 | 6/2012 | McLoughlin et al. |
| 2012/0158399 A1 | 6/2012 | Tremblay et al. |
| 2012/0173222 A1 | 7/2012 | Wang et al. |
| 2012/0173244 A1 | 7/2012 | Kwak et al. |
| 2012/0179467 A1 | 7/2012 | Williams |
| 2012/0185480 A1 | 7/2012 | Ni et al. |
| 2012/0210266 A1 | 8/2012 | Jiang et al. |
| 2012/0233207 A1 | 9/2012 | Mohajer |
| 2012/0233266 A1 | 9/2012 | Hassan et al. |
| 2012/0245939 A1 | 9/2012 | Braho et al. |
| 2012/0253785 A1 | 10/2012 | Hamid et al. |
| 2012/0253791 A1 | 10/2012 | Heck et al. |
| 2012/0259615 A1 | 10/2012 | Morin et al. |
| 2012/0262296 A1 | 10/2012 | Bezar |
| 2012/0265806 A1 | 10/2012 | Blanchflower et al. |
| 2012/0284015 A1 | 11/2012 | Drewes |
| 2012/0290291 A1 | 11/2012 | Shelley et al. |
| 2012/0296638 A1 | 11/2012 | Patwa |
| 2012/0310922 A1 | 12/2012 | Johnson et al. |
| 2012/0316862 A1 | 12/2012 | Sultan et al. |
| 2012/0316875 A1 | 12/2012 | Nyquist et al. |
| 2012/0329529 A1 | 12/2012 | van der Raadt |
| 2013/0002716 A1 | 1/2013 | Walker et al. |
| 2013/0009858 A1 | 1/2013 | Lacey |
| 2013/0010575 A1 | 1/2013 | He et al. |
| 2013/0013319 A1 | 1/2013 | Grant et al. |
| 2013/0018659 A1 | 1/2013 | Chi |
| 2013/0024576 A1 | 1/2013 | Dishneau et al. |
| 2013/0030787 A1 | 1/2013 | Cancedda et al. |
| 2013/0030789 A1 | 1/2013 | Dalce |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0041665 A1 | 2/2013 | Jang et al. |
| 2013/0041667 A1 | 2/2013 | Longe et al. |
| 2013/0046544 A1 | 2/2013 | Kay et al. |
| 2013/0050089 A1 | 2/2013 | Neels et al. |
| 2013/0054675 A1 | 2/2013 | Jenkins et al. |
| 2013/0063611 A1 | 3/2013 | Papakipos et al. |
| 2013/0073346 A1 | 3/2013 | Chun et al. |
| 2013/0080251 A1 | 3/2013 | Dempski |
| 2013/0082967 A1 | 4/2013 | Hillis et al. |
| 2013/0096909 A1 | 4/2013 | Brun et al. |
| 2013/0096917 A1 | 4/2013 | Edgar et al. |
| 2013/0097682 A1 | 4/2013 | Zeljkovic et al. |
| 2013/0100268 A1 | 4/2013 | Mihailidis et al. |
| 2013/0103405 A1 | 4/2013 | Namba et al. |
| 2013/0110943 A1 | 5/2013 | Menon et al. |
| 2013/0111365 A1 | 5/2013 | Chen et al. |
| 2013/0111581 A1 | 5/2013 | Griffin et al. |
| 2013/0132084 A1 | 5/2013 | Stonehocker et al. |
| 2013/0141551 A1 | 6/2013 | Kim |
| 2013/0142345 A1 | 6/2013 | Waldmann |
| 2013/0157629 A1 | 6/2013 | Lee et al. |
| 2013/0159847 A1 | 6/2013 | Banke et al. |
| 2013/0166303 A1 | 6/2013 | Chang et al. |
| 2013/0173258 A1 | 7/2013 | Liu et al. |
| 2013/0174034 A1 | 7/2013 | Brown et al. |
| 2013/0176244 A1 | 7/2013 | Yamamoto et al. |
| 2013/0179172 A1 | 7/2013 | Nakamura et al. |
| 2013/0187850 A1 | 7/2013 | Schulz et al. |
| 2013/0187857 A1 | 7/2013 | Griffin et al. |
| 2013/0204813 A1* | 8/2013 | Master ............... G06N 5/04 706/12 |
| 2013/0204897 A1 | 8/2013 | McDougall |
| 2013/0219333 A1 | 8/2013 | Palwe et al. |
| 2013/0226935 A1 | 8/2013 | Bai et al. |
| 2013/0234947 A1 | 9/2013 | Kristensson et al. |
| 2013/0238326 A1 | 9/2013 | Kim et al. |
| 2013/0246050 A1 | 9/2013 | Yu et al. |
| 2013/0246329 A1 | 9/2013 | Pasquero et al. |
| 2013/0268263 A1 | 10/2013 | Park et al. |
| 2013/0275138 A1* | 10/2013 | Gruber ............... G10L 13/00 704/260 |
| 2013/0275199 A1 | 10/2013 | Proctor, Jr. et al. |
| 2013/0275625 A1 | 10/2013 | Taivalsaari et al. |
| 2013/0282709 A1 | 10/2013 | Zhu et al. |
| 2013/0285913 A1 | 10/2013 | Griffin et al. |
| 2013/0291015 A1 | 10/2013 | Pan |
| 2013/0297317 A1 | 11/2013 | Lee et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0305119 A1 | 11/2013 | Kern et al. |
| 2013/0311184 A1 | 11/2013 | Badavne et al. |
| 2013/0311997 A1 | 11/2013 | Gruber et al. |
| 2013/0316746 A1 | 11/2013 | Miller et al. |
| 2013/0325967 A1 | 12/2013 | Parks et al. |
| 2013/0325970 A1 | 12/2013 | Roberts et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332172 A1 | 12/2013 | Prakash et al. |
| 2013/0339256 A1 | 12/2013 | Shroff |
| 2013/0346347 A1 | 12/2013 | Patterson et al. |
| 2014/0006030 A1 | 1/2014 | Fleizach et al. |
| 2014/0012574 A1 | 1/2014 | Pasupalak et al. |
| 2014/0012586 A1 | 1/2014 | Rubin et al. |
| 2014/0019460 A1 | 1/2014 | Sambrani et al. |
| 2014/0032453 A1 | 1/2014 | Eustice et al. |
| 2014/0035823 A1 | 2/2014 | Khoe et al. |
| 2014/0039893 A1 | 2/2014 | Weiner |
| 2014/0047001 A1 | 2/2014 | Phillips et al. |
| 2014/0052680 A1 | 2/2014 | Nitz et al. |
| 2014/0053210 A1 | 2/2014 | Cheong et al. |
| 2014/0067361 A1 | 3/2014 | Nikoulina et al. |
| 2014/0067402 A1 | 3/2014 | Kim |
| 2014/0074454 A1 | 3/2014 | Brown et al. |
| 2014/0074466 A1 | 3/2014 | Sharifi et al. |
| 2014/0074483 A1 | 3/2014 | Van Os |
| 2014/0079195 A1 | 3/2014 | Srivastava et al. |
| 2014/0081619 A1 | 3/2014 | Solntseva et al. |
| 2014/0088961 A1 | 3/2014 | Woodward et al. |
| 2014/0095172 A1 | 4/2014 | Cabaco et al. |
| 2014/0095173 A1 | 4/2014 | Lynch et al. |
| 2014/0096209 A1 | 4/2014 | Saraf et al. |
| 2014/0122059 A1 | 5/2014 | Patel et al. |

(56) References Cited

U.S. PATENT DOCUMENTS

| | | |
|---|---|---|
| 2014/0122136 A1 | 5/2014 | Jayanthi |
| 2014/0122153 A1 | 5/2014 | Truitt |
| 2014/0134983 A1 | 5/2014 | Jung et al. |
| 2014/0136987 A1 | 5/2014 | Rodriguez |
| 2014/0142922 A1 | 5/2014 | Liang et al. |
| 2014/0142935 A1 | 5/2014 | Lindahl et al. |
| 2014/0153709 A1 | 6/2014 | Byrd et al. |
| 2014/0156262 A1 | 6/2014 | Yuen et al. |
| 2014/0156279 A1 | 6/2014 | Okamoto et al. |
| 2014/0163953 A1 | 6/2014 | Parikh |
| 2014/0163954 A1 | 6/2014 | Joshi et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164476 A1 | 6/2014 | Thomson |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0180499 A1 | 6/2014 | Cooper et al. |
| 2014/0180697 A1 | 6/2014 | Torok et al. |
| 2014/0181865 A1 | 6/2014 | Koganei |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0198048 A1 | 7/2014 | Unruh et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207466 A1 | 7/2014 | Smadi et al. |
| 2014/0207468 A1 | 7/2014 | Bartnik |
| 2014/0214429 A1 | 7/2014 | Pantel |
| 2014/0222678 A1 | 8/2014 | Sheets et al. |
| 2014/0230055 A1 | 8/2014 | Boehl |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244712 A1 | 8/2014 | Walters et al. |
| 2014/0245140 A1 | 8/2014 | Brown et al. |
| 2014/0249821 A1 | 9/2014 | Kennewick et al. |
| 2014/0257809 A1 | 9/2014 | Goel et al. |
| 2014/0257815 A1 | 9/2014 | Zhao et al. |
| 2014/0258857 A1 | 9/2014 | Dykstra-Erickson et al. |
| 2014/0272821 A1 | 9/2014 | Pitschel et al. |
| 2014/0274005 A1 | 9/2014 | Luna et al. |
| 2014/0278343 A1 | 9/2014 | Tran |
| 2014/0278379 A1 | 9/2014 | Coccaro et al. |
| 2014/0278390 A1 | 9/2014 | Kingsbury et al. |
| 2014/0278394 A1 | 9/2014 | Bastyr et al. |
| 2014/0278436 A1 | 9/2014 | Khanna et al. |
| 2014/0280450 A1 | 9/2014 | Luna |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282203 A1 | 9/2014 | Pasquero et al. |
| 2014/0289508 A1 | 9/2014 | Wang |
| 2014/0297267 A1 | 10/2014 | Spencer et al. |
| 2014/0297288 A1 | 10/2014 | Yu et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0317030 A1* | 10/2014 | Shen ............. G06Q 30/01 706/12 |
| 2014/0324884 A1 | 10/2014 | Lindahl et al. |
| 2014/0330569 A1 | 11/2014 | Kolavennu et al. |
| 2014/0337371 A1 | 11/2014 | Li |
| 2014/0337438 A1 | 11/2014 | Govande et al. |
| 2014/0342762 A1 | 11/2014 | Hajdu et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0358523 A1 | 12/2014 | Sheth et al. |
| 2014/0361973 A1 | 12/2014 | Raux et al. |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365407 A1 | 12/2014 | Brown et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0380285 A1 | 12/2014 | Gabel et al. |
| 2015/0006157 A1 | 1/2015 | Andrade Silva et al. |
| 2015/0006176 A1 | 1/2015 | Pogue et al. |
| 2015/0006184 A1 | 1/2015 | Marti et al. |
| 2015/0019219 A1 | 1/2015 | Tzirkel-Hancock et al. |
| 2015/0027178 A1 | 1/2015 | Scalisi |
| 2015/0031416 A1 | 1/2015 | Wells et al. |
| 2015/0033275 A1 | 1/2015 | Natani et al. |
| 2015/0039299 A1 | 2/2015 | Weinstein et al. |
| 2015/0040012 A1 | 2/2015 | Faaborg et al. |
| 2015/0045003 A1* | 2/2015 | Vora ............. H04M 1/64 455/412.2 |
| 2015/0058018 A1 | 2/2015 | Georges et al. |
| 2015/0058785 A1 | 2/2015 | Ookawara |
| 2015/0066494 A1 | 3/2015 | Salvador et al. |
| 2015/0066496 A1 | 3/2015 | Deoras et al. |
| 2015/0067822 A1 | 3/2015 | Randall |
| 2015/0071121 A1 | 3/2015 | Patil et al. |
| 2015/0073788 A1 | 3/2015 | Allauzen et al. |
| 2015/0074615 A1 | 3/2015 | Han et al. |
| 2015/0082229 A1 | 3/2015 | Ouyang et al. |
| 2015/0088514 A1 | 3/2015 | Typrin |
| 2015/0088522 A1 | 3/2015 | Hendrickson et al. |
| 2015/0095278 A1 | 4/2015 | Flinn et al. |
| 2015/0100537 A1 | 4/2015 | Grieves et al. |
| 2015/0100983 A1 | 4/2015 | Pan |
| 2015/0121216 A1 | 4/2015 | Brown et al. |
| 2015/0127348 A1 | 5/2015 | Follis |
| 2015/0134334 A1 | 5/2015 | Sachidanandam et al. |
| 2015/0135123 A1 | 5/2015 | Carr et al. |
| 2015/0142438 A1 | 5/2015 | Dai et al. |
| 2015/0142851 A1 | 5/2015 | Gupta et al. |
| 2015/0149177 A1 | 5/2015 | Kalns et al. |
| 2015/0149182 A1 | 5/2015 | Kalns et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161521 A1 | 6/2015 | Shah et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quast et al. |
| 2015/0169336 A1* | 6/2015 | Harper ............. G10L 15/22 715/706 |
| 2015/0179176 A1 | 6/2015 | Ryu et al. |
| 2015/0185964 A1 | 7/2015 | Stout |
| 2015/0186154 A1 | 7/2015 | Brown et al. |
| 2015/0186156 A1 | 7/2015 | Brown et al. |
| 2015/0186351 A1 | 7/2015 | Hicks et al. |
| 2015/0187369 A1 | 7/2015 | Dadu et al. |
| 2015/0189362 A1 | 7/2015 | Lee et al. |
| 2015/0199077 A1 | 7/2015 | Zuger et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0208226 A1* | 7/2015 | Kuusilinna ......... H04W 8/005 455/414.3 |
| 2015/0212791 A1 | 7/2015 | Kumar et al. |
| 2015/0213796 A1 | 7/2015 | Waltermann et al. |
| 2015/0220507 A1 | 8/2015 | Mohajer et al. |
| 2015/0221304 A1 | 8/2015 | Stewart |
| 2015/0221307 A1 | 8/2015 | Shah et al. |
| 2015/0227505 A1 | 8/2015 | Morimoto |
| 2015/0230095 A1 | 8/2015 | Smith et al. |

(56) References Cited

U.S. PATENT DOCUMENTS

| | | |
|---|---|---|
| 2015/0242091 A1 | 8/2015 | Lu et al. |
| 2015/0243283 A1 | 8/2015 | Halash et al. |
| 2015/0248886 A1 | 9/2015 | Sarikaya et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0261850 A1 | 9/2015 | Mittal |
| 2015/0269139 A1 | 9/2015 | McAteer et al. |
| 2015/0277574 A1 | 10/2015 | Jain et al. |
| 2015/0279358 A1 | 10/2015 | Kingsbury et al. |
| 2015/0281380 A1 | 10/2015 | Wang et al. |
| 2015/0286627 A1 | 10/2015 | Chang et al. |
| 2015/0287401 A1 | 10/2015 | Lee et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0295915 A1 | 10/2015 | Xiu |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0317069 A1 | 11/2015 | Clements et al. |
| 2015/0317310 A1 | 11/2015 | Eiche et al. |
| 2015/0319411 A1 | 11/2015 | Kasmir et al. |
| 2015/0331664 A1 | 11/2015 | Osawa et al. |
| 2015/0332667 A1 | 11/2015 | Mason |
| 2015/0340033 A1 | 11/2015 | Di Fabbrizio et al. |
| 2015/0341717 A1 | 11/2015 | Song et al. |
| 2015/0347086 A1 | 12/2015 | Liedholm et al. |
| 2015/0347381 A1 | 12/2015 | Bellegarda |
| 2015/0347385 A1 | 12/2015 | Flor et al. |
| 2015/0347733 A1 | 12/2015 | Tsou et al. |
| 2015/0347985 A1 | 12/2015 | Gross et al. |
| 2015/0348549 A1* | 12/2015 | Giuli ............... G06F 17/2785 704/235 |
| 2015/0348554 A1 | 12/2015 | Orr et al. |
| 2015/0352999 A1 | 12/2015 | Bando et al. |
| 2015/0355879 A1 | 12/2015 | Beckhardt et al. |
| 2015/0363587 A1 | 12/2015 | Ahn et al. |
| 2015/0364140 A1 | 12/2015 | Thorn |
| 2015/0371639 A1 | 12/2015 | Foerster et al. |
| 2015/0371665 A1 | 12/2015 | Naik et al. |
| 2015/0373183 A1 | 12/2015 | Woolsey et al. |
| 2015/0382047 A1 | 12/2015 | Napolitano et al. |
| 2015/0382079 A1 | 12/2015 | Lister et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018900 A1 | 1/2016 | Tu et al. |
| 2016/0019886 A1 | 1/2016 | Hong |
| 2016/0026258 A1 | 1/2016 | Ou et al. |
| 2016/0029316 A1 | 1/2016 | Mohan et al. |
| 2016/0034042 A1 | 2/2016 | Joo |
| 2016/0048666 A1 | 2/2016 | Dey et al. |
| 2016/0062605 A1 | 3/2016 | Agarwal et al. |
| 2016/0070581 A1* | 3/2016 | Soon-Shiong ......... G06Q 50/10 715/706 |
| 2016/0071516 A1 | 3/2016 | Lee et al. |
| 2016/0071521 A1 | 3/2016 | Haughay |
| 2016/0072940 A1 | 3/2016 | Cronin |
| 2016/0078860 A1 | 3/2016 | Paulik et al. |
| 2016/0092766 A1 | 3/2016 | Sainath et al. |
| 2016/0093301 A1 | 3/2016 | Bellegarda et al. |
| 2016/0094700 A1 | 3/2016 | Lee et al. |
| 2016/0098991 A1 | 4/2016 | Luo et al. |
| 2016/0104486 A1 | 4/2016 | Penilla et al. |
| 2016/0111091 A1 | 4/2016 | Bakish |
| 2016/0117386 A1 | 4/2016 | Ajmera et al. |
| 2016/0118048 A1 | 4/2016 | Heide |
| 2016/0125048 A1 | 5/2016 | Hamada |
| 2016/0125071 A1 | 5/2016 | Gabbai |
| 2016/0132484 A1* | 5/2016 | Nauze ............... G06F 17/2735 704/9 |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0148610 A1 | 5/2016 | Kennewick, Jr. et al. |
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173960 A1 | 6/2016 | Snibbe et al. |
| 2016/0179462 A1 | 6/2016 | Bjorkengren |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0198319 A1 | 7/2016 | Huang et al. |
| 2016/0210981 A1 | 7/2016 | Lee |
| 2016/0217784 A1 | 7/2016 | Gelfenbeyn et al. |
| 2016/0224540 A1 | 8/2016 | Stewart et al. |
| 2016/0224774 A1 | 8/2016 | Pender |
| 2016/0247061 A1 | 8/2016 | Trask et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0266871 A1 | 9/2016 | Schmid et al. |
| 2016/0267904 A1 | 9/2016 | Biadsy et al. |
| 2016/0275947 A1 | 9/2016 | Li et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0286045 A1 | 9/2016 | Shaltiel et al. |
| 2016/0293168 A1 | 10/2016 | Chen |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0313906 A1 | 10/2016 | Kilchenko et al. |
| 2016/0314788 A1 | 10/2016 | Jitkoff et al. |
| 2016/0314792 A1 | 10/2016 | Alvarez et al. |
| 2016/0321261 A1 | 11/2016 | Spasojevic et al. |
| 2016/0322045 A1 | 11/2016 | Hatfield et al. |
| 2016/0322050 A1 | 11/2016 | Wang et al. |
| 2016/0328205 A1 | 11/2016 | Agrawal et al. |
| 2016/0328893 A1 | 11/2016 | Cordova et al. |
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1* | 11/2016 | Basu ............... G06F 17/30734 |
| 2016/0342781 A1 | 11/2016 | Jeon |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0378747 A1 | 12/2016 | Orr et al. |
| 2016/0379091 A1 | 12/2016 | Lin et al. |

(56) References Cited

U.S. PATENT DOCUMENTS

| | | |
|---|---|---|
| 2016/0379626 A1 | 12/2016 | Deisher et al. |
| 2016/0379633 A1 | 12/2016 | Lehman et al. |
| 2016/0379641 A1 | 12/2016 | Liu et al. |
| 2017/0004824 A1 | 1/2017 | Yoo et al. |
| 2017/0011303 A1 | 1/2017 | Annapureddy et al. |
| 2017/0011742 A1 | 1/2017 | Jing et al. |
| 2017/0018271 A1 | 1/2017 | Khan et al. |
| 2017/0019987 A1 | 1/2017 | Dragone et al. |
| 2017/0025124 A1 | 1/2017 | Mixter et al. |
| 2017/0031576 A1 | 2/2017 | Saoji et al. |
| 2017/0032783 A1 | 2/2017 | Lord et al. |
| 2017/0032791 A1 | 2/2017 | Elson et al. |
| 2017/0040002 A1 | 2/2017 | Basson et al. |
| 2017/0055895 A1 | 3/2017 | Des Jardins et al. |
| 2017/0060853 A1 | 3/2017 | Lee et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0076720 A1 | 3/2017 | Gopalan et al. |
| 2017/0076721 A1 | 3/2017 | Bargetzi et al. |
| 2017/0083179 A1 | 3/2017 | Gruber et al. |
| 2017/0083285 A1 | 3/2017 | Meyers et al. |
| 2017/0090569 A1 | 3/2017 | Levesque |
| 2017/0091168 A1 | 3/2017 | Bellegarda et al. |
| 2017/0092270 A1 | 3/2017 | Newendorp et al. |
| 2017/0092278 A1 | 3/2017 | Evermann et al. |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116177 A1 | 4/2017 | Walia |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0140644 A1 | 5/2017 | Hwang et al. |
| 2017/0154033 A1 | 6/2017 | Lee |
| 2017/0154055 A1 | 6/2017 | Dimson et al. |
| 2017/0161018 A1 | 6/2017 | Lemay et al. |
| 2017/0161268 A1 | 6/2017 | Badaskar |
| 2017/0169818 A1 | 6/2017 | VanBlon et al. |
| 2017/0169819 A1 | 6/2017 | Mese et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0199874 A1 | 7/2017 | Patel et al. |
| 2017/0200066 A1 | 7/2017 | Wang et al. |
| 2017/0221486 A1 | 8/2017 | Kurata et al. |
| 2017/0227935 A1 | 8/2017 | Su et al. |
| 2017/0228382 A1 | 8/2017 | Haviv et al. |
| 2017/0230709 A1 | 8/2017 | Van Os et al. |
| 2017/0242653 A1 | 8/2017 | Lang et al. |
| 2017/0243468 A1 | 8/2017 | Dotan-Cohen et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0295446 A1 | 10/2017 | Thagadur Shivappa |
| 2017/0316775 A1 | 11/2017 | Le et al. |
| 2017/0316782 A1 | 11/2017 | Haughay et al. |
| 2017/0323637 A1 | 11/2017 | Naik |
| 2017/0345411 A1 | 11/2017 | Raitio et al. |
| 2017/0346949 A1 | 11/2017 | Sanghavi et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0371885 A1 | 12/2017 | Aggarwal et al. |
| 2018/0007060 A1 | 1/2018 | Leblang et al. |
| 2018/0007538 A1 | 1/2018 | Naik et al. |
| 2018/0012596 A1 | 1/2018 | Piernot et al. |
| 2018/0033431 A1 | 2/2018 | Newendorp et al. |
| 2018/0054505 A1 | 2/2018 | Hart et al. |
| 2018/0060312 A1 | 3/2018 | Won |
| 2018/0063624 A1 | 3/2018 | Boesen |
| 2018/0067914 A1 | 3/2018 | Chen et al. |
| 2018/0090143 A1 | 3/2018 | Saddler et al. |
| 2018/0107945 A1 | 4/2018 | Gao et al. |
| 2018/0108346 A1 | 4/2018 | Paulik et al. |
| 2018/0130470 A1 | 5/2018 | Lemay et al. |
| 2018/0137856 A1 | 5/2018 | Gilbert |
| 2018/0137857 A1 | 5/2018 | Zhou et al. |
| 2018/0144748 A1 | 5/2018 | Leong |
| 2018/0190273 A1 | 7/2018 | Karimli et al. |
| 2018/0196683 A1 | 7/2018 | Radebaugh et al. |
| 2018/0213448 A1 | 7/2018 | Segal et al. |
| 2018/0218735 A1 | 8/2018 | Hunt et al. |
| 2018/0308485 A1 | 10/2018 | Kudurshian et al. |
| 2018/0308486 A1 | 10/2018 | Saddler et al. |
| 2018/0322112 A1 | 11/2018 | Bellegarda et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0330714 A1 | 11/2018 | Paulik et al. |
| 2018/0330723 A1 | 11/2018 | Acero et al. |
| 2018/0330730 A1 | 11/2018 | Garg et al. |
| 2018/0330731 A1 | 11/2018 | Zeitlin et al. |
| 2018/0330737 A1 | 11/2018 | Paulik et al. |
| 2018/0332118 A1 | 11/2018 | Phipps et al. |
| 2018/0336275 A1 | 11/2018 | Graham et al. |
| 2018/0336894 A1 | 11/2018 | Graham et al. |
| 2018/0336905 A1 | 11/2018 | Kim et al. |

FOREIGN PATENT DOCUMENTS

| | | |
|---|---|---|
| CN | 101416471 A | 4/2009 |
| CN | 101448340 A | 6/2009 |
| CN | 101453498 A | 6/2009 |
| CN | 101499156 A | 8/2009 |
| CN | 101500041 A | 8/2009 |
| CN | 101515952 A | 8/2009 |
| CN | 101547396 A | 9/2009 |
| CN | 101557432 A | 10/2009 |
| CN | 101601088 A | 12/2009 |
| CN | 101604521 A | 12/2009 |
| CN | 101751387 A | 6/2010 |
| CN | 101833286 A | 9/2010 |
| CN | 102137193 A | 7/2011 |
| CN | 102201235 A | 9/2011 |
| CN | 102282609 A | 12/2011 |
| CN | 102368256 A | 3/2012 |
| CN | 102405463 A | 4/2012 |
| CN | 102498457 A | 6/2012 |
| CN | 102629246 A | 8/2012 |
| CN | 102682769 A | 9/2012 |
| CN | 102682771 A | 9/2012 |
| CN | 102685295 A | 9/2012 |
| CN | 102693725 A | 9/2012 |
| CN | 102792320 A | 11/2012 |
| CN | 102801853 A | 11/2012 |
| CN | 102870065 A | 1/2013 |
| CN | 102917004 A | 2/2013 |
| CN | 102918493 A | 2/2013 |
| CN | 103038728 A | 4/2013 |
| CN | 103093334 A | 5/2013 |

(56) References Cited

FOREIGN PATENT DOCUMENTS

| | | |
|---|---|---|
| CN | 103135916 A | 6/2013 |
| CN | 103365279 A | 10/2013 |
| CN | 103744761 A | 4/2014 |
| CN | 103795850 A | 5/2014 |
| CN | 103930945 A | 7/2014 |
| CN | 104038621 A | 9/2014 |
| CN | 104090652 A | 10/2014 |
| CN | 104144377 A | 11/2014 |
| CN | 104284257 A | 1/2015 |
| CN | 104423625 A | 3/2015 |
| CN | 104463552 A | 3/2015 |
| CN | 104516522 A | 4/2015 |
| CN | 104854583 A | 8/2015 |
| CN | 104951077 A | 9/2015 |
| CN | 105247511 A | 1/2016 |
| CN | 105264524 A | 1/2016 |
| CN | 105471705 A | 4/2016 |
| CN | 107919123 A | 4/2018 |
| DE | 202016008226 U1 | 5/2017 |
| EP | 2081185 A1 | 7/2009 |
| EP | 2096840 A1 | 9/2009 |
| EP | 2329348 | 6/2011 |
| EP | 2339576 A2 | 6/2011 |
| EP | 2523188 A1 | 11/2012 |
| EP | 2632129 A1 | 8/2013 |
| EP | 2669889 A2 | 12/2013 |
| EP | 2683175 A1 | 1/2014 |
| EP | 2760015 A1 | 7/2014 |
| EP | 2849177 A1 | 3/2015 |
| EP | 2930715 A1 | 10/2015 |
| EP | 2950307 A1 | 12/2015 |
| EP | 3035329 A1 | 6/2016 |
| EP | 3224708 A1 | 10/2017 |
| EP | 3246916 A1 | 11/2017 |
| EP | 3300074 A1 | 3/2018 |
| EP | 2983065 B1 | 8/2018 |
| JP | 2009-2850 A | 1/2009 |
| JP | 2009-505142 A | 2/2009 |
| JP | 2009-69062 A | 4/2009 |
| JP | 2009-110300 A | 5/2009 |
| JP | 2009-134409 A | 6/2009 |
| JP | 2009-223840 A | 10/2009 |
| JP | 2009-543166 A | 12/2009 |
| JP | 2010-518475 A | 5/2010 |
| JP | 2010-146347 A | 7/2010 |
| JP | 2010-166478 A | 7/2010 |
| JP | 2010-205111 A | 9/2010 |
| JP | 2011-33874 A | 2/2011 |
| JP | 2011-250027 A | 12/2011 |
| JP | 2012-33997 A | 2/2012 |
| JP | 2012-508530 A | 4/2012 |
| JP | 2012-89020 A | 5/2012 |
| JP | 2012-116442 A | 6/2012 |
| JP | 2012-142744 A | 7/2012 |
| JP | 2012-518847 A | 8/2012 |
| JP | 2013-37688 A | 2/2013 |
| JP | 2013-65284 A | 4/2013 |
| JP | 2013-513315 A | 4/2013 |
| JP | 2013-80476 A | 5/2013 |
| JP | 2013-140520 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2014-10688 A | 1/2014 |
| JP | 2014-26629 A | 2/2014 |
| JP | 2014-60600 A | 4/2014 |
| JP | 2014-72586 A | 4/2014 |
| JP | 2014-109889 A | 6/2014 |
| JP | 2014-124332 A | 7/2014 |
| JP | 2014-145842 A | 8/2014 |
| JP | 2014-150323 A | 8/2014 |
| JP | 2014-222514 A | 11/2014 |
| JP | 2015-8001 A | 1/2015 |
| JP | 2015-501022 A | 1/2015 |
| JP | 2015-41845 A | 3/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-528140 A | 9/2015 |
| JP | 2015-528918 A | 10/2015 |
| JP | 2016-119615 A | 6/2016 |
| KR | 10-2010-0053149 A | 5/2010 |
| KR | 10-2011-0086492 A | 7/2011 |
| KR | 10-2011-0100620 A | 9/2011 |
| KR | 10-1178310 B1 | 8/2012 |
| KR | 10-2012-0137440 A | 12/2012 |
| KR | 10-2012-0139827 A | 12/2012 |
| KR | 10-2013-0035983 A | 4/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0031283 A | 3/2014 |
| KR | 10-2014-0033574 A | 3/2014 |
| KR | 10-2014-0147557 A | 12/2014 |
| KR | 10-2015-0043512 A | 4/2015 |
| KR | 10-2016-0010523 A | 1/2016 |
| TW | 201142823 A1 | 12/2011 |
| WO | 2009/034686 A1 | 3/2009 |
| WO | 2010/100937 A1 | 9/2010 |
| WO | 2011/088053 A3 | 1/2012 |
| WO | 2012/019637 A1 | 2/2012 |
| WO | 2013/009578 A2 | 1/2013 |
| WO | 2013/022223 A2 | 2/2013 |
| WO | 2013/049358 A1 | 4/2013 |
| WO | 2013/163113 A1 | 10/2013 |
| WO | 2013/173504 A1 | 11/2013 |
| WO | 2013/176847 A1 | 11/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/047047 A1 | 3/2014 |
| WO | 2014/070872 A2 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/169269 A1 | 10/2014 |
| WO | 2014/200728 A1 | 12/2014 |
| WO | 2015/018440 A1 | 2/2015 |
| WO | 2015/029379 A1 | 3/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/157013 A1 | 10/2015 |
| WO | 2015/183699 A1 | 12/2015 |
| WO | 2015/184186 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/175354 A1 | 11/2016 |
| WO | 2016/209444 A1 | 12/2016 |
| WO | 2017/044260 A1 | 3/2017 |

(56) References Cited

FOREIGN PATENT DOCUMENTS

| | | |
|---|---|---|
| WO | 2017/044629 A1 | 3/2017 |
| WO | 2017/053311 A1 | 3/2017 |

OTHER PUBLICATIONS

International Search Report and Written Opinion Received for PCT Patent Application No. PCT/US2016/051151, dated Nov. 22, 2016, 10 pages.

Extended European Search Report received for European Patent Application No. 16864716.2, dated Feb. 21, 2019, 12 pages.

Wikipedia, "Home Automation", Available at: <https://en.wikipedia.org/w/index.php?title=Home_automation&oldid=686569068>, Oct. 19, 2015, 9 Pages.

Wikipedia, "Siri", Available at: <https://en.wikipedia.org/w/index.php?title=Siri&oldid=689697795>, Nov. 8, 2015, 13 pages.

Wikipedia, "Virtual Assistant", Wikipedia, Online Available at: <https://en.wikipedia.org/w/index.php?title=Virtual_assistant&oldid=679330666>, Sep. 3, 2015, 4 pages.

Office Action received for European Patent Application No. 16864716.2, dated Nov. 26, 2019, 12 pages.

Bell, Jason, "Machine Learning Hands-On for Developers and Technical Professionals", Wiley, 2014, 82 pages.

Coulouris, et al., "Distributed Systems: Concepts and Design (Fifth Edition)", Addison-Wesley, 2011, 391 pages.

Gupta, Naresh, "Inside Bluetooth Low Energy", Artech House, 2013, 274 pages.

Hutsko, et al., "iPhone All-in-One for Dummies", 3rd Edition, 2013, 98 pages.

Jefford, et al., "Professional BizTalk Server 2006", Wrox, 2007, 398 pages.

Loukides, et al., "What Is the Internet of Things?", O'Reilly Media, Inc., Online Available at: https://www.oreilly.com/library/view/what-is-the/9781491975633/, 2015, 31 pages.

Rowland, et al., "Designing Connected Products: UX for the Consumer Internet of Things", O'Reilly, May 2015, 452 pages.

Seroter, et al., "SOA Patterns with BizTalk Server 2013 and Microsoft Azure", Packt Publishing, Jun. 2015, 454 pages.

Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only) (See Communication under 37 CFR § 1.98(a) (3)).

Ashbrook, Daniel L..., "Enabling Mobile Microinteractions", Retrieved from the Internet: URL: "http://danielashbrook.com/wp-content/uploads/2012/06/2009-Ashbrook-Thesis.pdf", May 2010, 186 pages.

Ashingtondctech & Gaming, "SwipeStatusBar—Reveal the Status Bar in a Fullscreen App", Online Available at: <https://www.youtube.com/watch?v=wA_T9lAreQ>, Jul. 1, 2013, 3 pages.

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016; pp. 1-31.

Cambria et al., "Jumping NLP Curves: A Review of Natural Language Processing Research", IEEE Computational Intelligence Magazine, 2014, vol. 9, May 2014, pp. 48-57.

"DIRECTV™ Voice", Now Part of the DIRECTTV Mobile App for Phones, Sep. 18, 2013, 5 pages.

EARTHLING1984, "Samsung Galaxy Smart Stay Feature Explained", Available online at:- "https://www.youtube.com/watch?v=RpjBNtSjupl", May 29, 2013, 1 page.

Filipowicz, Luke, "How to use the Quick Type Keyboard in iOS 8", available online at <https://www.imore.com/comment/568232>, Oct. 11, 2014, pp. 1-17.

Finkel et al., "Joint Parsing and Named Entity Recognition", Human Language Technologies: The 2009 Annual Conference of the North American Chapter of the ACL, Jun. 2009, pp. 326-334.

"Galaxy S7: How to Adjust Screen Timeout & Lock Screen Timeout", Available online at:- "https://www.youtube.com/watch?v=n6e1WKUS2ww", Jun. 9, 2016, 1 page.

Google Developers, "Voice Search in Your App", Available online at:- https://www.youtube.com/watch?v=PS1FbB5qWEI, Nov. 12, 2014, 1 page.

"Hey Google: How to Create a Shopping List with Your Google Assistant", Available online at:- https://www.youtube.com/watch?v=w9NCsElax1Y, May 25, 2018, 1 page.

"How to Enable Google Assistant on Galaxy 57 and other Android Phones (No Root)", Available online at:- "https://www.youtube.com/watch?v=HeklQbWyksE", Mar. 20, 2017, 1 page.

"How to Use Ok Google Assistant Even Phone is Locked", Available online at:- "https://www.youtube.com/watch?v=9B_gP4j_SP8", Mar. 12, 2018, 1 page.

INEWS and Tech, "How to Use the QuickType Keyboard in iOS 8", Available online at: - "http://www.inewsandtech.com/how-to-use-the-quicktype-keyboard-in-ios-81", Sep. 17, 2014, 6 pages.

IOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.

Jonsson et al, "Proximity-based Reminders Using Bluetooth", 2014 IEEE International Conference on Pervasive Computing and Communications Demonstrations, 2014, pp. 151-153.

Karn, Ujjwal, "An Intuitive Explanation of Convolutional Neural Networks", The Data Science Blog, Aug. 11, 2016, 23 pages.

Liou et al., "Autoencoder for Words", Neurocomputing, vol. 139, Sep. 2014, pp. 84-96.

Majerus, Wesley, "Cell Phone Accessibility for your Blind Child", Retrieved from the Internet URL:https://web.archive.org/web/20100210001100/https://nfb.org/images/nfb/publications/fr/fr28/3/fr280314.htm, 2010, pp. 1-5.

Marketing Land, "Amazon Echo: Play Music", Online Available at: <https://www.youtube.com/watch?v=A7V5NPbsXi4>, Apr. 27, 2015, 3 pages.

Mhatre et al., "Donna Interactive Chat-bot acting as a Personal Assistant", International Journal of Computer Applications (0975-8887), vol. 140, No. 10, Apr. 2016, 6 pages.

Mikolov et al., "Linguistic Regularities in Continuous Space Word Representations", Proceedings of NAACL-HLT, Jun. 9-14, 2013, pp. 746-751.

Morrison, Jonathan, "iPhone 5 Siri Demo", Online Available at <https://www.youtube.com/watch?v=_wHWwG5IhWc>, Sep. 21, 2012, 3 pages.

Nakamura, Satoshi, "Overcoming the Language Barrier with Speech Translation Technology, Science & Technology Trends", Quarterly Review No. 31, Apr. 2009, pp. 36-49.

Nakazawa et al., "Detection and Labeling of Significant Scenes from TV program based on Twitter Analysis", Proceedings of the 3rd Forum on Data Engineering and Information Management (Deim 2011 proceedings), IEICE Data Engineering Technical Group. Available online at: http://db-event.jpn.org/deim2011/proceedings/pdf/f5-6.pdf, Feb. 28, 2011, 10 pages (Official Copy Only) (See Communication under 37 CFR § 1.98(a) (3)).

Nozawa et al., "iPhone 4S Perfect Manual", vol. 1, First Edition, Nov. 11, 2011, 4 pages (Official Copy Only) (See Communication under 37 CFR § 1.98(a) (3)).

Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).

Patra et al., "A Kernel-Based Approach for Biomedical Named Entity Recognition", Scientific World Journal, vol. 2013, 2013, pp. 1-7.

Pennington et al., "GloVe: Global Vectors for Word Representation", Proceedings of the Conference on Empirical Methods Natural Language Processing (EMNLP), Oct. 25-29, 2014, pp. 1532-1543.

Perlow, Jason, "Alexa Loop Mode with Playlist for Sleep Noise", Online Available at: <https://www.youtube.com/watch?v=nSkSuXziJSg>, Apr. 11, 2016, 3 pages.

Samsung, "SGH-a885 Series—Portable Quad-Band Mobile Phone—User Manual", Retrieved from the Internet: URL: "http://web.archive.org/web/20100106113758/http://www.comparecellular.com/images/phones/userguide1896.pdf", Jan. 1, 2009, 144 pages.

(56) References Cited

OTHER PUBLICATIONS

Seehafer, Brent, "Activate google assistant on Galaxy S7 with screen off", Available online at:- "https://productforums.google.com/forum/#!topic/websearch/lp3qlGBHLVI", Mar. 8, 2017, 4 pages.

Selfridge et al., "Interact: Tightly-coupling Multimodal Dialog with an Interactive Virtual Assistant", International Conference on Multimodal Interaction, ACM, Nov. 9, 2015, pp. 381-382.

Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.

Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.

Sundermeyer et al., "LSTM Neural Networks for Language Modeling", INTERSPEECH 2012, ISCA's 13 Annual Conference, Sep. 9-13, 2012, pp. 194-197.

Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).

"The world of Virtual Assistants—more SemTech . . . ", End of Business as Usual—Glenn's External blog. Online Available at <https://web.archive.org/web/20091101840940/http://glennas.wordpress.com/2009/10/17/the-world-of-virtual-assistants-more-semtech/>, Oct. 17, 2009, 5 pages.

Vodafone Deutschland, "Samsung Galaxy S3 Tastatur Spracheingabe", Available online at—"https://www.youtube.com/watch?v=6kOd6Gr8uFE", Aug. 22, 2012, 1 page.

X.Ai, "How it Works", Available online at: https://web.archive.org/web/20160531201426/https://x.ai/how-it-works/, May 31, 2016, 6 pages.

Xu, Yuhong, "Policy optimization of dialogue management in spoken dialogue system for out-of-domain utterances", 2016 International Conference on Asian Language Processing (IALP), IEEE, Nov. 21, 2016, pp. 10-13.

Yan et al., "A Scalable Approach to Using DNN-Derived Features in GMM-HMM Based Acoustic Modeling for LVCSR", In Interspeech, 2013, pp. 104-108.

Yates, Michael C., "How can I exit Google Assistant after i'm finished with it", Available online at:- "https://productforums.google.com/forum/#!msg/phone-by-google/faECnR2RJwA/gKNtOkQgAQAJ", Jan. 11, 2016, 2 pages.

Young et al., "The Hidden Information State model: A practical framework for POMDP-based spoken dialogue management", Computer Speech & Language, vol. 24, Issue 2, 2010, pp. 150-174.

Zangerle et al., "Recommending #-Tag in Twitter", Proceedings of the Workshop on Semantic Adaptive Social Web, 2011, pp. 1-12.

Summons to Attend Oral Proceedings received for European Patent Application No. 16864716.2, dated Jul. 17, 2020, 12 pages.

Result of Consultation received for European Patent Application No. 16864716.2, dated Oct. 28, 2020, 14 pages.

* cited by examiner

| Instructions | Input/Output |
|---|---|
| Gather information 1 | Input 1 |
| Gather information 2 | Input 2 |
| Gather information 3 | Input 3 |
| Gather information 4 | Input 4 |
| Instruction 1 | |
| Instruction 2 | Output 1 |
| Instruction 3 | |
| Instruction 4 | |
| Instruction 5 | Input 5 |
| Instruction 6 | |
| Instruction 7 | Contingent input 1 |
| Instruction 8 | Contingent input 2 |
| Instruction 9 | |
| Instruction 10 | Contingent input 3 |
| Instruction 11 | Contingent input 4 |
| Instruction 12 | |
| Instruction 13 | |
| Instruction 14 | Output 2 |
| Instruction 15 | Output 3 |
| | |

*FIG. 8B*

| Instructions | Input/Output |
|---|---|
| Which door | Front door |
| Visitor name | Tomas |
| Time expected | 9:00:00 PM (Optional) |
| Date expected | 10/29/2015 (Optional) |
| If password required, generate password | |
|    Generate password | teakettle five |
|    Provide password to user | |
|    Provide password to visitor? | |
|      Visitor contact information | Email address, SMS address |
| Detect visitor | |
|    Sense movement | Contingent input - motion sensed |
|    Receive button press | Contingent input - button pressed |
| Determine visitor identity | |
|    Wait for person to announce self | |
|    Ask for name | |
| Receive voice input | Contingent input - natural language speech |
| Compare voice input to visitor name | |
|    Voice input = visitor name? | |
|      If password not required, open door | |
|      If password required | |
|        Ask for password | |
|        Receive voice input | Contingent input - natural language speech |
|        Compare voice input to password | |
|        If voice input matches password, open door | |
| Greet visitor | Output audio and text: "Hello, Tomas!" |
| Transmit message to user that visitor has arrived | Message user "Tomas is here. I let him in." |

*FIG. 8C*

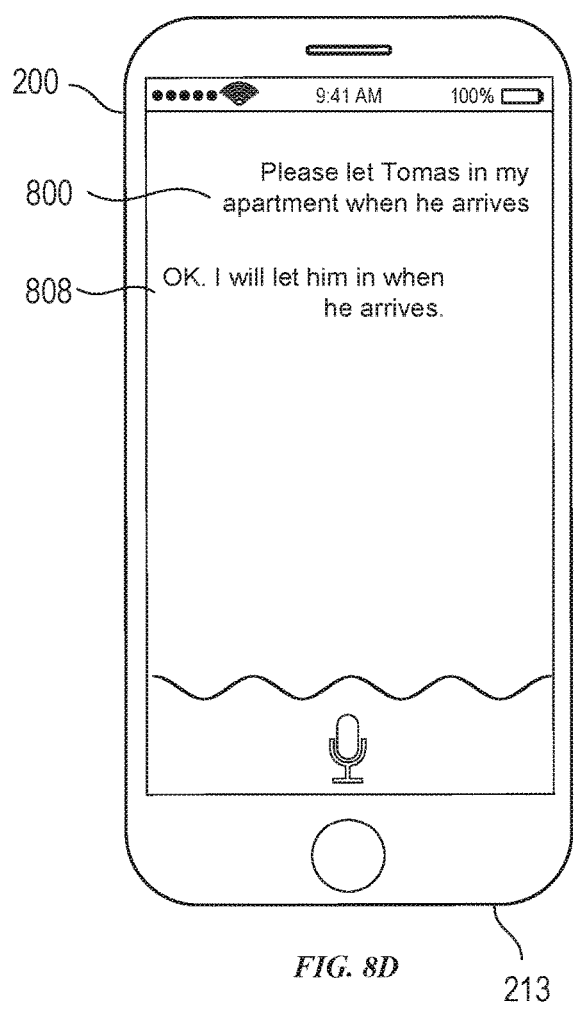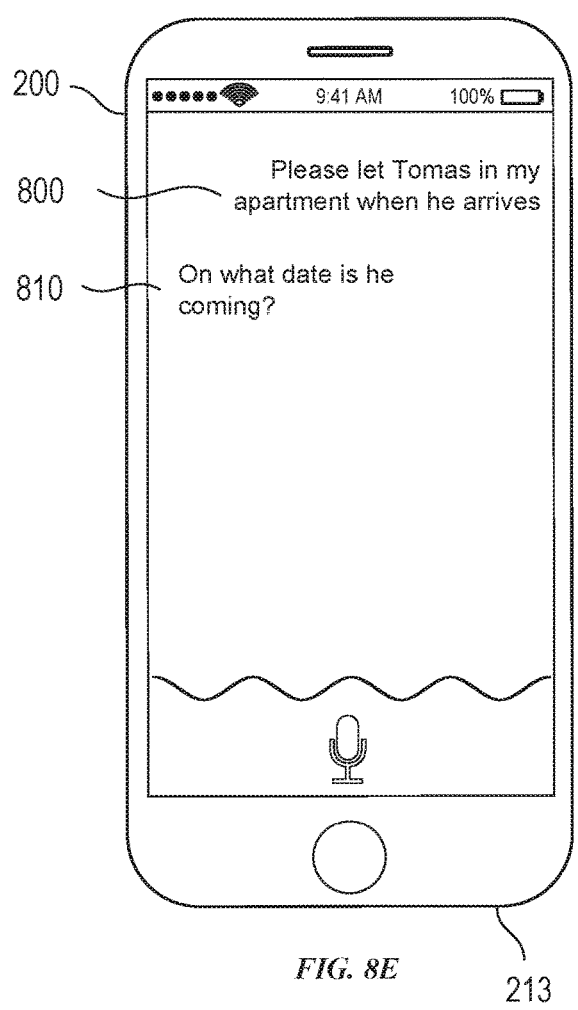
FIG. 8D
FIG. 8E

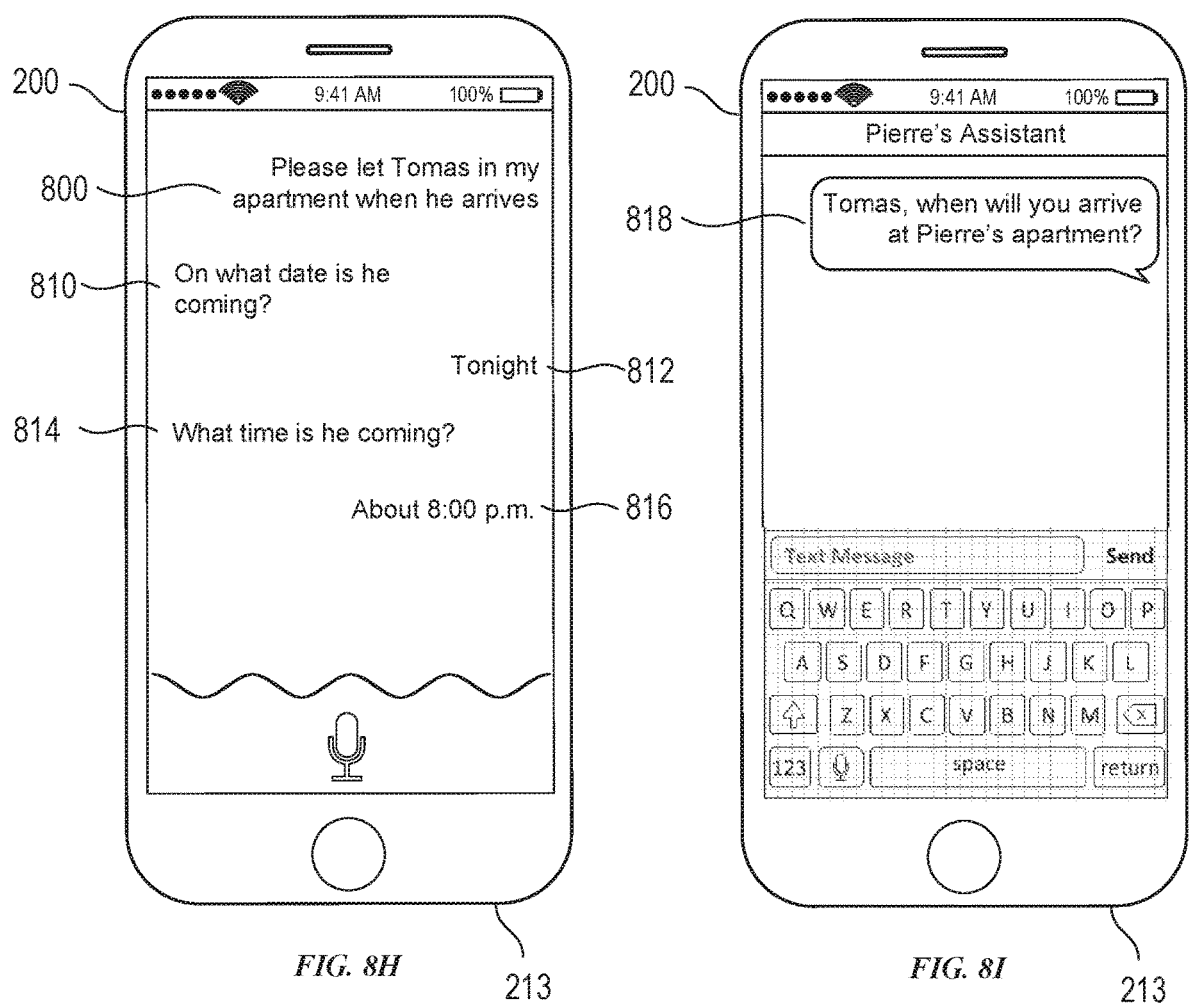

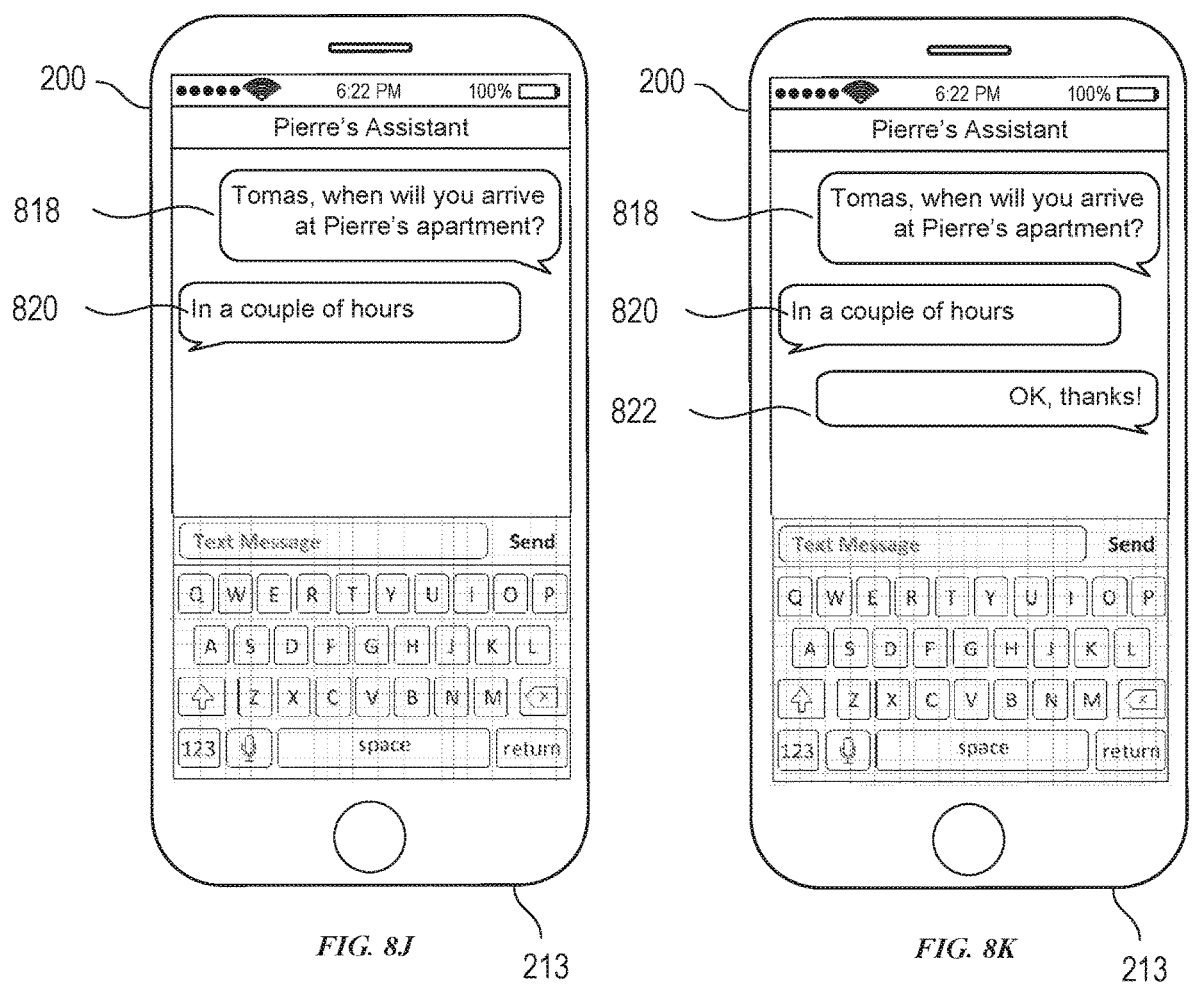

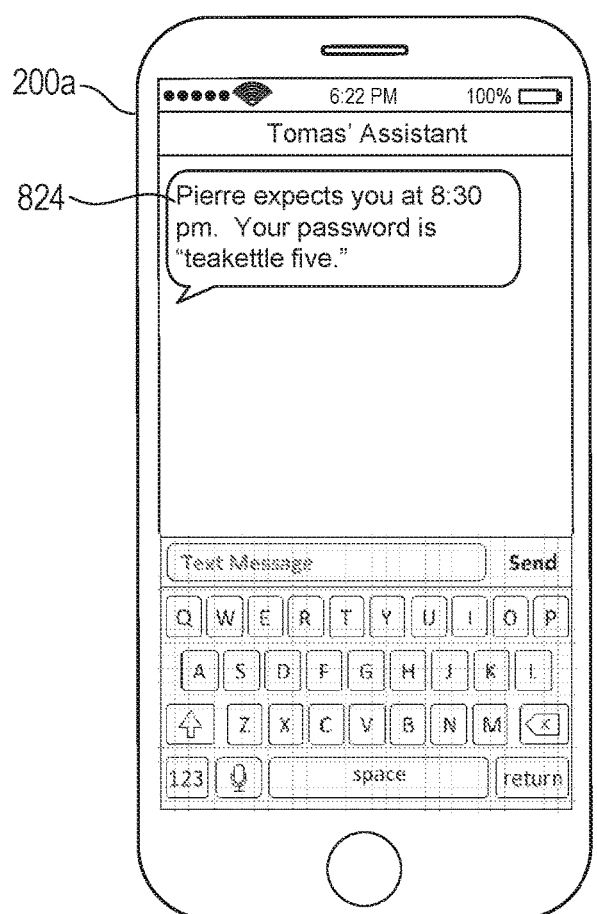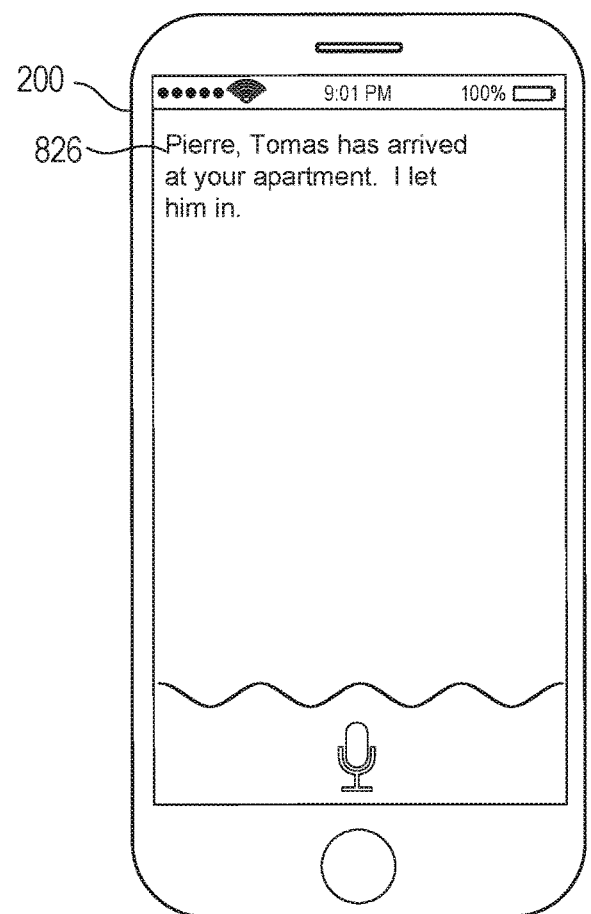
FIG. 8L
FIG. 8M

UNCONVENTIONAL VIRTUAL ASSISTANT INTERACTIONS

CROSS REFERENCE TO RELATED APPLICATION

This application claims priority from U.S. Provisional Ser. No. 62/252,835, filed on Nov. 9, 2015, entitled UNCONVENTIONAL ASSISTANT INTERACTIONS, which is hereby incorporated by reference in its entirety for all purposes.

FIELD

The present disclosure relates generally to a virtual assistant, and more specifically to techniques for interacting with a virtual assistant.

BACKGROUND

Intelligent automated assistants (or digital assistants) provide a beneficial interface between human users and electronic devices. Such assistants allow users to interact with devices or systems using natural language in spoken and/or text forms. For example, a user can access the services of an electronic device by providing a spoken user request to a digital assistant associated with the electronic device. The digital assistant can interpret the user's intent from the spoken user request and operationalize the user's intent into tasks. The tasks can then be performed by executing one or more services of the electronic device and a relevant output can be returned to the user in natural language form or displayed on a device screen.

A digital assistant can be helpful in remembering calendar events or other reminders that have been set specifically by a user. A digital assistant also can be helpful in generating a recommendation based on a user request and on third-party reviews that are publicly available. However, digital assistants generally have not been useful in handling unconventional interactions, such as interactions with users other than a primary user, interactions with other virtual assistants, complex interactions, and interactions with physical entities. Further, digital assistants generally have not been useful in performing tasks that are spread out in time, or that include contingent steps or encounter exceptions.

BRIEF SUMMARY

Some techniques for interacting with a virtual assistant, however, may be cumbersome and inefficient. For example, existing techniques use a complex and time-consuming user interface, which may include multiple key presses or keystrokes. Such a user interface may be impractical or impossible in certain circumstances, such as when the user is operating a motor vehicle or has his or her hands full. Existing techniques require more time than necessary, wasting user time and device energy. For example, existing techniques may require a number of separate interactions with the user in order to fulfill a user request. This consideration is particularly important in battery-operated devices.

Accordingly, there is a need for electronic devices with faster, more efficient methods and interfaces for interacting with a virtual assistant. Such methods and interfaces optionally complement or replace other methods for interacting with a virtual assistant. Such methods and interfaces reduce the cognitive burden on a user and produce a more efficient human-machine interface. For battery-operated computing devices, such methods and interfaces conserve power and increase the time between battery charges.

In some embodiments, a non-transitory computer-readable storage medium stores one or more programs, the one or more programs including instructions, which when executed by an electronic device, cause the electronic device to receive an unstructured natural-language user request for a service from a virtual assistant; determine whether the user request corresponds to at least one of a plurality of plan templates accessible to the virtual assistant, based on the content of the user request and the content of the plan templates; in accordance with a determination that the user request corresponds to at least one of the plurality of plan templates, select one of the plurality of plan templates; and in accordance with a determination that the user request fails to correspond to at least one of the plurality of plan templates, forego selection of a plan template; and in response to selection of one of the plan templates, begin to respond to the user request according to the selected plan template.

In some embodiments, a transitory computer-readable storage medium stores one or more programs, the one or more programs including instructions, which when executed by an electronic device, cause the electronic device to receive an unstructured natural-language user request for a service from a virtual assistant; determine whether the user request corresponds to at least one of a plurality of plan templates accessible to the virtual assistant, based on the content of the user request and the content of the plan templates; in accordance with a determination that the user request corresponds to at least one of the plurality of plan templates, select one of the plurality of plan templates; and in accordance with a determination that the user request fails to correspond to at least one of the plurality of plan templates, forego selection of a plan template; and in response to selection of one of the plan templates, begin to respond to the user request according to the selected plan template.

In some embodiments, an electronic device includes a memory; a microphone; and a processor coupled to the memory and the microphone, the processor configured to receive an unstructured natural-language user request for a service from a virtual assistant; determine whether the user request corresponds to at least one of a plurality of plan templates accessible to the virtual assistant, based on the content of the user request and the content of the plan templates; in accordance with a determination that the user request corresponds to at least one of the plurality of plan templates, select one of the plurality of plan templates; and in accordance with a determination the user request fails to correspond to at least one of the plurality of plan templates, forego selection of a plan template; and in response to selection of one of the plan templates, begin to respond to the user request according to the selected plan template.

In some embodiments, a method of using a virtual assistant includes, at an electronic device configured to transmit and receive data, receiving an unstructured natural-language user request for a service from a virtual assistant; determining whether the user request corresponds to at least one of a plurality of plan templates accessible to the virtual assistant, based on the content of the user request and the content of the plan templates; in accordance with a determination that the user request corresponds to at least one of the plurality of plan templates, selecting one of the plurality of plan templates; and in accordance with a determination the user request fails to correspond to at least one of the plurality of plan templates, foregoing selection of a plan template;

and in response to selection of one of the plan templates, beginning to respond to the user request according to the selected plan template.

In some embodiments, a system utilizes an electronic device, the system including means for receiving an unstructured natural-language user request for a service from a virtual assistant; means for determining whether the user request corresponds to at least one of a plurality of plan templates accessible to the virtual assistant, based on the content of the user request and the content of the plan templates; in accordance with a determination that the user request corresponds to at least one of the plurality of plan templates, means for selecting one of the plurality of plan templates; and in accordance with a determination the user request fails to correspond to at least one of the plurality of plan templates, means for foregoing selection of a plan template; and in response to selection of one of the plan templates, means for beginning to respond to the user request according to the selected plan template.

In some embodiments, an electronic device includes a processing unit that includes a receiving unit, a determining unit, a selecting unit, and a responding unit; the processing unit configured to receive, using the receiving unit, an unstructured natural-language user request for a service from a virtual assistant; determine, using the determining unit, whether the user request corresponds to at least one of a plurality of plan templates accessible to the virtual assistant, based on the content of the user request and the content of the plan templates; in accordance with a determination that the user request corresponds to at least one of the plurality of plan templates, select, using the selecting unit, one of the plurality of plan templates; and in accordance with a determination that the user request fails to correspond to at least one of the plurality of plan templates, forego selection, using the selecting unit, of a plan template; and in response to selection of one of the plan templates, begin to respond, using the responding unit, to the user request according to the selected plan template.

In some embodiments, a non-transitory computer-readable storage medium stores one or more programs, the one or more programs including instructions, which when executed by an electronic device, cause the electronic device to receive from a virtual assistant a message associated with an action; store the message; and communicate the message to a second electronic device associated with the action.

In some embodiments, a transitory computer-readable storage medium stores one or more programs, the one or more programs including instructions, which when executed by an electronic device, cause the electronic device to receive from a virtual assistant a message associated with an action; store the message; and communicate the message to a second electronic device associated with the action.

In some embodiments, an electronic device includes a memory and a processor coupled to the memory, the processor configured to receive from a virtual assistant a message associated with an action; store the message; and communicate the message to a second electronic device associated with the action.

In some embodiments, a method of using a virtual assistant includes, at an electronic device configured to transmit and receive data, receiving from a virtual assistant a message associated with an action; storing the message; and communicating the message to a second electronic device associated with the action.

In some embodiments, a system utilizes an electronic device, the system including means for receiving from a virtual assistant a message associated with an action; means for storing the message; and means for communicating the message to a second electronic device associated with the action.

In some embodiments, an electronic device includes a processing unit that includes a receiving unit, a storing unit, and a communicating unit; the processing unit configured to receive, using the receiving unit, from a virtual assistant a message associated with an action; store, using the storing unit, the message; and communicate, using the communicating unit, the message to a second electronic device associated with the action.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for interacting with a virtual assistant, thereby increasing the effectiveness, efficiency, and user satisfaction with such devices. Such methods and interfaces may complement or replace other methods for interacting with a virtual assistant.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
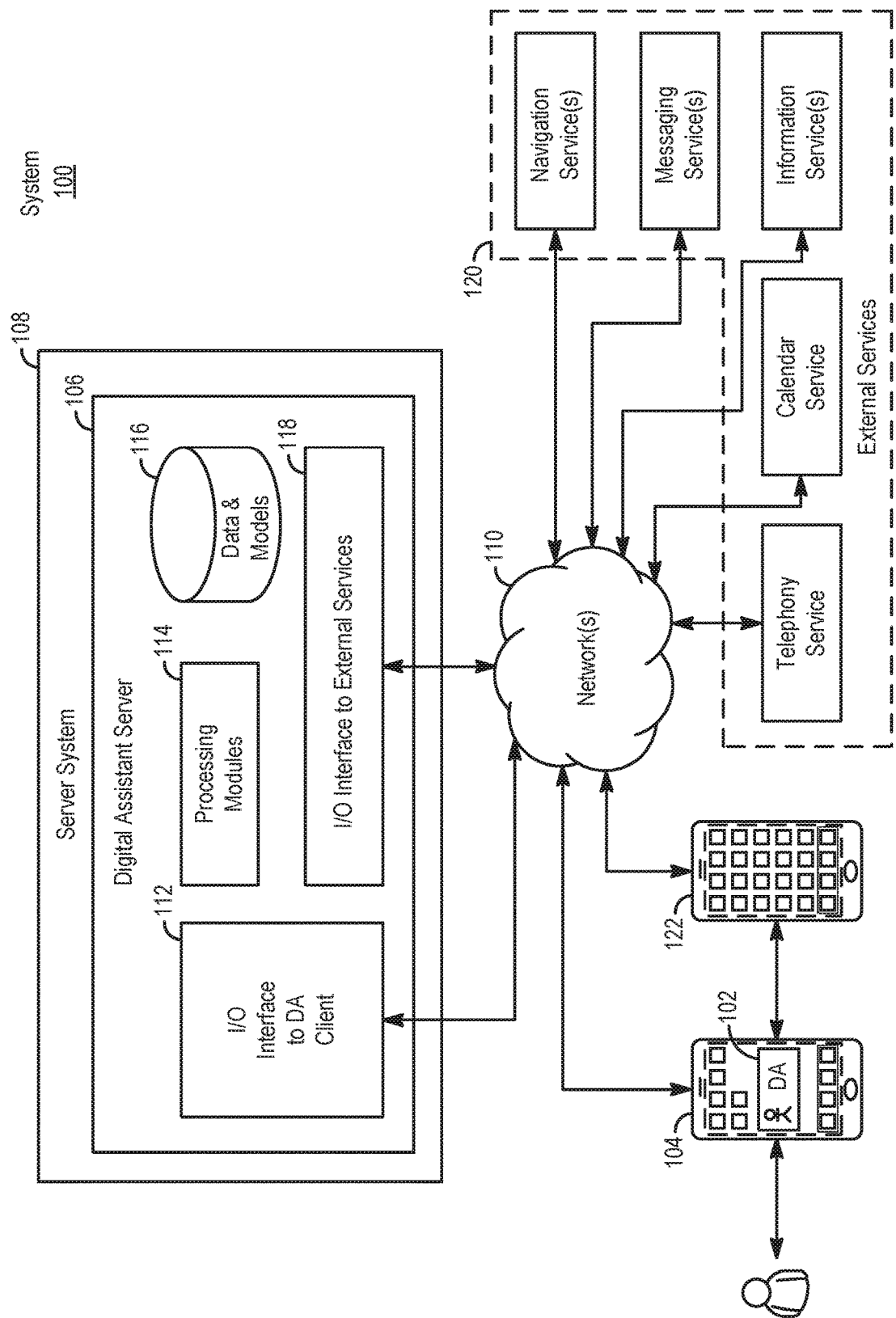
FIG. 1 is a block diagram illustrating a system and environment for implementing a digital assistant according to various examples.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for interacting with a virtual assistant. Such methods and interfaces can reduce the cognitive burden on a user who utilizes a digital assistant to remember user data and generate recommendations, thereby enhancing productivity. Further, such techniques can reduce processor and battery power otherwise wasted on redundant user inputs.

Below, FIGS. 1, 2A-2B, 3, 4, 5A-5B and 6A-6B provide a description of devices for performing the techniques for interacting with a virtual assistant, according to various examples. FIGS. 7A-7D are block diagrams illustrating a digital assistant system or a server portion thereof, a portion of an ontology associated with the digital assistant system, and an architecture for virtual assistant interactions, according to some examples. FIGS. 8A and 8D-8AA illustrate user interfaces for interacting with a virtual assistant, according to various examples. FIGS. 9A-9H are flow diagrams illustrating methods of interacting with a virtual assistant according to various examples. FIGS. 10A-10B are functional block diagrams of electronic devices, according to various examples.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), or wrist wearable devices such as the Apple Watch® wrist wearable device of Apple Inc. of Cupertino, Calif., are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106.

While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
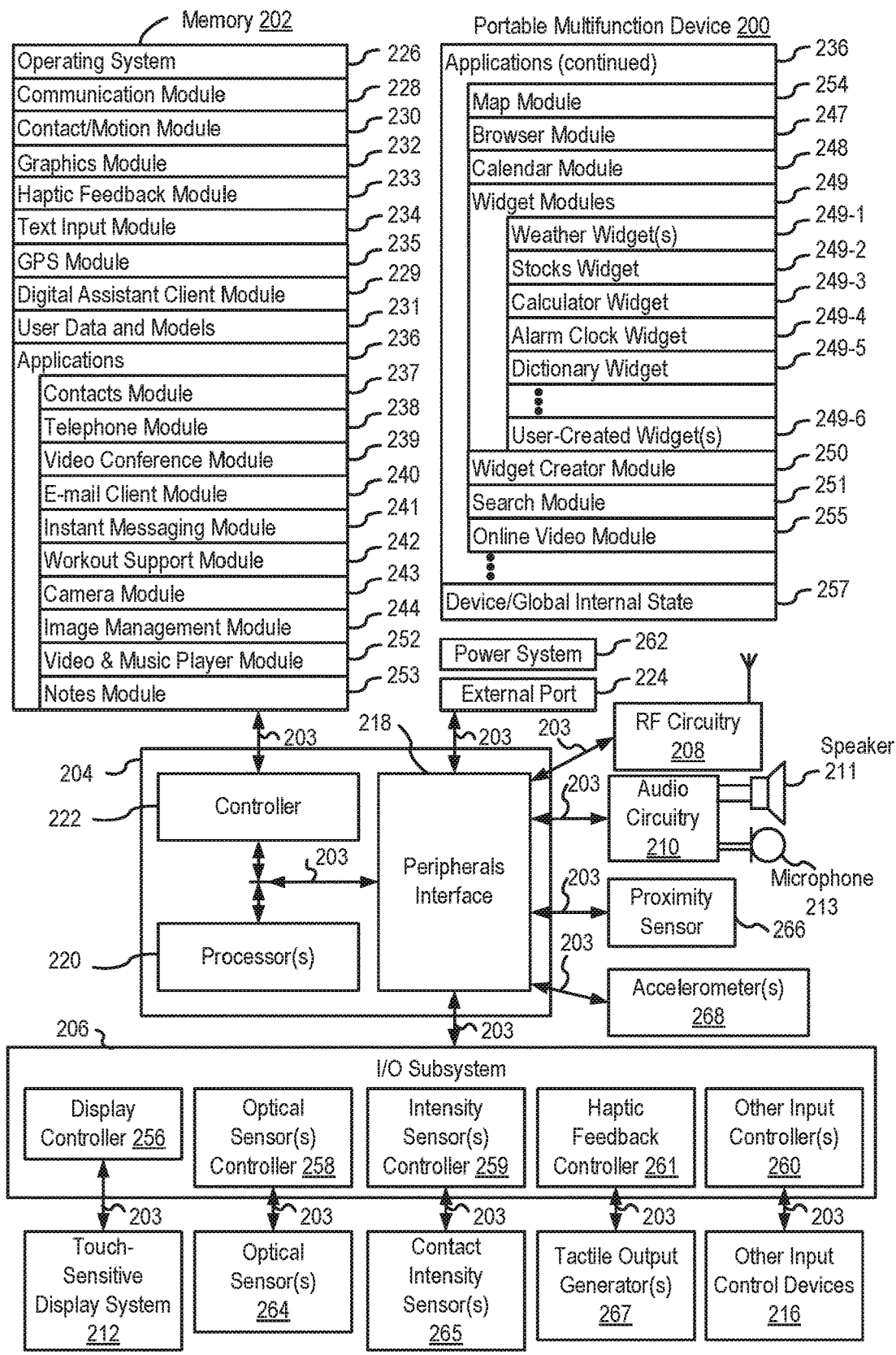
FIG. 2A is a block diagram illustrating a portable multifunction device implementing the client-side portion of a digital assistant according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 optionally can include one or more computer-readable storage mediums. The computer-readable storage mediums optionally can be tangible and non-transitory. Memory 202 optionally can include high-speed random access memory and optionally also can include non-volatile memory, such as one or more magnetic disk storage devices, flash memory devices, or other non-volatile solid-state memory devices. Memory controller 222 optionally can control access to memory 202 by other components of device 200.

In some examples, a non-transitory computer-readable storage medium of memory 202 can be used to store instructions (e.g., for performing aspects of process 900, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of process 900, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 optionally can be implemented on a single chip, such as chip 204. In some other embodiments, they optionally can be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data optionally can be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch display 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button optionally can disengage a lock of touch display 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) optionally can turn power to device 200 on or off. The user optionally can be able to customize a functionality of one or more of the buttons. Touch display 212 is used to implement virtual or soft buttons and one or more soft keyboards.

Touch-sensitive display 212 provides an input interface and an output interface between the device and a user. Display controller 256 receives and/or sends electrical signals from/to touch display 212. Touch display 212 displays visual output to the user. The visual output optionally can include graphics, text, icons, video, and any combination thereof (collectively termed "graphics"). In some embodiments, some or all of the visual output optionally can correspond to user-interface objects.

Touch display 212 has a touch-sensitive surface, sensor, or set of sensors that accepts input from the user based on haptic and/or tactile contact. Touch display 212 and display controller 256 (along with any associated modules and/or sets of instructions in memory 202) detect contact (and any movement or breaking of the contact) on touch display 212 and convert the detected contact into interaction with user-interface objects (e.g., one or more soft keys, icons, web pages, or images) that are displayed on touch display 212. In an exemplary embodiment, a point of contact between touch display 212 and the user corresponds to a finger of the user.

Touch display 212 optionally can use LCD (liquid crystal display) technology, LPD (light emitting polymer display) technology, or LED (light emitting diode) technology, although other display technologies optionally can be used in other embodiments. Touch display 212 and display controller 256 optionally can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch display 212. In an exemplary embodiment, projected mutual capacitance sensing technology is used, such as that found in the iPhone® and iPod Touch® from Apple Inc. of Cupertino, Calif.

A touch-sensitive display in some embodiments of touch display 212 optionally can be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch display 212 displays visual output from device 200, whereas touch-sensitive touchpads do not provide visual output.

A touch-sensitive display in some embodiments of touch display 212 optionally can be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch display 212 optionally can have a video resolution in excess of 100 dpi. In some embodiments, the touch screen has a video resolution of approximately 160 dpi. The user optionally can make contact with touch display 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 optionally can include a touchpad (not shown) for activating or deactivating particular functions. In some embodiments, the touchpad is a touch-sensitive area of the device that, unlike the touch screen, does not display visual output. The touchpad optionally can be a touch-sensitive surface that is separate from touch display 212 or an extension of the touch-sensitive surface formed by the touch screen.

Device 200 also includes power system 262 for powering the various components. Power system 262 optionally can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 optionally also can include one or more optical sensors 264. FIG. 2A shows an optical sensor coupled to optical sensor controller 258 in I/O subsystem 206. Optical sensor 264 optionally can include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 optionally can capture still images or video. In some embodiments, an optical sensor is located on the back of device 200, opposite touch screen display 212 on the front of the device so that the touch screen display optionally can be used as a viewfinder for still and/or video image acquisition. In some embodiments, an optical sensor is located on the front of the device so that the user's image optionally can be obtained for video conferencing while the user views the other video conference participants on the touch screen display. In some embodiments, the position of optical sensor 264 can be changed by the user (e.g., by rotating the lens and the sensor in the device housing) so that a single optical sensor 264 optionally can be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 optionally also can include one or more proximity sensors 266. FIG. 2A shows proximity sensor 266 coupled to peripherals interface 218. Alternately, proximity sensor 266 optionally can be coupled to input controller 260 in I/O subsystem 206. Proximity sensor 266 optionally can perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch display 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 optionally also can include one or more accelerometers 268. FIG. 2A shows accelerometer 268 coupled to peripherals interface 218. Alternately, accelerometer 268 optionally can be coupled to an input controller 260 in I/O subsystem 206. Accelerometer 268 optionally can perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
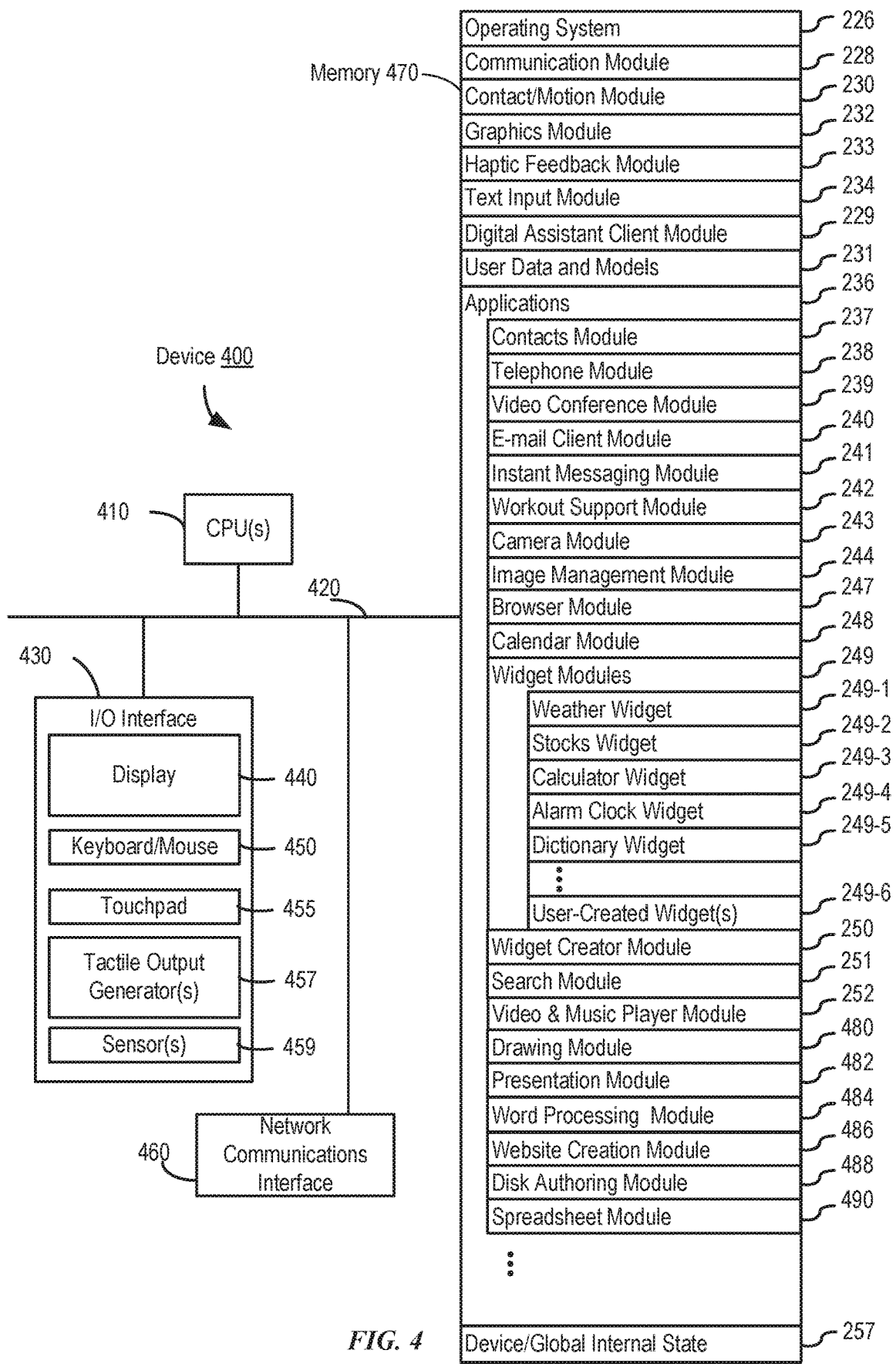
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch display 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch display 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which optionally can be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 optionally can include the following modules (or sets of instructions), or a subset or superset thereof:

Contacts module 237 (sometimes called an address book or contact list);

Telephone module 238;

Video conference module 239;

E-mail client module 240;

Instant messaging (IM) module 241;

Workout support module 242;

Camera module 243 for still and/or video images;

Image management module 244;

Video player module;

Music player module;

Browser module 247;

Calendar module 248;

Widget modules 249, which optionally can include one or more of: weather widget 249-1, stocks widget 249-2, calculator widget 249-3, alarm clock widget 249-4, dictionary widget 249-5, and other widgets obtained by the user, as well as user-created widgets 249-6;

Widget creator module 250 for making user-created widgets 249-6;

Search module 251;

Video and music player module 252, which merges video player module and music player module;

Notes module 253;

Map module 254; and/or

Online video module 255.

Examples of other applications 236 that optionally can be stored in memory 202 include other word processing applications, other image editing applications, drawing applications, presentation applications, JAVA-enabled applications, encryption, digital rights management, voice recognition, and voice replication.

In conjunction with touch display 212, display controller 256, contact/motion module 230, graphics module 232, and text input module 234, contacts module 237 optionally can be used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch display 212, display controller 256, contact/motion module 230, graphics module 232, and text input module 234, telephone module 238 optionally can be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication optionally can use any of a plurality of communications standards, protocols, and technologies.

In conjunction with RF circuitry 208, audio circuitry 210, speaker 211, microphone 213, touch display 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch display 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch display 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally can include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch display 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch display 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch display 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch display 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch display 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch display 212, display controller 256, contact/motion module 230, graphics module 232, text input module 234, and browser module 247, widget modules 249 are mini-applications that optionally can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch display 212, display controller 256, contact/motion module 230, graphics module 232, text input module 234, and browser module 247, the widget creator module 250 optionally can be used by a user to create widgets (e.g., turning a user-specified portion of a web page into a widget).

In conjunction with touch display 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch display 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch display 212 or on an external, connected display via external port 224). In some embodiments, device 200 optionally includes the functionality of an MP3 player, such as an iPod (trademark of Apple Inc.).

In conjunction with touch display 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch display 212, display controller 256, contact/motion module 230, graphics module 232, text input module 234, GPS module 235, and browser module 247, map module 254 optionally can be used to receive, display, modify, and store maps and data associated with maps (e.g., driving directions, data on stores and other points of interest at or near a particular location, and other location-based data) in accordance with user instructions.

In conjunction with touch display 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules optionally can be combined or otherwise rearranged in various embodiments. For example, video player module optionally can be combined with music player module into a single module (e.g., video and music player module 252, FIG. 2A). In some embodiments, memory 202 optionally can store a subset of the modules and data structures identified above. Furthermore, memory 202 optionally can store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 optionally can be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
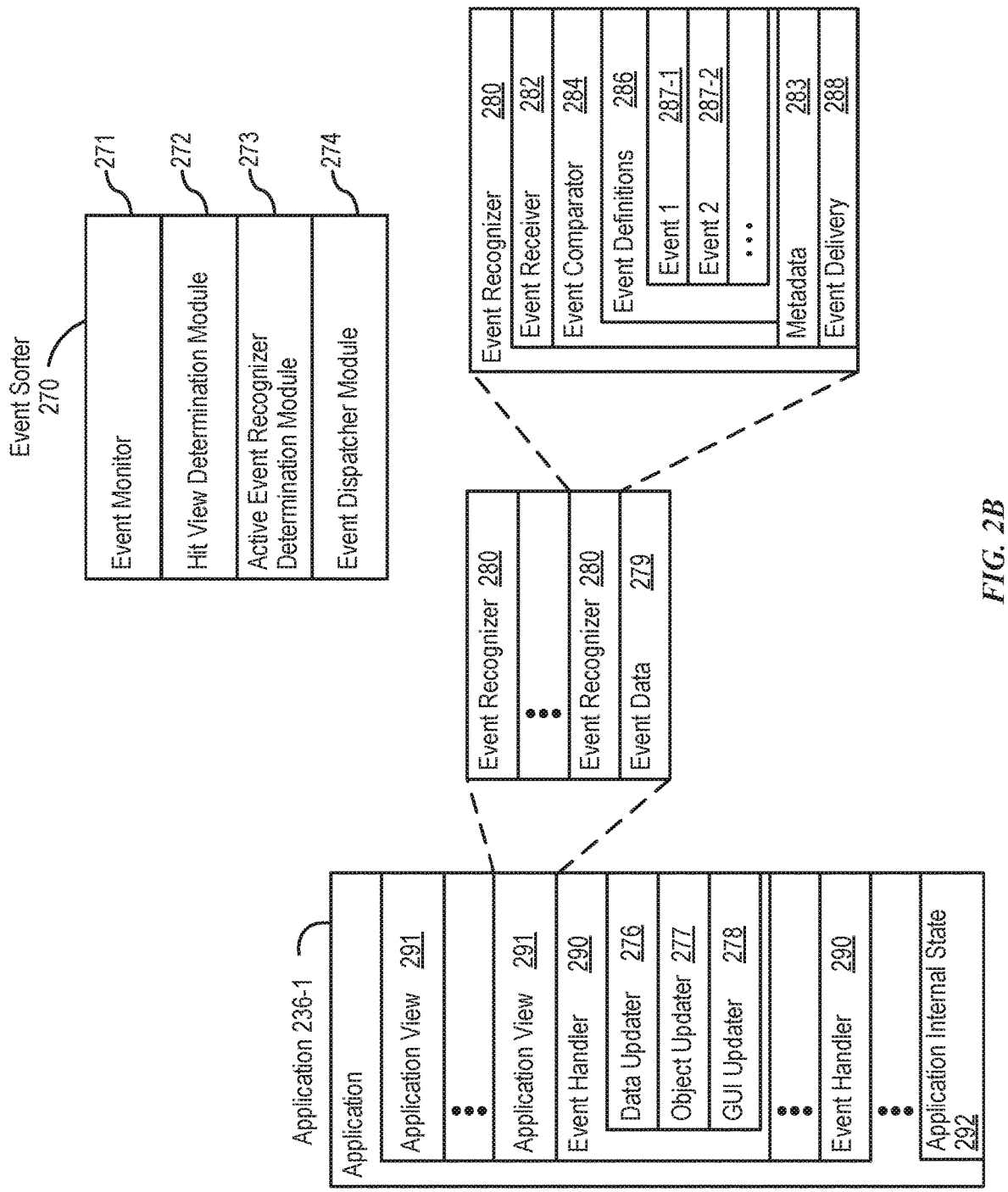
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of:

resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally can correspond to programmatic levels within a programmatic or view hierarchy of the application. For example, the lowest level view in which a touch is detected optionally can be called the hit view, and the set of events that are recognized as proper inputs optionally can be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 optionally can utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which optionally can include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information optionally can also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers optionally can interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
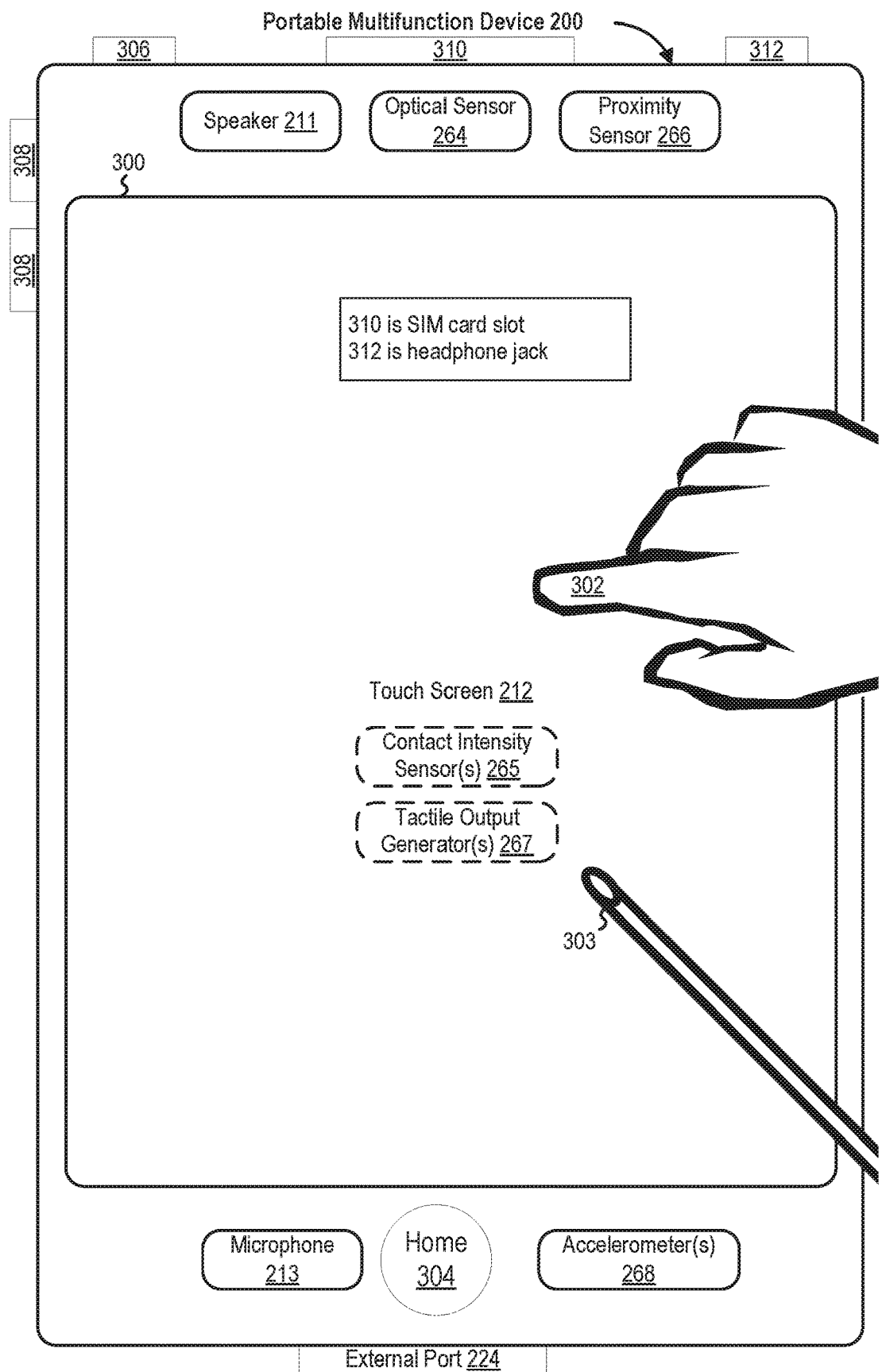
FIG. 3 illustrates a portable multifunction device implementing the client-side portion of a digital assistant according to various examples.

FIG. 3 illustrates a portable multifunction device 200 having a touch display 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 optionally also can include one or more physical buttons, such as "home" or menu button 304. As described previously, menu button 304 optionally can be used to navigate to any application 236 in a set of applications that optionally can be executed on device 200. Alternatively, in some embodiments, the menu button is implemented as a soft key in a GUI displayed on touch display 212.

In one embodiment, device 200 includes touch display 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch display 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 optionally can be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules optionally can be combined or otherwise rearranged in various embodiments. In some embodiments, memory 470 optionally can store a subset of the modules and data structures identified above. Furthermore, memory 470 optionally can store additional modules and data structures not described above.

Attention is now directed towards embodiments of user interfaces that optionally can be implemented on, for example, portable multifunction device 200.

Figure 5A:
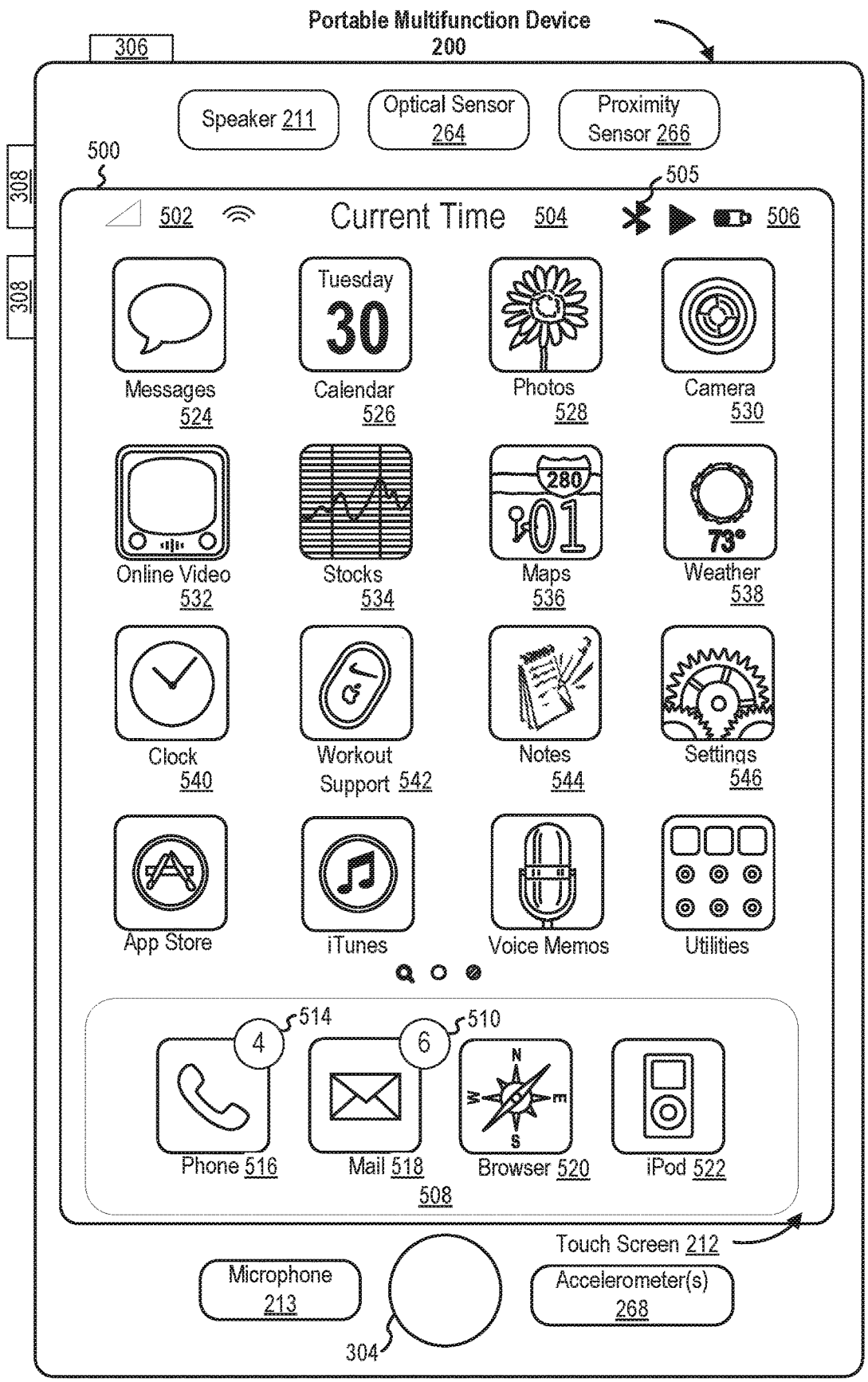
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces optionally can be implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and
  Icon 522 for video and music player module 252, also referred to as iPod (trademark of Apple Inc.) module 252, labeled "iPod;" and
Icons for other applications, such as:
  Icon 524 for IM module 241, labeled "Messages;"
  Icon 526 for calendar module 248, labeled "Calendar;"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and
  Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 optionally can be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
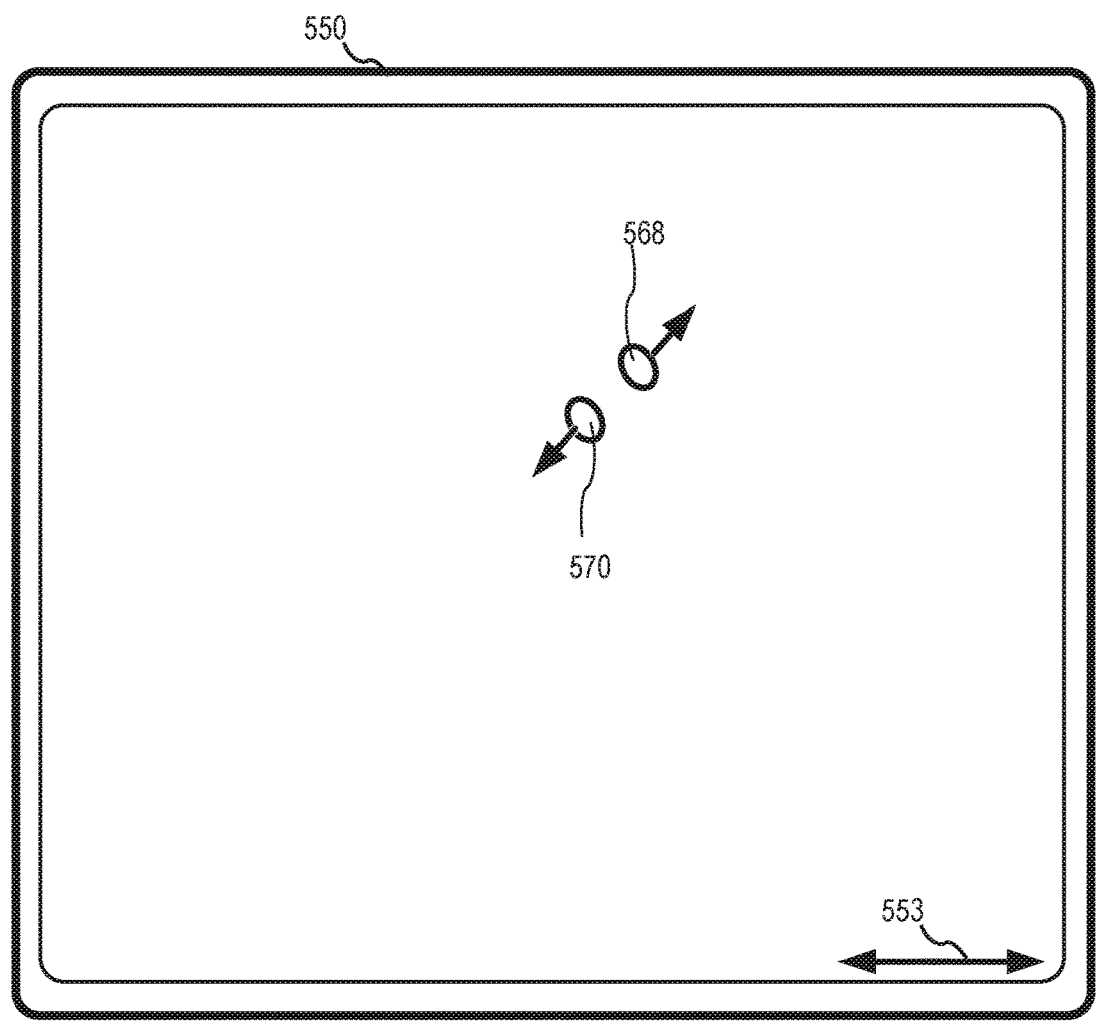
FIG. 5B illustrates an exemplary user interface for a multifunction device with a touch-sensitive surface that is separate from the display according to various examples.
Figure 5B:
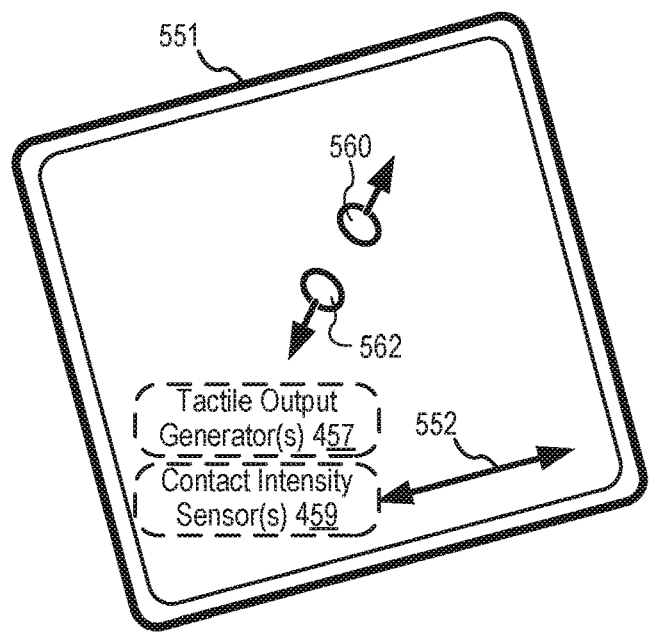

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
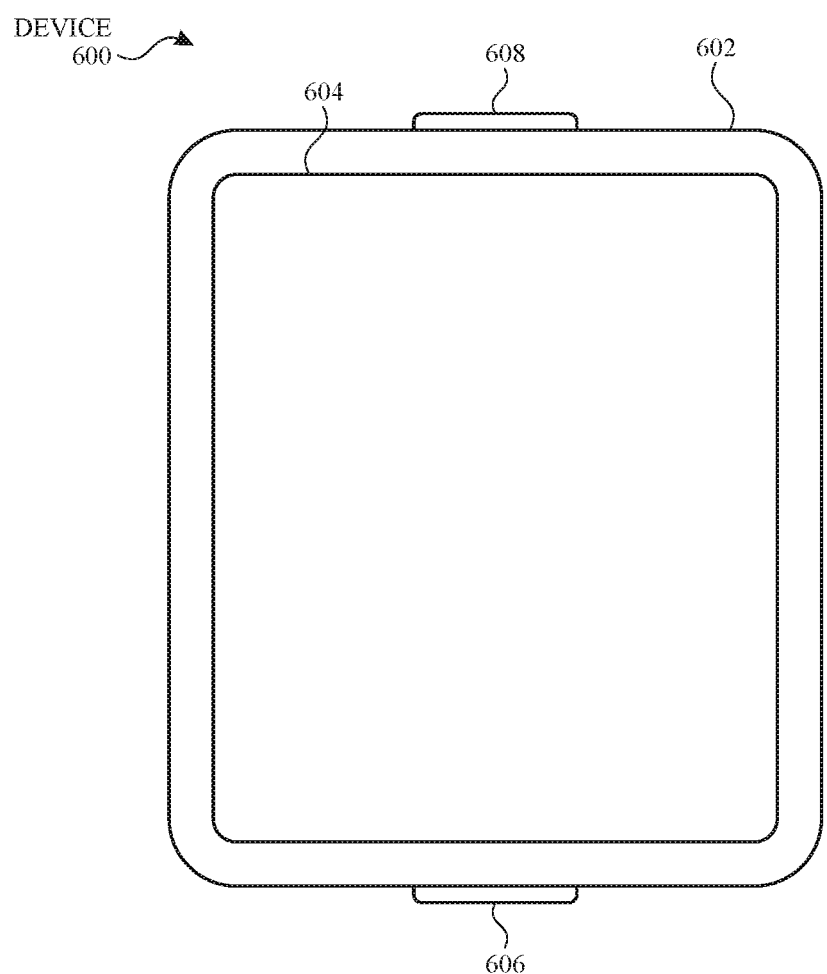
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) optionally can have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity can be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms optionally can permit device 600 to be worn by a user.

Figure 6B:
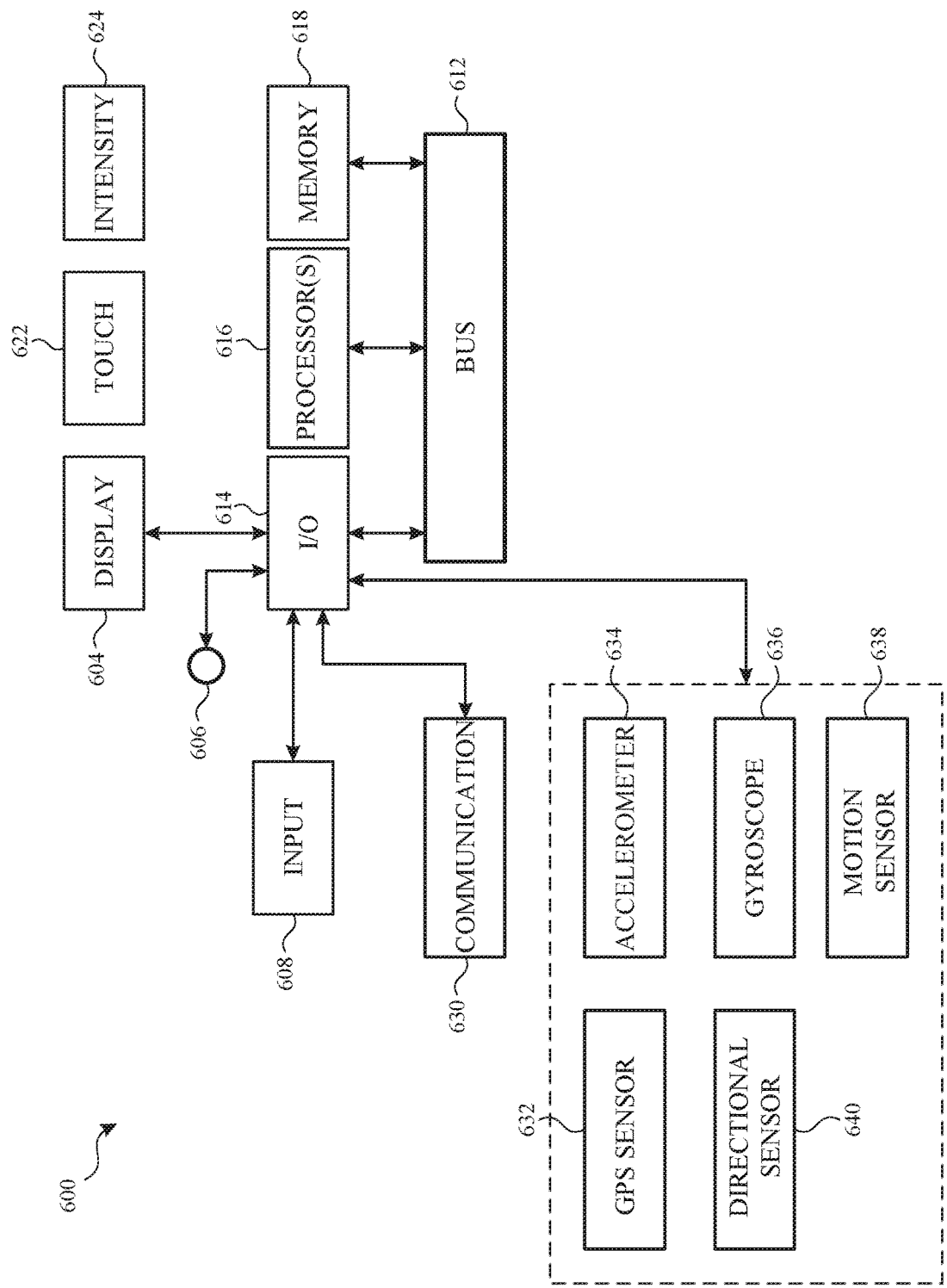
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 optionally can be a rotatable input device or a depressible and rotatable input device, for example. Input mechanism 608 optionally can be a button, in some examples.

Input mechanism 608 optionally can be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Figure 9A:
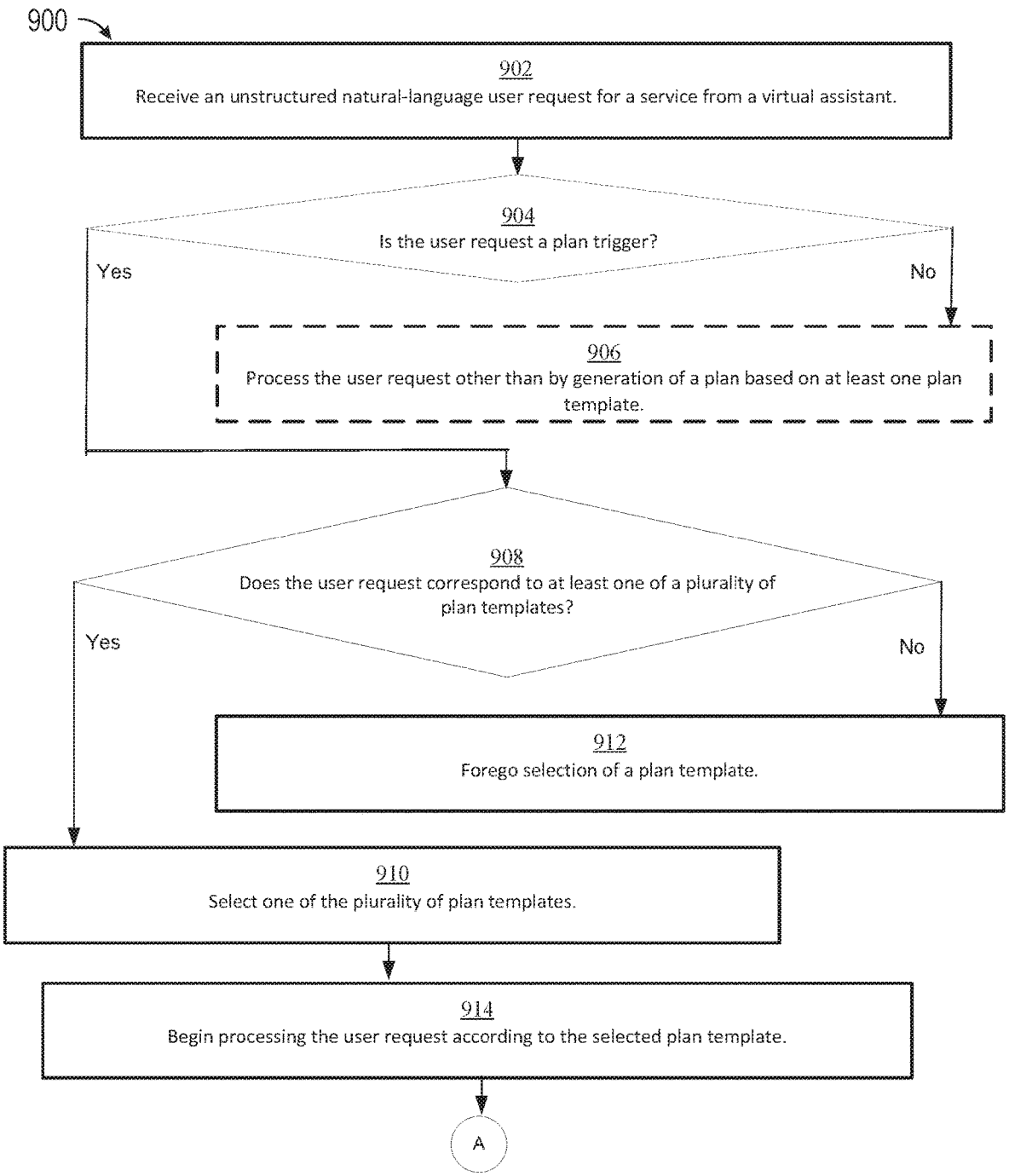
FIGS. 9A-9F illustrate a process for interacting with a virtual assistant according to various examples.
Figure 9B:
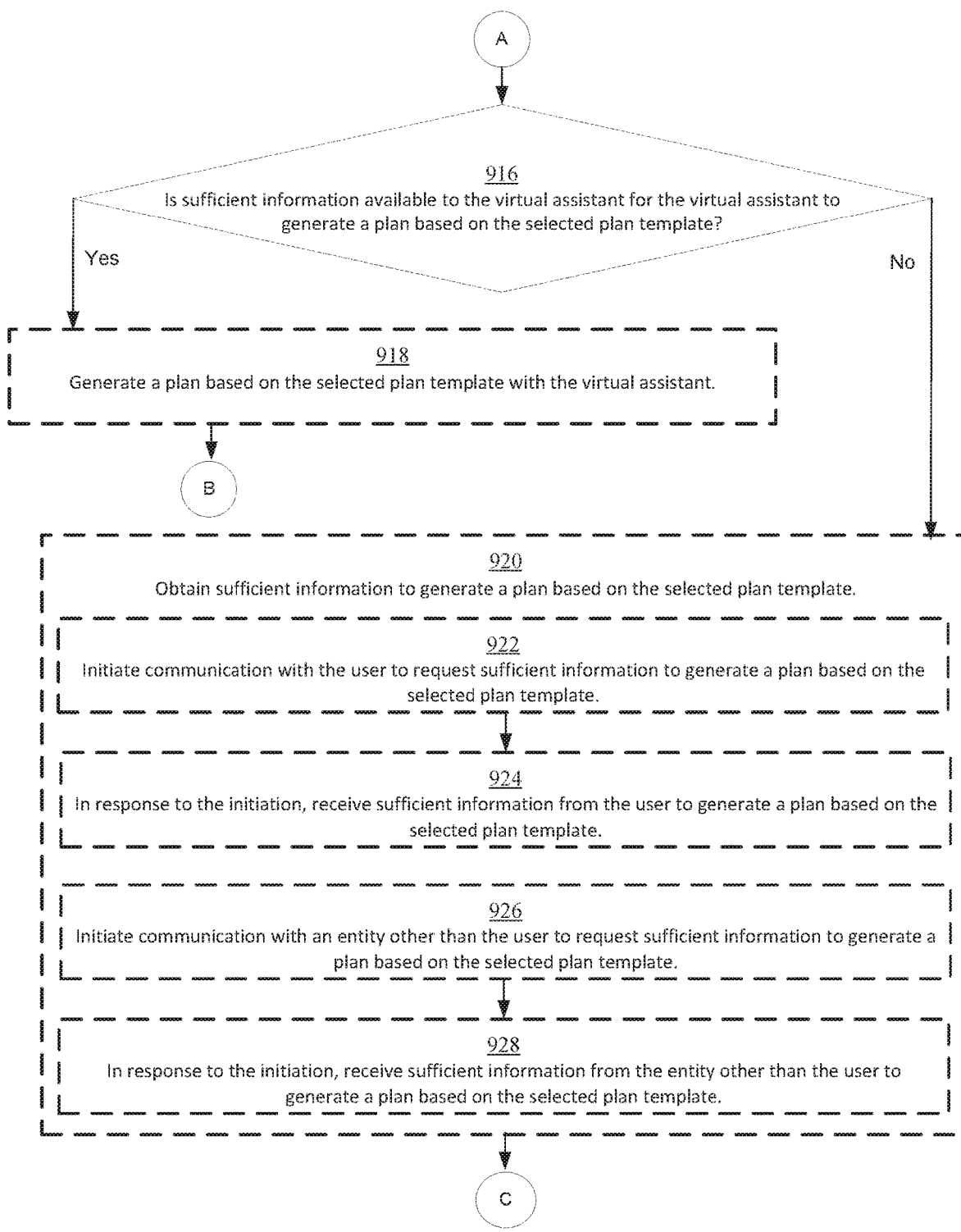
Figure 9C:
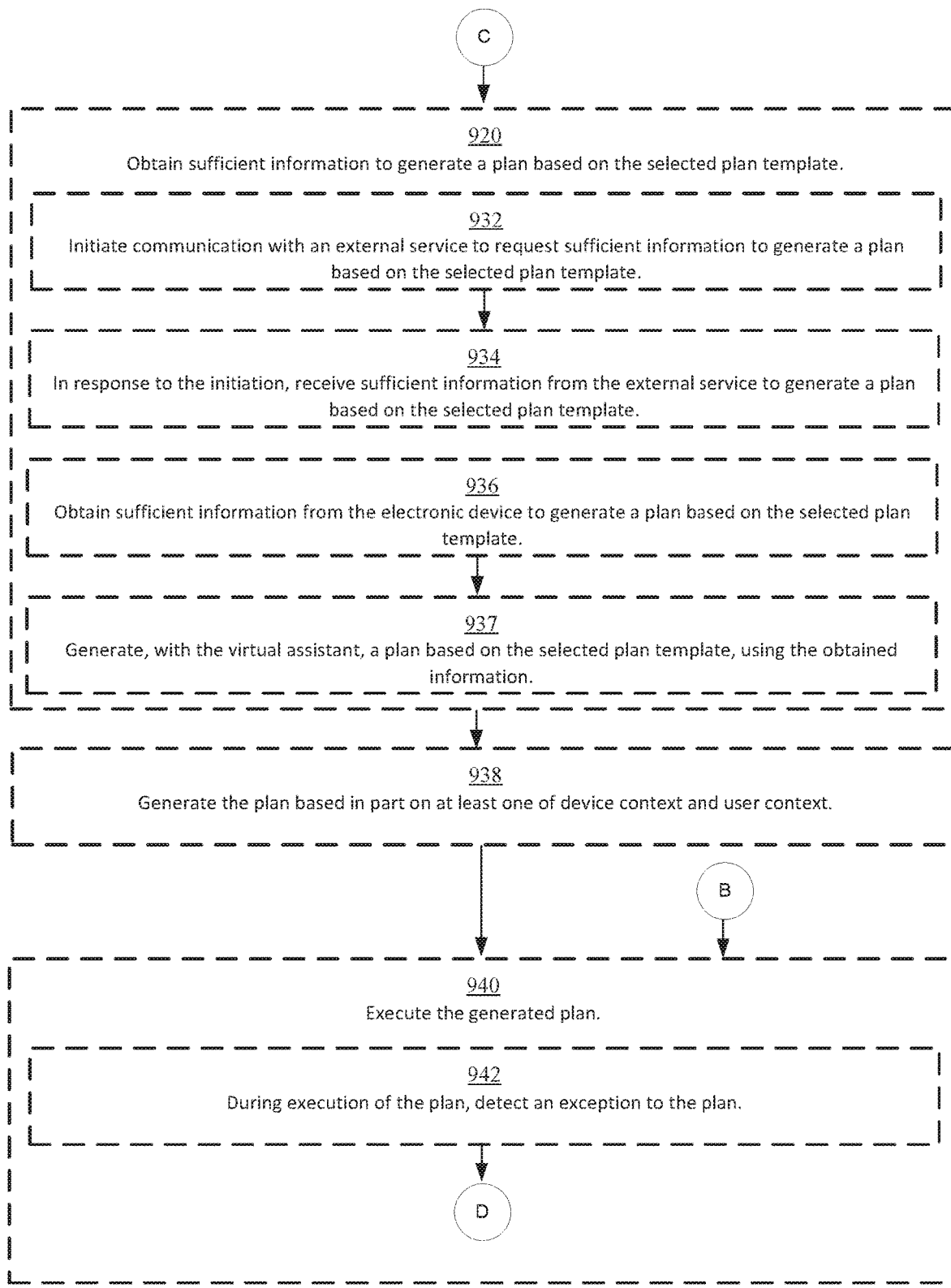
Figure 9D:
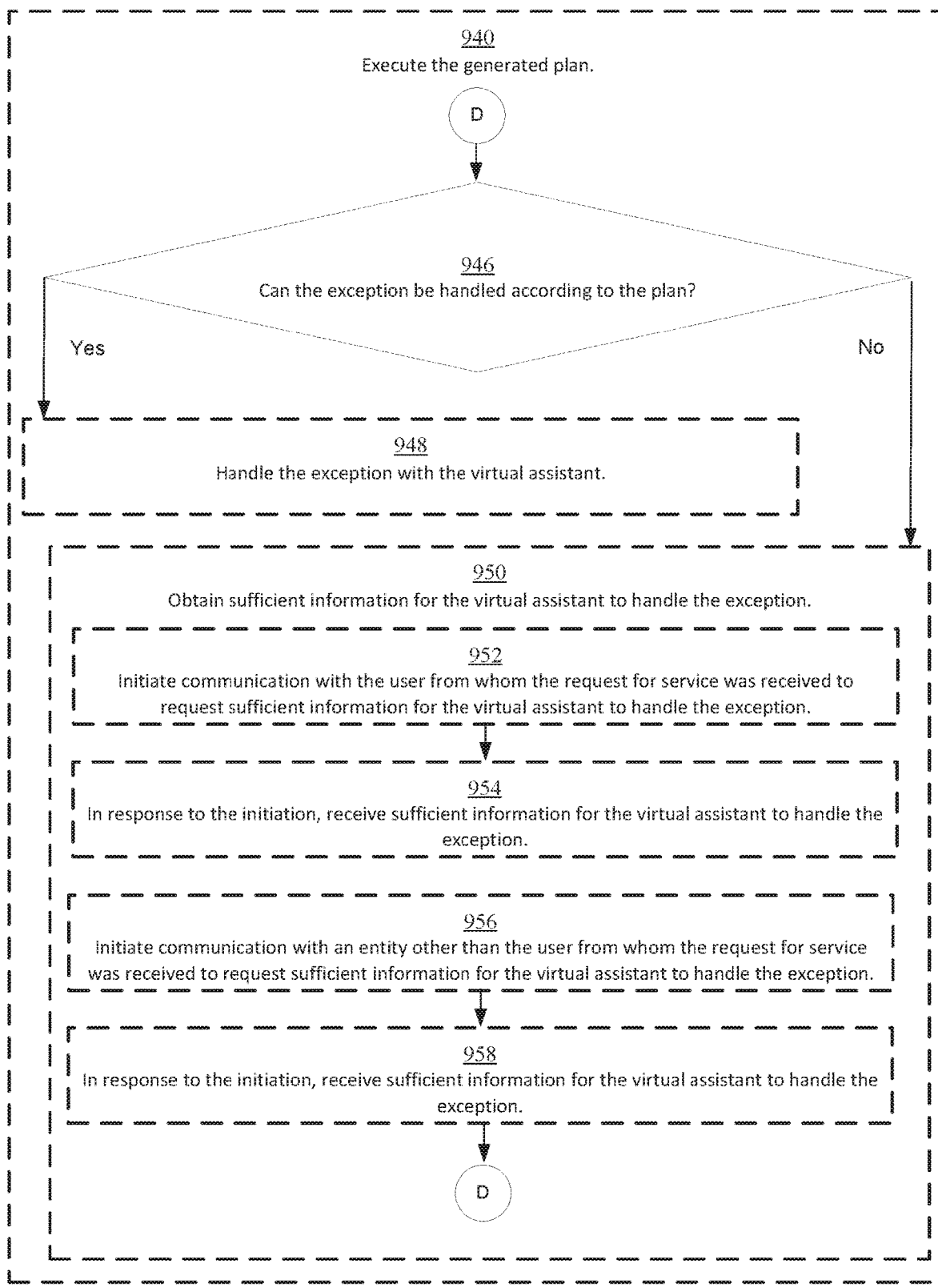
Figure 9E:
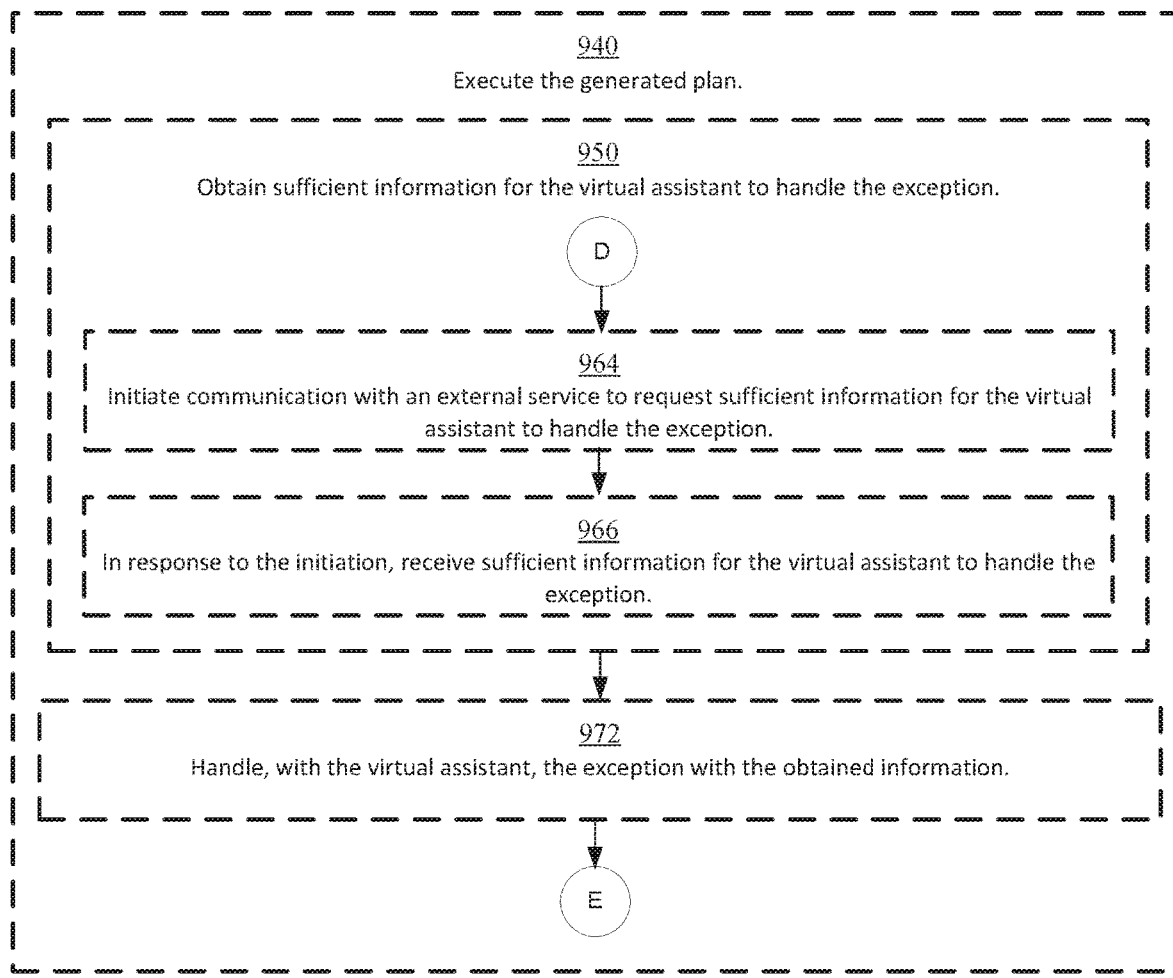
Figure 9F:
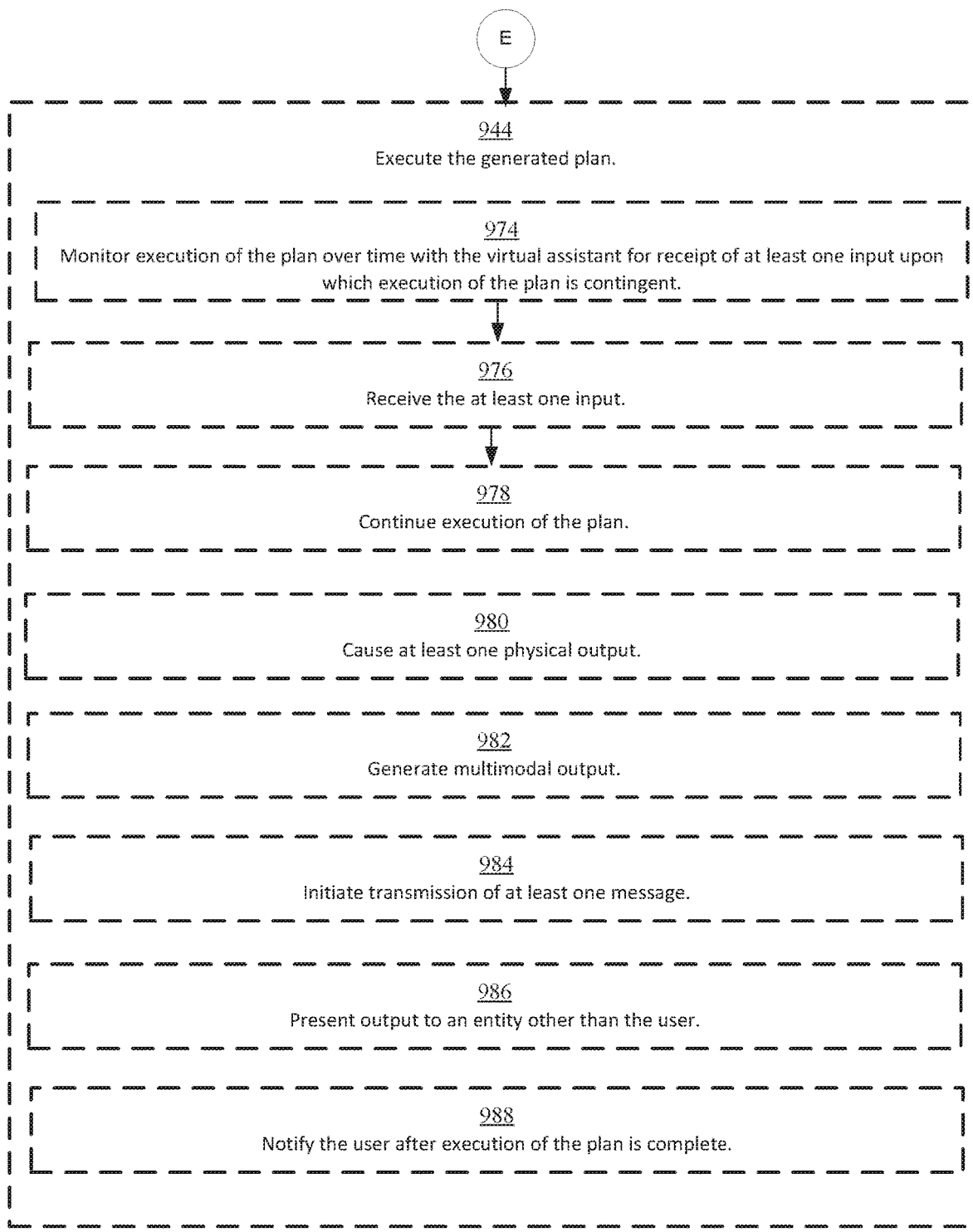
Figure 9G:
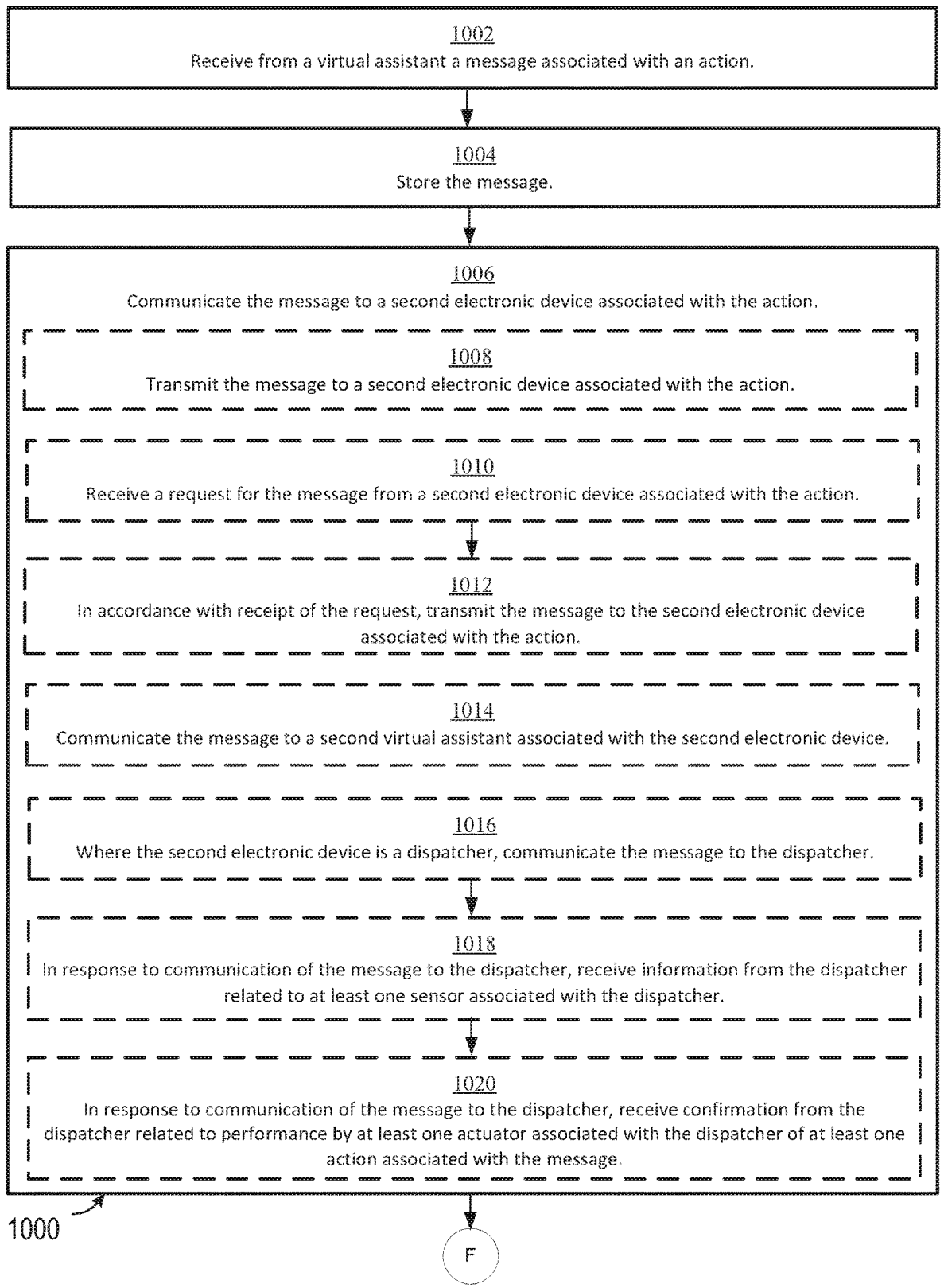
FIGS. 9G-9H illustrate a process for handling messages according to various examples.
Figure 9H:
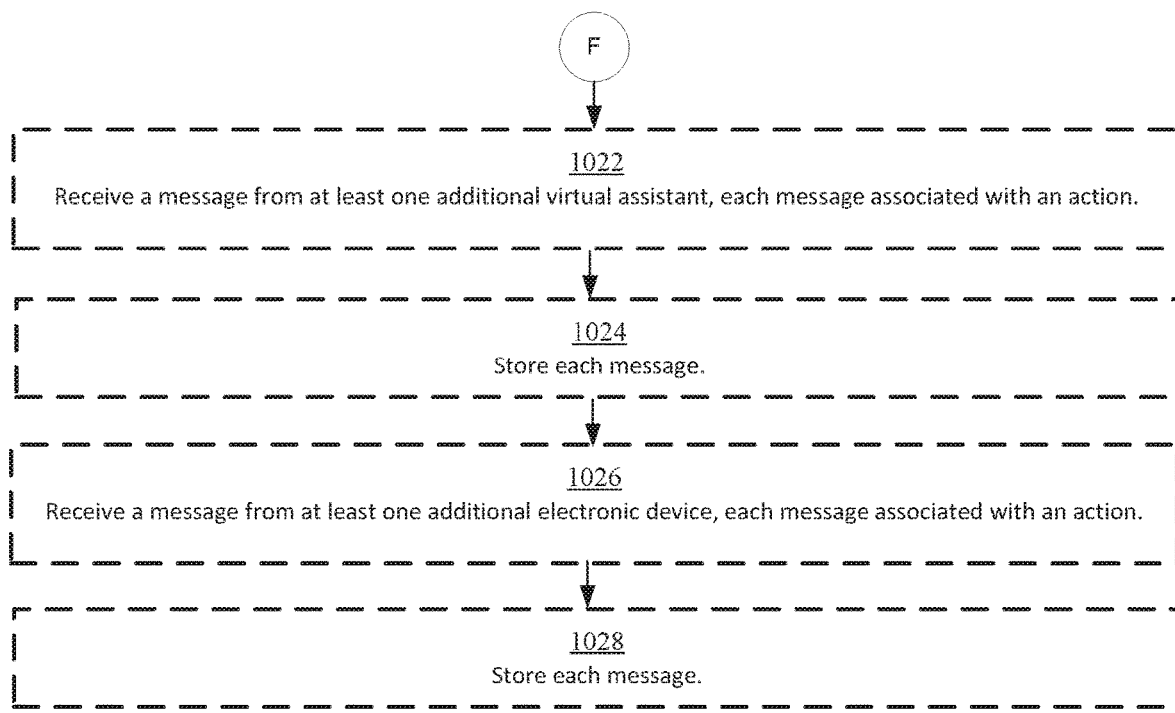
Figure 10A:
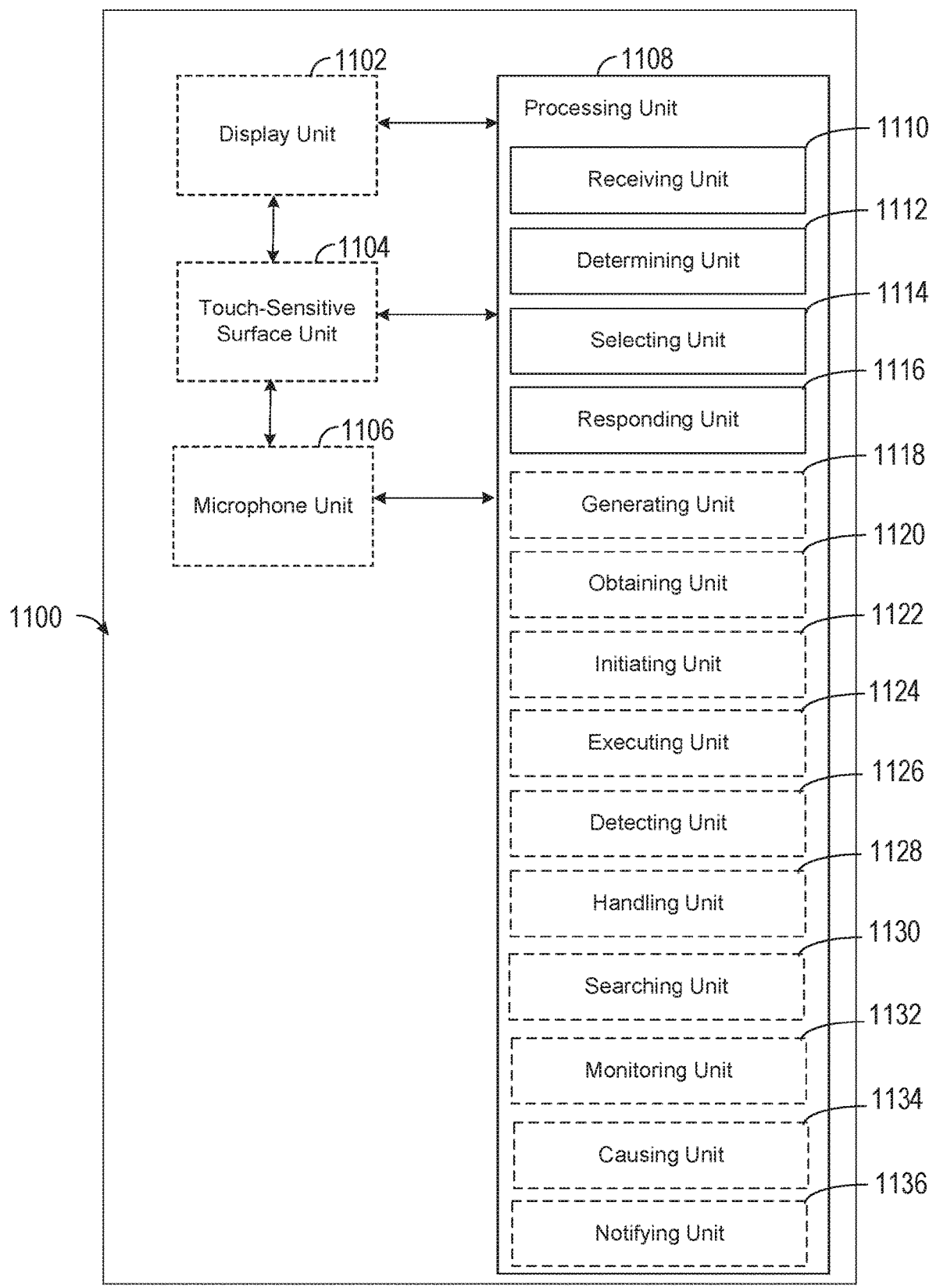
FIG. 10A illustrates a functional block diagram of an electronic device according to various examples.
Figure 10B:
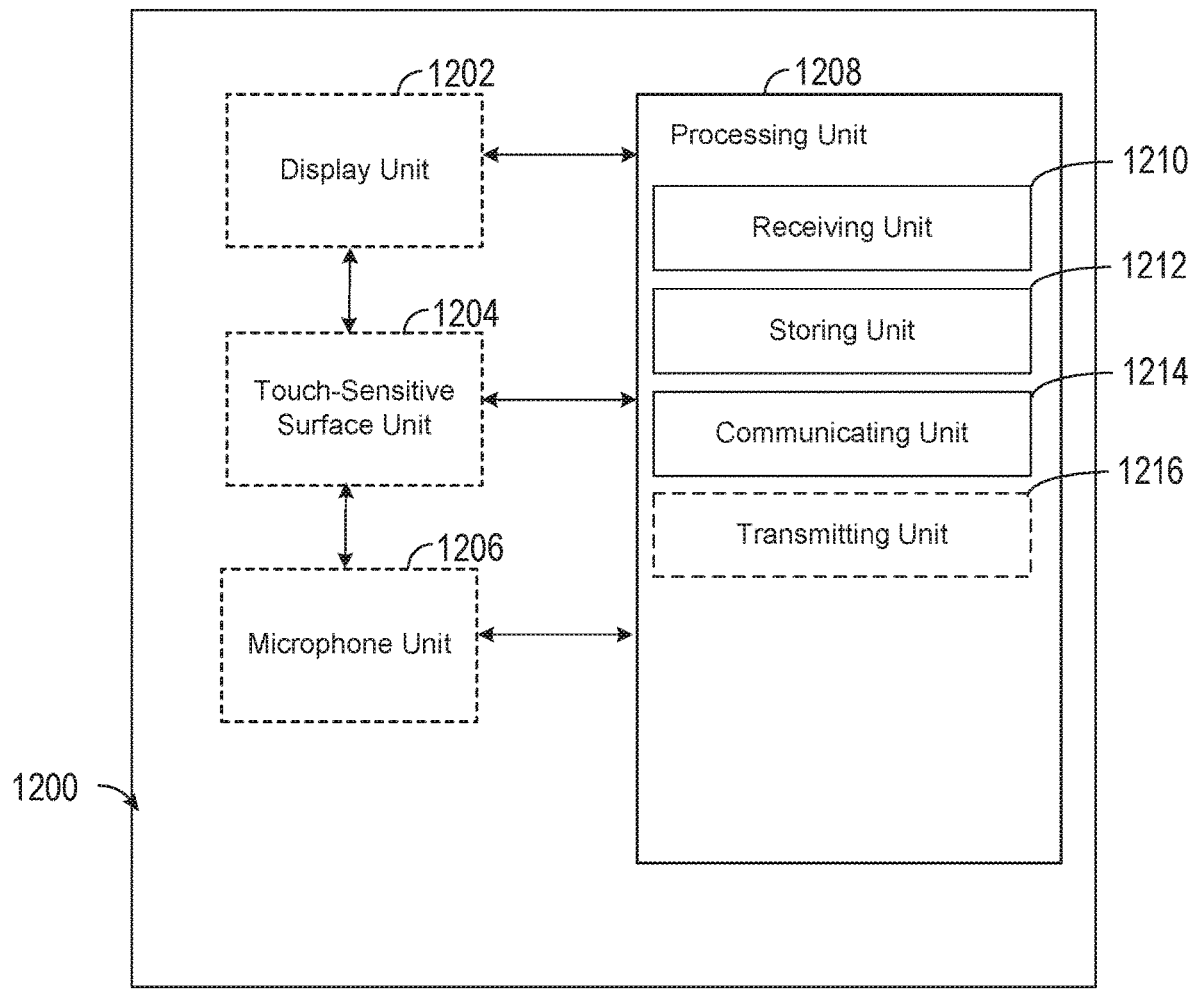
FIG. 10B illustrates a functional block diagram of an electronic device for handling messages, according to some examples.

Memory 618 of personal electronic device 600 can be a non-transitory computer-readable storage medium, for storing computer-executable instructions, which, when executed by one or more computer processors 616, for example, can cause the computer processors to perform the techniques described below, including process 900 (FIGS. 9A-9F) and process 1000 (FIGS. 9G-9H). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 600 is not limited to the components and configuration of FIG. 6B, but can include other or additional components in multiple configurations.

As used here, the term "affordance" refers to a user-interactive graphical user interface object that optionally can be displayed on the display screen of devices 200, 400, and/or 600 (FIGS. 2, 4, and 6). For example, an image (e.g., icon), a button, and text (e.g., hyperlink) optionally can each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch display 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally can include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface optionally can receive a continuous swipe contact transitioning from a start location and reaching an end location, at which point the intensity of the contact increases. In this example, the characteristic intensity of the contact at the end location optionally can be based on only a portion of the continuous swipe contact, and not the entire swipe contact (e.g., only the portion of the swipe contact at the end location). In some embodiments, a smoothing algorithm optionally can be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface optionally can be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
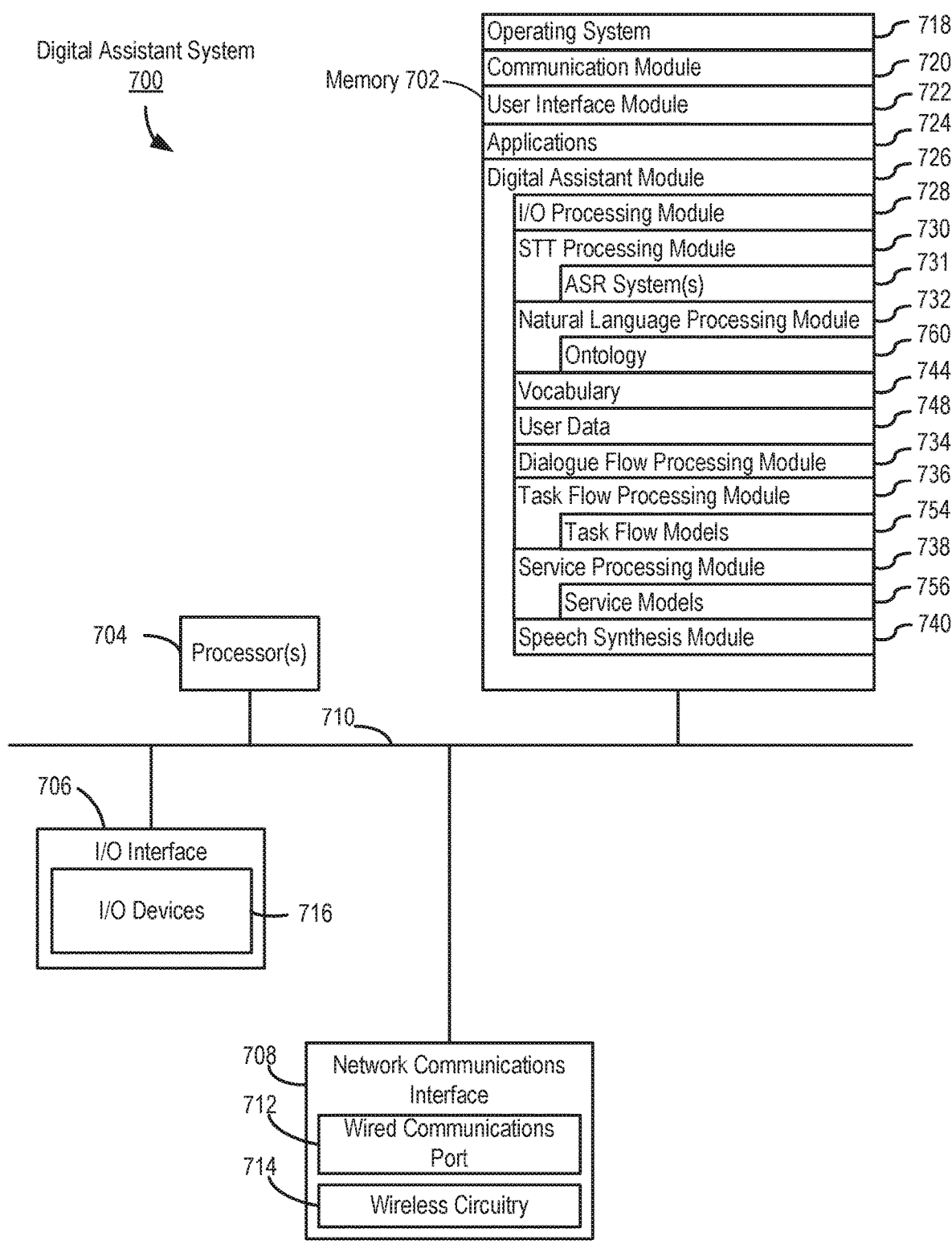
FIG. 7A is a block diagram illustrating a digital assistant system or a server portion thereof according to various examples.
Figure 8A:
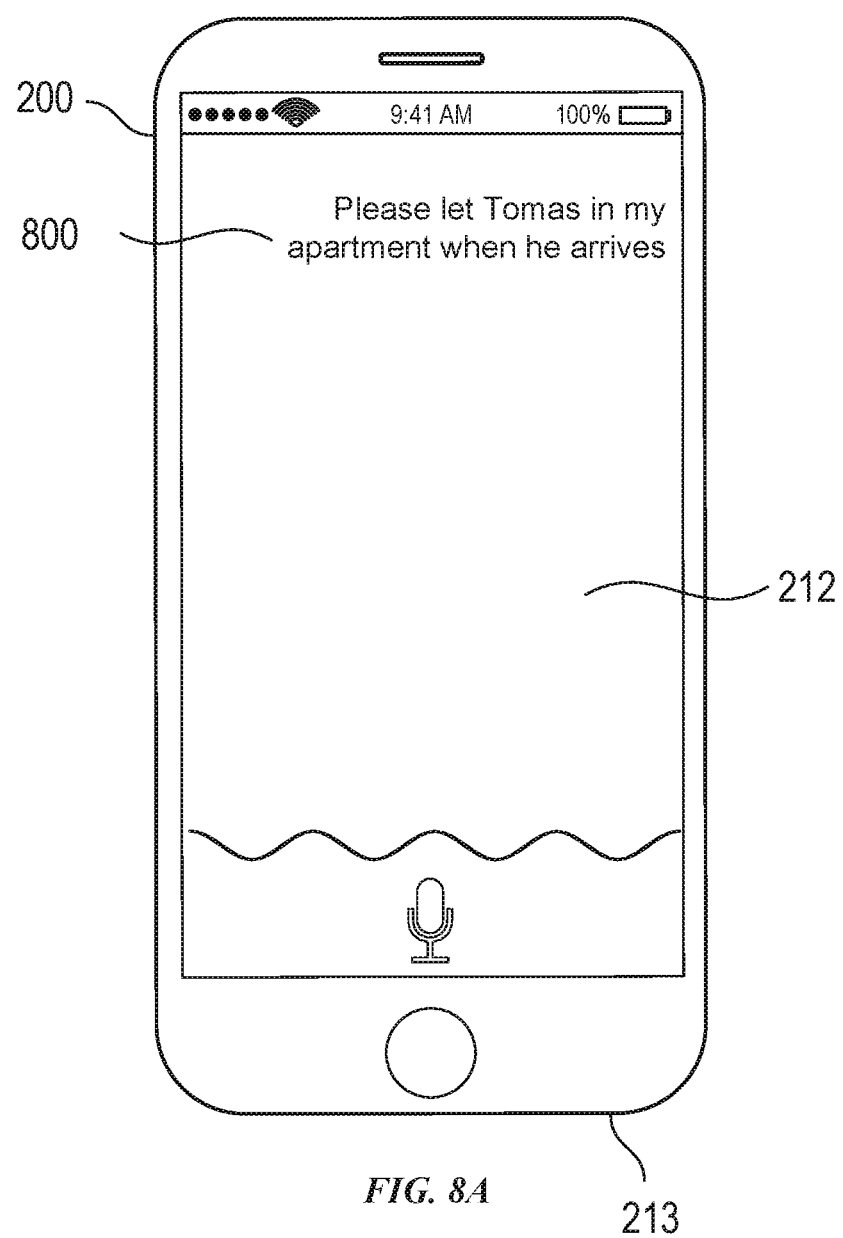
FIGS. 8A and 8D-8AA illustrate user interfaces for a personal electronic device according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, optionally can combine two or more components, or optionally can have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing process 900, described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
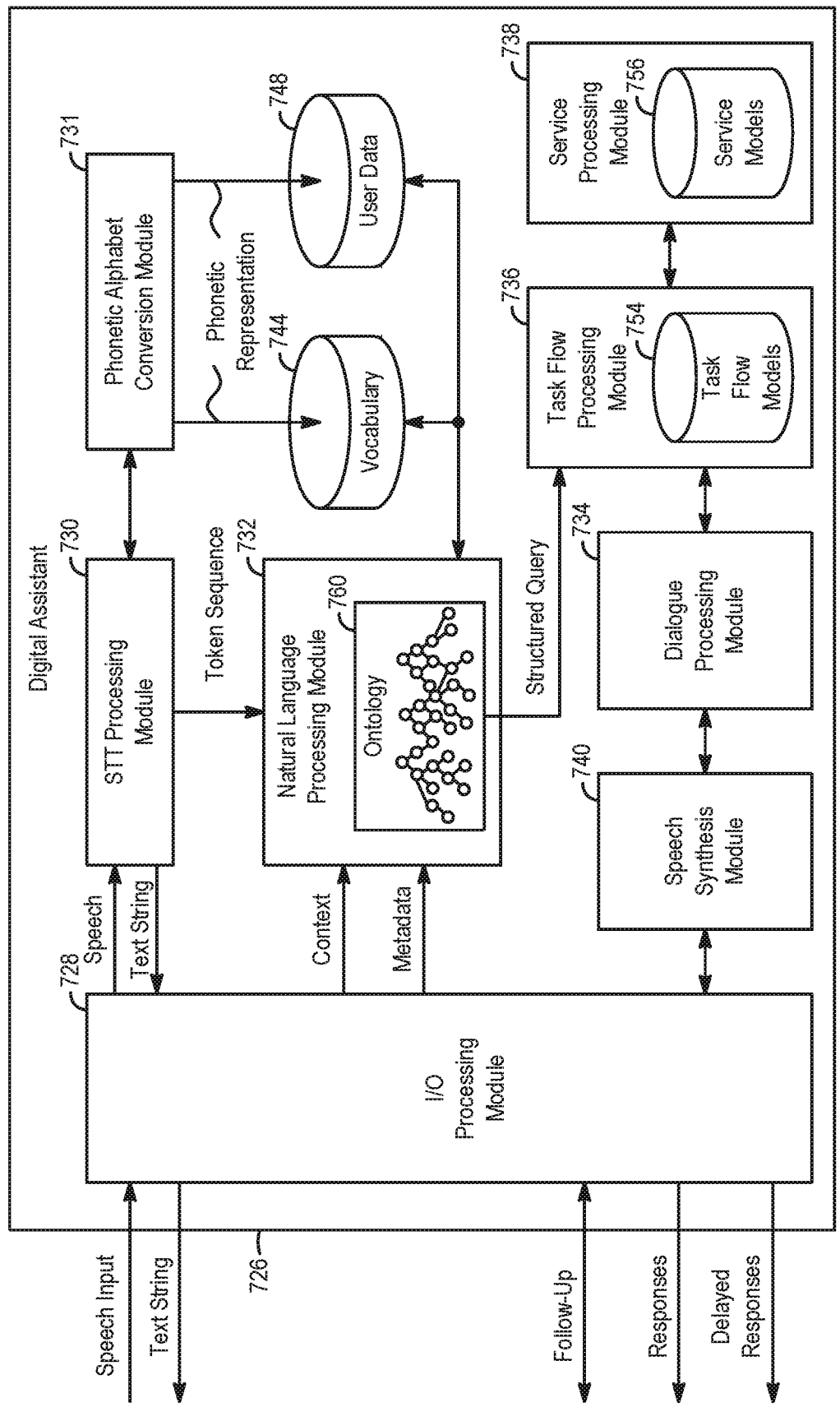
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary optionally can include the word "tomato" that is associated with the candidate pronunciations of /tə'meɪroʊ/ and /tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /tə'meɪroʊ/ corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /tə'meɪroʊ/ corresponds to the word "tomato," even if that particular sequence of phonemes is not one of the candidate sequence of phonemes for that word.

In some examples, natural language processing module 732 can be configured to receive metadata associated with the speech input. The metadata can indicate whether to perform natural language processing on the speech input (or the sequence of words or tokens corresponding to the speech input). If the metadata indicates that natural language processing is to be performed, then the natural language processing module can receive the sequence of words or tokens from the STT processing module to perform natural language processing. However, if the metadata indicates that natural language process is not to be performed, then the natural language processing module can be disabled and the sequence of words or tokens (e.g., text string) from the STT processing module can be outputted from the digital assistant. In some examples, the metadata can further identify one or more domains corresponding to the user request. Based on the one or more domains, the natural language processor can disable domains in ontology 760 other than the one or more domains. In this way, natural language processing is constrained to the one or more domains in ontology 760. In particular, the structure query (described below) can be generated using the one or more domains and not the other domains in the ontology.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
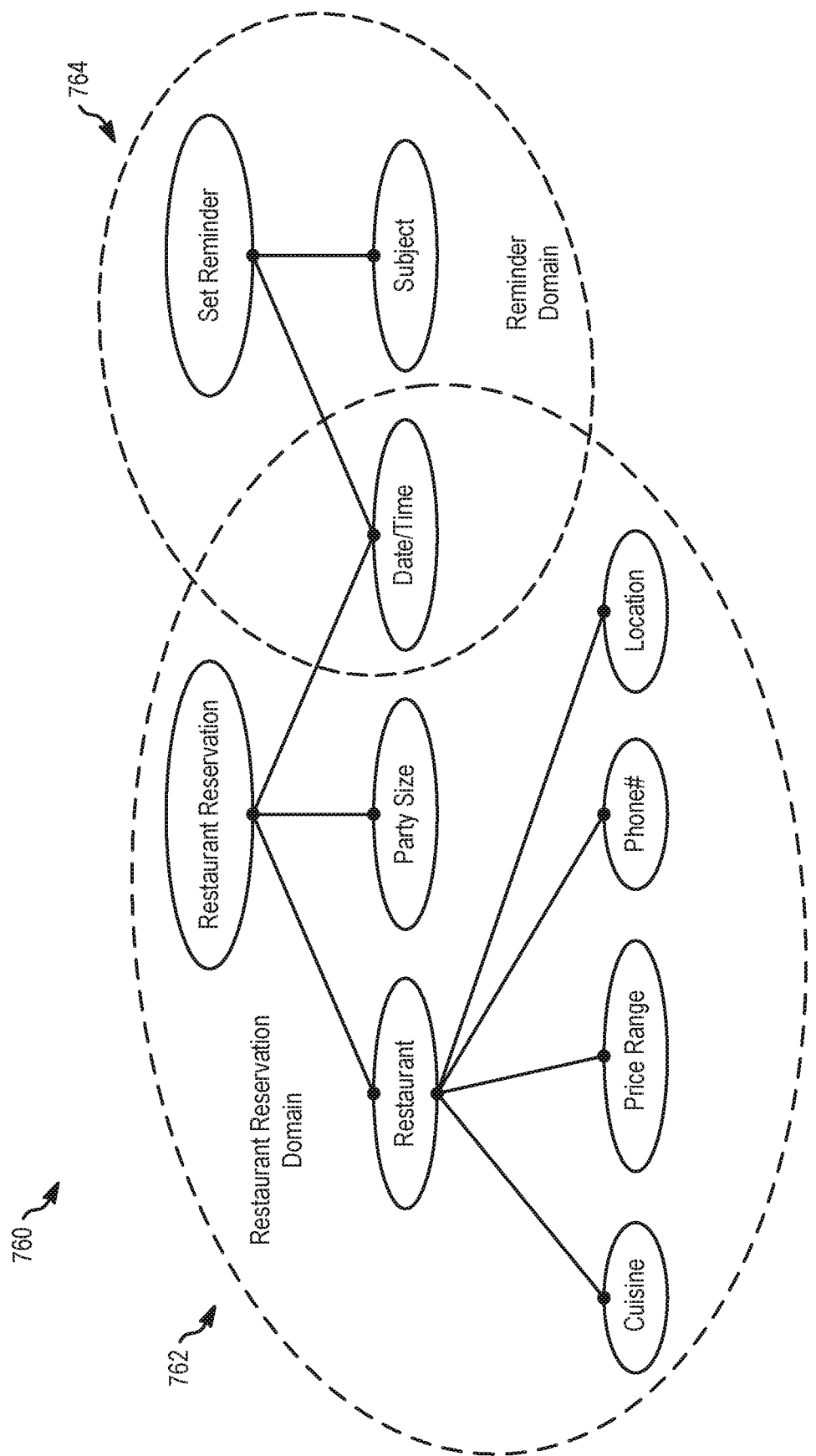
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "provide navigation instructions," "provide instructions for a task" and so on. A "send a message" domain can be associated with a "send a message" actionable intent node, and optionally can further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food,"

"drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain optionally can include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} optionally cannot be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 optionally can need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Figure 7D:
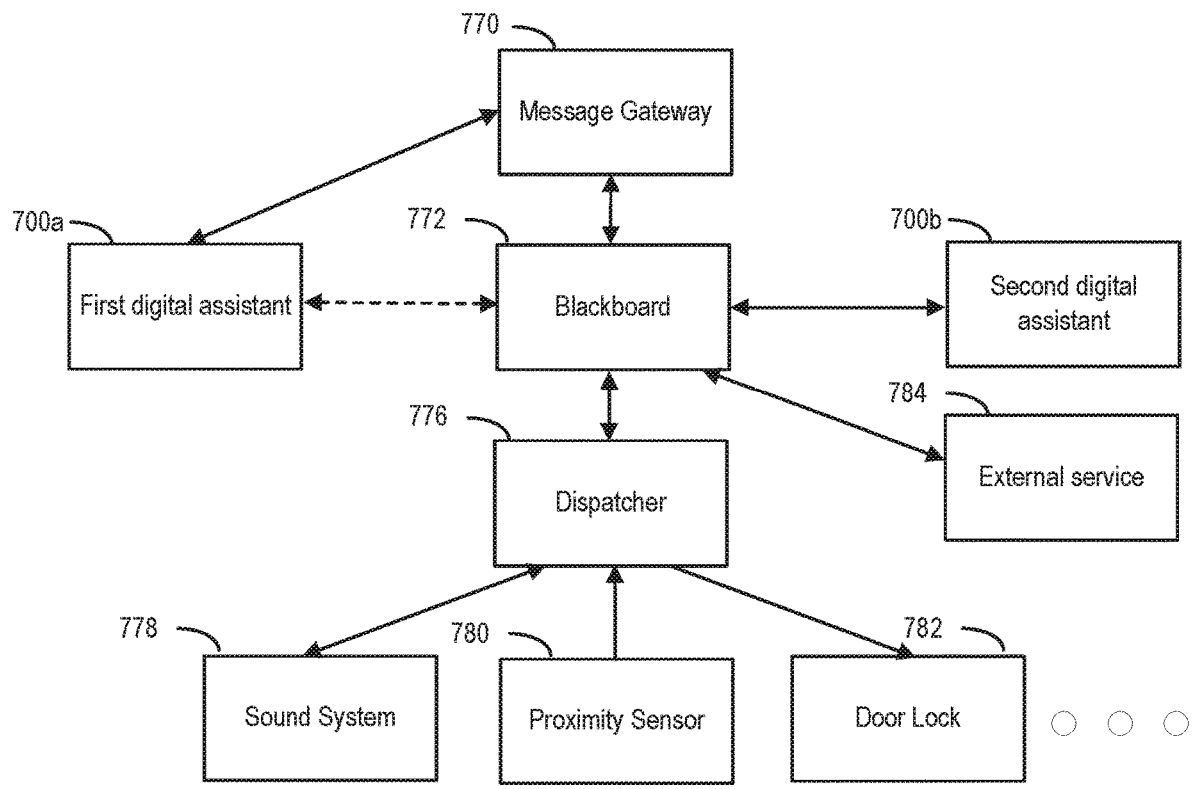
FIG. 7D illustrates an architecture for virtual assistant interactions according to various examples.

Referring to FIG. 7D, a block diagram architecture 766 is shown for virtual assistant interactions according to various examples. A first digital assistant 700a is shown, substantially as described above with regard to the digital assistant 700. The first digital assistant 700a is accessed by the user through a portable electronic device 200, according to some embodiments. A second digital assistant 700b is shown, substantially as described above with regard to the digital assistant 700. The second digital assistant 700b is accessed by a user through a human automation system hub, according to some embodiments. According to other embodiments, the second digital assistant 700b is accessed by a user through a portable electronic device 200, a television interface such as the Apple TV® digital media extender of Apple Inc. of Cupertino, Calif., a vehicle, or any other device through which a digital assistant 700 can be accessed.

The user digital assistant 700a is separate from the hub digital assistant 700b; the two digital assistants 700a, 700b are discrete entities. Each separate digital assistant 700a, 700b is associated with the same user, according to some embodiments; for example, the user digital assistant 700a may be accessed by the user through his or her portable electronic device 700a, and the hub digital assistant 700b may be accessed by the user through his or her home automation system. According to other embodiments, the different digital assistants 700a, 700b are associated with different users. For example, the first digital assistant 700a may be associated with a portable electronic device 200 owned by a first user, and the second digital assistant 700b may be associated with a portable electronic device 200 owned by a second user.

Intermediation between two discrete digital assistants 700a, 700b is performed by a message gateway 770, blackboard 772, and a dispatcher 776, according to some embodiments. According to some embodiments, at least one of the gateway 770, blackboard 772, and dispatcher 776 is included within the first digital assistant 770a or the second digital assistant 770a. According to other embodiments, at least one of the gateway 770, blackboard 772, and dispatcher 776 is separate from both the first digital assistant 700a and second digital assistant 700b, and is accessible by the DA server 106 associated with at least one of the digital assistants 700a, 700b. According to other embodiments, at least one of the gateway 700, blackboard 772 and dispatcher 776 is separate from both the first digital assistant 700a and second digital assistant 700b, and is accessible by the DA client 102 associated with at least one of the digital assistants 700a, 700b.

According to some embodiments, the first digital assistant 700a is configured to transmit one or more messages to, and receive one or more messages from, the message gateway 770. The messages may be SMS messages, messages utilizing the iMessage® software feature of Apple Inc., of Cupertino, Calif., or any other suitable message format. According to other embodiments, the first digital assistant 700a instead, or additionally, is configured to transmit one or more messages to, and receive one or more messages from, the blackboard 772.

According to some embodiments, the second digital assistant 700b is configured to transmit one or more messages to, and receive one or more messages from, the blackboard 772. The messages may be SMS messages, messages utilizing the iMessage® software feature of Apple Inc., of Cupertino, Calif., or any other suitable message format. According to other embodiments, the second digital assistant 700a instead, or additionally, is configured to transmit one or more messages to, and receive one or more messages from, the message gateway 770. The blackboard 772 provides for a loosely-coupled integration between different digital assistants 700, between one or more digital assistants 700 and the dispatcher 776, and/or between one or more digital assistants 700 and one or more sensors and/or actuators directly. When one of the components of the architecture 766 needs to communicate, it generates a message and transmits that message to the blackboard 772, where it is stored. The process of generating a message and transmitting it to the blackboard 772 where it is stored may be referred to as "posting" a message to the blackboard 772. Later, one or more of the components of the architecture 766 can retrieve that message from the blackboard 772, regardless of its origin. For example, where the message includes one or more actions, the dispatcher 776 checks the blackboard 772 for messages associated with one or more actions that can be performed by sensors and/or actuators associated with the dispatcher 776; when the dispatcher 776 finds one or more such messages, it retrieves them from the blackboard 772. The messages can be persistent in the blackboard 772, remaining in the memory of the blackboard 772 after their retrieval by a component of the architecture 766. Because the blackboard 772 stores messages regardless of their source, and allows retrieval of those messages by any component of the architecture 766, the blackboard 772 is highly scalable to accommodate the use of an arbitrarily large number of digital assistants 700, dispatchers 776, sensor, actuators, and other components. The physical location of execution of the blackboard 772 is flexible. As one example, the blackboard 772 runs on a server cluster in the cloud. As another example, the blackboard 772 runs on a portable electronic device 200 of the user, such as an iPhone® iPhone® or iPad® device from Apple Inc. of Cupertino, Calif. As another example, the blackboard 772 runs on a server or home automation device locally at the user's dwelling and/or office. As another example, the blackboard 772 is itself distributed among a number of different devices associated with the user.

When a component of the architecture 766 posts a message to the blackboard 772, in some embodiments, that component does not have information regarding which other component or components will read it. In this way, two or more of the components of the architecture need not have direct knowledge of or communication with one another. The lack of a requirement for direct knowledge of and communication with each individual component further provides for scalability of the blackboard 772 for user in arbitrarily large architectures 766. The blackboard 772 allows for geographic distribution of components of the architecture 776, which communicate through network connections and can be distributed across locations. Further, because the components of the architecture 766 need not have direct knowledge of or connection to one another, individual components can be changed, upgraded or redeployed more easily. For example, if a component is associated with an action in a message and that component is replaced with a new, different component associated with that action, the component that generated the message need not have any knowledge of that replacement; it generates the same message regardless of which component picks it up. Still further, the blackboard 772 provides for a resilient architecture 766. If a component of the architecture 766 is broken, missing, or otherwise nonfunctional, a different component of the architecture 766, such as a backup, can generate messages and/or pick up messages instead of the nonfunctional components, allowing for smooth continued operation of the architecture 766.

Each message may be in any suitable format. According to some embodiments, the messages include SMS messages, which allows for connectivity across devices utilizing a widely-adopted, low-bandwidth standard. According to some embodiments, the messages include messages utilizing the iMessage® software feature of Apple Inc., of Cupertino, Calif. According to some examples, all of the messages are in the same format. According to other examples, at least one of the messages is in a different format than the others. Because interactions between the components of the architecture 776 take place through simple messages containing text, the blackboard 772 allows individual components to be implemented in different programming languages, and to run on different platforms, while being able to work together by individually posting messages to and retrieving messages from the blackboard 772.

According to some embodiments, the blackboard 772 operates in an orchestration mode. In the orchestration mode, the blackboard 772 orchestrates performance of tasks and delegates the tasks to particular components of the architecture. The blackboard 772 devices which component is better able to execute a particular task based on the capabilities of that component, the location of that component, and the context of that component and of that task. For example, a person may request the virtual assistant 700 to "wake up my son an hour before his dentist appointment." In this particular example, the virtual assistant 700 disambiguates "son," using the contacts module 237 and a user designation of a particular contact as "son," and generates a message and transmits that message to the blackboard 772. That message includes a query about the time of the dentist appointment, and an action to wake the son an hour before then. In some embodiments of the orchestration mode, the blackboard 772 affirmatively determines which component of the architecture 766 to query about the time of the dentist appointment. In addition, in some embodiments of the orchestration mode, the blackboard 772 selects the component better suited to waking the son (e.g., the son's iPhone® device, iPad® device, Apple TV® digital media extender, home automation enabled by HomeKit*™ hardware and software technology, all of Apple Inc. of Cupertino, Calif.) and delegates the action of waking the son to that component.

According to some embodiments, the blackboard 772 operates in a subscription mode. In subscription mode, each component subscribes to the blackboard 772 for a particular task. For example, the dispatcher 776, which is associated with the door lock 782 subscribes to the blackboard 772 for the particular tasks of "unlock door lock 782" and "lock door lock 782." According to some embodiments, the door lock 782 (as well as other sensors and/or actuators) communicates directly with the blackboard 772 without intermediation by a dispatcher 776. The blackboard 772 delegates performance of that particular task to the component that subscribed to that particular task. As used in this document, the term "delegation" includes transmitting to a component subscribed to a task a notification that a message associated with that task has been received at the blackboard 772 to inform the component a message awaits retrieval; "delegation" also includes forwarding or otherwise transmitting that message to that component with or without a separate notification to that component.

According to some embodiments, the blackboard 772 operates in a distribution mode. In the distribution mode, a component of the architecture 766 such as the first digital assistant 700a determines which other components of the architecture 766 will be involved in execution of a task or set of tasks, and transmits to the blackboard 772 a request for the blackboard 772 to communicate messages to and from those components for task execution. The blackboard 772 then delegates performance of individual tasks to those components. For example, a user requests the first digital assistant 700a to "ask the iPad in my office to play jazz." In this example, the first digital assistant 700a identifies the iPad® device of Apple Inc. of Cupertino, Calif. in the office as the component of the architecture 766 that will play jazz, and transmits to the blackboard 772 a request for the blackboard 772 to communication messages to and from that particular iPad® device for task execution.

According to some embodiments, the blackboard 772 combines two or more of the orchestration mode, the subscription mode, and the distribution mode in the execution of one or more tasks. The flexibility provided by combining different modes allows the blackboard 772 to handle complex task execution.

The blackboard 772 is configured to transmit one or more messages to, and receive one or more messages from, the message gateway 770 and the dispatcher 776, according to some embodiments. In some embodiments, the message gateway 770 is configured to transmit and receive messages; the blackboard 772 is configured to store those messages in chronological order, and the dispatcher 776 is configured to interface with the physical world. For example, the dispatcher 776 is connected to a sound system 778, a proximity sensor 780, and a door lock 782. The dispatcher 776 is configured to control the sound system 778, to receive input from the proximity sensor 780, and to control the door lock 782. According to other examples, the dispatcher 776 is connected to more, fewer, or different items. Optionally, the first digital assistant 700a and/or second digital assistant 700b are configured to transmit one or more messages and/or commands to, and receive one or more messages and/or inputs from, the dispatcher 776 directly.

According to one example, the first digital assistant 700a transmits a message to the message gateway 770, which receives the message and forwards the message to the blackboard 772. The second digital assistant 700b retrieves that message from the blackboard 772. If the second digital assistant 700b takes action based on that message, the second digital assistant 700b transmits a message to the blackboard 772, which is forwarded to the dispatcher 776. The dispatcher 776 then, for example, actuates the door lock 782, allowing the door to be opened. While FIG. 7D shows two digital assistants 700a, 700b, this architecture 766 can be used to intermediate between any number of different digital assistants 700.

According to some embodiments, the blackboard 772 can connect to at least one external service 784. Such a connection may be made only when necessary, and need not be a permanent connection. According to some embodiments, the blackboard 772 can connect to an external service 784 providing information, such as weather information, restaurant information, traffic information; to an external service 784 providing a physical service, such as transportation or food delivery; or to any other type of external service 784 useful in executing a plan.

The blackboard 772 retains the messages that move through it in chronological order, sorted by association of those messages with a particular user request, according to some embodiments. The messages include information relating to the originator, as well as content, according to some embodiments. In some embodiments, the messages are retained indefinitely until the user request for service associated with those messages has been fulfilled. In some embodiments, the messages are retained for a long duration, such as six months or one year. In this way, the blackboard 772 allows not just for intermediation between or among two or more digital assistants 770, but also for tracking of actions that take a long time to fulfill. For example, an action may be contingent upon an input that is not received for days, weeks or months after the user request for service is made. Despite that passage of time, the blackboard 772 retains the messages associated with a particular user request, to allow delayed and/or contingent fulfillment of a user request. Intermediation is performed by storing messages chronologically, sorted by association of those messages with a particular user request, regardless of the origin of those messages. According to some embodiments, the blackboard 772 need not be used. Instead, according to some embodiments, particularly for simple plans, the first digital assistant 700a generates a plan that includes instructions for executing part of the plan at a later time, or in concert with a different electronic device. According to some embodiments, during execution of such a plan, the first digital assistant 700a sends at least one message directly to another device, or receives a direct input from an internal sensor of the electronic device 200 or device associated with the electronic device 200, or transmits a direct output to an internal actuator of the electronic device 200 or device associated with the electronic device 200.

The plan can be distributed, executed and/or delegated by different devices. The orchestration of instructions within a particular plan can be centralized—for example by the blackboard 772 in the architecture 766—or can be distributed with each device executing one or more instructions, and delegating other instructions to other devices.

Additional details on digital assistants can be found in the U.S. utility application Ser. No. 12/987,982, entitled "Intelligent Automated Assistant," filed Jan. 10, 2011, and U.S. utility application Ser. No. 13/251,088, entitled "Generating and Processing Task Items That Represent Tasks to Perform," filed Sep. 30, 2011, the entire disclosures of which are incorporated herein by reference.

FIGS. 8A and 8D-8AA illustrate exemplary user interfaces for interacting with a virtual assistant, in accordance with some embodiments. The user interfaces in these figures are used to illustrate the processes described below, including the exemplary processes in FIGS. 9A-9F.

Referring to FIG. 8A, an electronic device 200 includes a display 212 and a microphone 213 in accordance with some embodiments. A digital assistant, as described above, is accessed by a user, who utters unstructured natural language user input that is acquired via the microphone 213. Unstructured natural language user input refers to user speech that is not organized in a predefined manner, such as normal conversational speech. The timing of the user utterance is under the control of the user. The user input is converted from speech to text and, in accordance with some embodiments, the user request 800 is displayed in textual form on the display 212. By displaying the user request 800 in textual form, in accordance with some embodiments, the user can verify that the digital assistant has received correctly the request for service. In other embodiments, such as but not limited to embodiments in which the digital assistant is operable in a hands-free mode, the user request 800 is not displayed in textual form.

As illustrated in the example of FIG. 8A, the user requests that the digital assistant let a visitor (in this example, Tomas) into his apartment when that visitor arrives. The digital assistant determines whether the user request corresponds to at least one of a plurality of plan templates 802, as described below in greater detail relative to FIGS. 9A-9F. A plan template 802 includes a set of instructions 804 and corresponding inputs/outputs 806. As illustrated in the example of FIG. 8B, a generic plan template 802 includes a set of ordered instructions 804, beginning with one or more instructions 804 to gather information. According to some embodiments, the instructions 804 in the plan template 802 need not be ordered. According to some embodiments, the instructions 804 to gather information are performed later, and/or are omitted altogether. As seen in FIG. 8B, at least one instruction is associated with an input 806, according to some embodiments. Some inputs 806 are expected to be received in response to an instruction at substantially the same time as the instruction is executed. Some inputs 806, which are referred to as contingent inputs, are inputs without which the plan cannot complete execution. That is, execution of the plan is contingent upon receipt of contingent inputs. The contingent inputs are received at a later time than the plan is generated, according to some embodiments. The later time may be hours, days, weeks or months in the future. Contingent inputs are received from the user or from a different entity, as described in greater detail below. Also as seen in FIG. 8B, at least one instruction is associated with an output 806, according to some embodiments. The output 806 may include text, audio, video, an SMS message, an iMessage® message (referring to the iMessage® software feature of Apple Inc. of Cupertino, Calif.), multimodal output, a physical output, a notification, and/or any other suitable output. Output 806 is provided to the user or to a different entity, as described in greater detail below. One or more plan templates 802 are stored at the DA server 106 or server system 108, in some embodiments. According to some embodiments, one or more plan templates 802 are stored at the electronic device 200. As seen in FIG. 8B, in the stored plan template 802, prior to its use, the inputs/outputs 806 are placeholders. When the plan template 802 is utilized by the digital assistant to generate a plan, those placeholders are filled by the digital assistant, as shown in FIG. 8C.

The at least one plan template 802 can be considered to be a different kind of domain within the ontology 760, referring also to FIG. 7C. The domain associated with a plan template 802 is used by the virtual assistant to generate a plan that can wait for contingent input for an indefinite period of time or that can generate physical output, as opposed to fulfilling a task request within a few seconds of the time when that request is made. As described above, just as the ontology 760 can include a number of different domains each associated with a different task request (e.g., "find a movie," "provide navigation instructions"), the ontology can include a number of different plan templates 802 each associated with a different user request for service. Each plan template 802 is directed to a particular service provided by or interaction with the digital assistant.

For example, referring to FIG. 8C, an exemplary plan template 802 is shown, associated with the service "let a visitor into my home." The plan template 802 includes a number of instructions 804 associated with fulfilling the user request for service to "let a visitor into my home." In this exemplary plan template 802, several instructions 804 are associated with inputs. For example, one instruction 804 to gather information related to the specific door to open corresponds with an input 806 from the user of "front door." This may be particularly useful where the user's home has only one door (such as an apartment). In this exemplary plan template 802, one or more instructions 804 correspond to an output 806 such as a password, a greeting, or a notification to the user that a visitor has arrived. As with the inputs, in some embodiments, one or more of the instructions 804 default to a particular output 806. In this exemplary plan template 802, one or more instructions 804 correspond to a contingent input 806, such as waiting for a sensor to detect movement or waiting for a button press.

One or more of the instructions 804 default to a particular input, output or contingent input 806 in the absence of user input, in some embodiments. For example, where the user sets the default door to "front door," the user need not specify the particular door when requesting the service "let a visitor into my home." Optionally, one or more default values of input, output or contingent input 806 for at least one plan template 802 are configured at system setup by the user or by an entity other than the user. For example, a plan template for "receive calls from a family member" includes an output to "always answer a call from a family member" as a default value. The user can override or change the default, according to some embodiments. For example, if the user has limited mobility for medical reasons, the user can change the plan template for "receive calls from a family member" default output of "always answer a call from a family member" to "play family member a message that I am healthy but recovering from knee surgery."

As illustrated in the example of FIG. 8A, the user has requested the digital assistant to "let Tomas in my apartment when he arrives." The digital assistant determines that the user request corresponds to the plan template 802 described by FIG. 8C, "let a visitor into my home." The user has specified that Tomas is the person to let in, so the visitor name "Tomas" is an input 806 to the plan template. In this example, the digital assistant finds "Tomas" by comparing the name to the names of the user's contacts; finding only one name matching "Tomas," the digital assistant selects the "Tomas" in the user's contacts as the visitor. If the digital assistant finds more than one "Tomas" in the user's contacts, the digital assistant disambiguates "Tomas" in any suitable manner, such as by requesting more information from the user (e.g., Tomas' last name), or by presenting a "Tomas" from the contacts that the digital assistant determines is more likely to be the person intended by the user, and asking the user if that is the correct "Tomas." In this example, the input 806 associated with the "which door" instruction 804 defaults to the "front door," which is the only door in the user's apartment accessible to outside visitors. Also in this example, the inputs 806 associated with the "time expected" and "date expected" instructions 804 are optional. That is, the digital assistant has sufficient information to generate a plan with this plan template 802, even if no input 806 is received in association with the "time expected" and "date expected" instructions 804. This open-ended request is useful in many situations. For example, Tomas may not arrive for weeks, and the user may not know or specify arrival specifics.

Referring to FIG. 8D, the digital assistant begins to respond to the user request, acknowledging 808 that the user request for service has been received. Depending on the user's preference, which can be a default preference, a password is generated, or not generated. If a password is generated, the digital assistant transmits that password to Tomas, via an email or SMS contact address associated with Tomas in the user's contacts, according to some embodiments. The digital assistant requests approval from the user before transmitting the password, according to some embodiments.

Figure 8F:
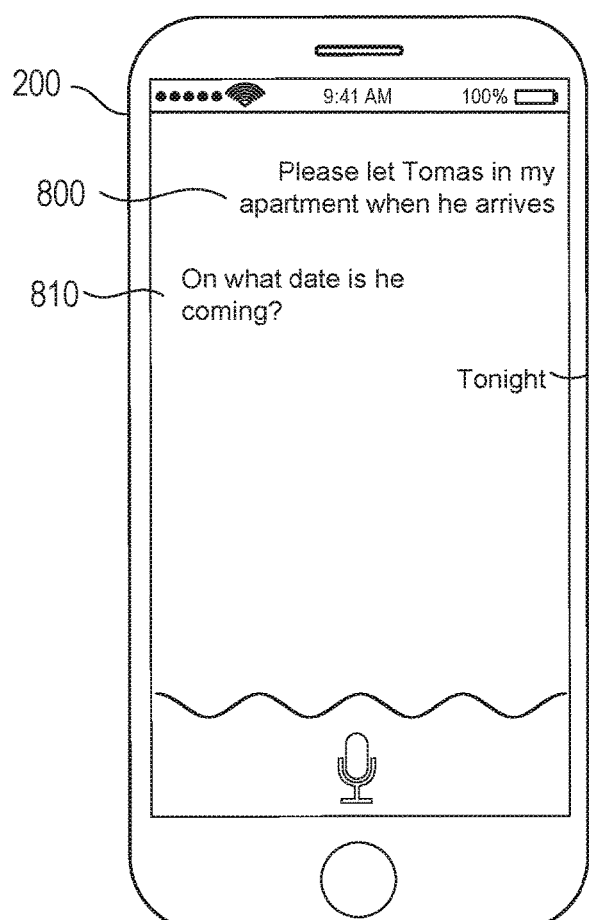
FIG. 8O is intentionally omitted to avoid any confusion between the capital letter O and the numeral 0 (zero).
FIGS. 8B-8C illustrate plan templates used in conjunction with the user interfaces of FIGS. 8A and 8D-8AA, and the process of FIGS. 9A-9F, according to some examples.
Figure 8G:
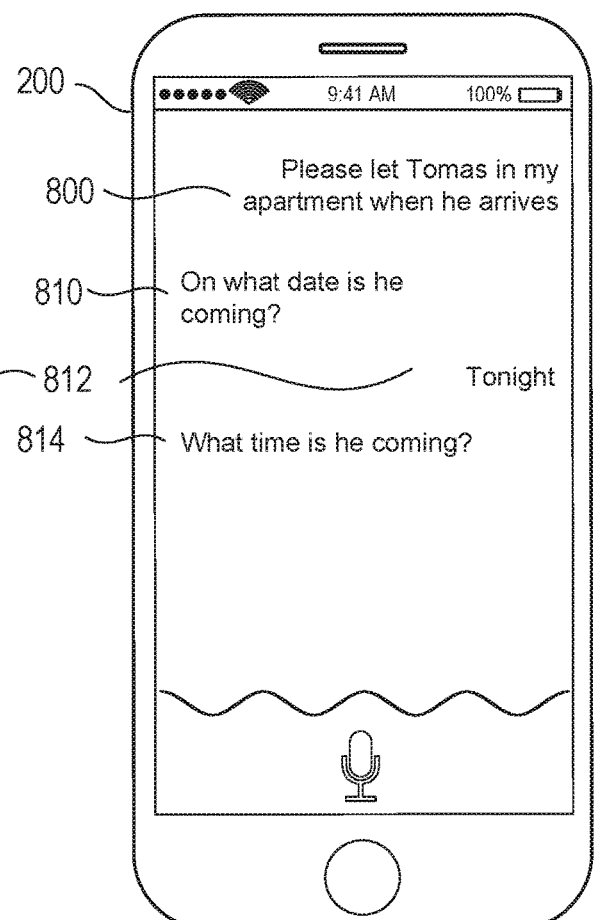

Referring to FIGS. 8E-8H, the inputs 806 associated with the "time expected" and "date expected" instructions in this particular example are not optional. Because those inputs 806 are not optional, the digital assistant has insufficient information to generate a plan with this plan template 802 if no input 806 is received in association with either of the "time expected" or "date expected" instructions 804. "Sufficient information" is the minimum information with which the digital assistant can generate a plan. Because the digital assistant cannot generate a plan based on the plan template 802 if it does not receive inputs associated with both the "time expected" and "date expected" instructions 804, the digital assistant initiates communication with the user to request sufficient information to generate a plan based on the plan template. As shown in FIG. 8E, the digital assistant requests 810 from the user: "on what date is he coming?" As shown in FIG. 8F, the user replies 812 with "tonight." The digital assistant recognizes that the word "tonight" is associated with the same date on which the user spoke the reply 812, and as a result obtains today's date from the calendar module 248 or other suitable source. The time at which the visitor is to arrive is still required, so as shown in FIG. 8G, the digital assistant requests 814 "what time is he coming?" As shown in FIG. 8H, the user replies with "about 8:00 p.m." Having received information associated with both the "time expected" and "date expected" instructions 804, the digital assistant now has sufficient information to generate a plan based on the plan template 802. By acquiring information about the expected time of arrival of the visitor, the digital assistant prepares to receive input from the visitor in temporal proximity to that expected time, according to some embodiments. In some embodiments, the digital assistant is able to save power at the electronic device 200 by placing the execution of the plan on hold until a short time before the visitor is expected, thereby increasing battery life of the electronic device.

As another example, in order to determine when the visitor is arriving, the digital assistant initiates communication with the visitor directly. The digital assistant sends an iMessage® message 818 (referring to the iMessage® software feature of Apple Inc. of Cupertino, Calif.) to Tomas, such as through the instant messaging module 241, asking "Tomas, when will you arrive at Pierre's apartment?" As other examples, the digital assistant contacts Tomas through other modalities, such as SMS messaging, voice communication, and/or electronic mail. The digital assistant itself initiates this contact with Tomas, using information associated with Tomas stored in or accessible through the contacts module 237. In response, Tomas transmits a message 820 back to the digital assistant, responding "in a couple of hours." The digital assistant disambiguates this response based on the current time, which is kept locally on the electronic device 200 and/or transmitted as a signal by a wireless carrier or other service provider and received at the electronic device 200. The digital assistant adds two hours to the current time and then determines the date associated with that time (for example, if the current time is 11:20 p.m., then the addition of two hours to that time results in an expected arrival date one day later than the current date). In response, the digital assistant optionally sends a reply message 822 to Tomas, acknowledging Tomas' response: "OK, thanks!"

Referring to FIG. 8C, according to some embodiments, the plan template 802 requires the digital assistant to generate a password. By requiring a password to enter the user's apartment, an additional layer of security is provided. In this example, the user is named Pierre, and both the apartment and the digital assistant that generates the password are Pierre's. The digital assistant transmits the password directly to the visitor according to some embodiments. Referring to FIG. 8L, Tomas receives at his electronic device 200a, which is a separate, different device from the electronic device 200 of the user Pierre, a message from Pierre's digital assistant: "Pierre expects you at 8:30 p.m. Your password is 'teakettle five.'" Pierre's digital assistant does not message Pierre or alert Pierre at all, according to some embodiments. That is, according to some embodiments, the digital assistant of a first person initiates communication with a second, different person based on the plan template 802, without being directly commanded or instructed to do so by the first person, and according to some embodiments, without notifying the first person.

Upon arriving at the apartment, referring also to FIG. 7D, a proximity sensor 780 mounted at or near the door to the apartment recognizes the presence of a person at the door, according to some embodiments. As another example, according to other embodiments, the presence of a visitor is recognized upon the visitor actuating a doorbell, buzzer, or other control, where a digital assistant 700b with authority to control the door lock 782 is configured to receive a notification when such a doorbell, buzzer, or other control is actuated. As another example, according to other embodiments, the presence of a visitor is recognized upon the visitor speaking into a microphone, where the digital assistant 700b with authority to control the door lock 782 is configured to receive a notification upon hearing speech or noise above a particular threshold in proximity to the door. As another example, according to other embodiments, the visitor has his or her own portable electronic device 200, which detects its presence in proximity to the apartment using GPS technology or other position determination technology. In such an example, upon nearing the apartment, the visitor's portable electronic device 200 makes contact with the digital assistant 700b with authority to control the door lock 782, such as through the architecture 766 shown in FIG. 7D and described in greater detail below. As another example, upon moving into proximity to Pierre's apartment, the digital assistant 700b with authority to control the door lock 782 makes contact with the visitor's portable electronic device 200 via BLUETOOTH® wireless technology or other connection, and queries that portable electronic device 200 to determine whether it belongs to Tomas.

Recognizing that a person is at the door, the digital assistant 700b with authority to control the door lock 782 requests, over a speaker, on a screen by the door, on the electronic device 200 of Tomas, or in any other suitable manner, that Tomas provide his name, according to some embodiments. In this example, Tomas speaks his name. The digital assistant 700b then requests the password. Tomas communicates the password to the digital assistant 700b, such as through a microphone that forms part of the sound system 778. Upon determining that the password provided by Tomas matches the expected password, the digital assistant 700*b* transmits a message to the blackboard 772, which is forwarded to or retrieved by the dispatcher 776, for the dispatcher 776 to unlock the door lock 782. After unlocking the door for Tomas, the digital assistant 700*b* alerts the user Pierre, according to some embodiments. In this example, the digital assistant 700*b* transmits a message to the blackboard 772, which is forwarded to or retrieved by the message gateway 770 and then transmitted onward to Pierre's digital assistant. Referring to FIG. 8M, the digital assistant of Pierre displays a message 826 on the electronic device 200: "Pierre, Tomas has arrived at your apartment. I let him in." Optionally, the digital assistant waits for the proximity sensor 780 to cease detecting a human presence outside the door before messaging the user Pierre that Tomas has arrived.

In this example, the blackboard 772 provided for intermediation between three different digital assistants: Pierre's digital assistant 700*a*, Tomas' digital assistant 700, and the digital assistant 700*b* at Pierre's apartment. As discussed above, the blackboard 772 retains the messages that move through it in chronological order, sorted by association of those messages with a particular user request, according to some embodiments. By receiving, storing, and transmitting (or allowing retrieval of) those messages by all three digital assistants 700 involved in the user request to "let Tomas in my apartment when he arrives," the user intent expressed in that user request is effectuated. The blackboard 772 stores the messages received from and sent to each digital assistant 700, providing a location that any of the three separate digital assistants can search in order to find information relating to the user request. The plan generated by the user's digital assistant 700, based on the plan template 802 corresponding to the user request, includes instructions and/or information relating to the other digital assistants 700 that are involved in effectuating the user request, according to some embodiments.

Further, in this example, Pierre's digital assistant 700*a* has communicated with the digital assistant 700*b* associated with Pierre's apartment prior to Tomas' arrival; otherwise, the digital assistant 700*b* associated with Pierre's apartment would not be able to assist in the execution of the plan. In the interest of clarity, communication between the digital assistants 700*a*, 700*b* prior to the arrival of Tomas is not described in detail. However, according to some embodiments, executing the plan includes identifying other entities, such as other digital assistants 700*b*, to which output is provided and from which input is received, and to which performing at least one of the instructions and sub-tasks included in the plan are delegated, in order to effectuate the plan. In this example, performance of at least some of the instructions of the plan was delegated from Pierre's digital assistant 700*a* to the digital assistant 700*b* associated with Pierre's apartment.

Returning to FIGS. 8A and 8C, the user's digital assistant generates a plan to fulfill a user request 800 based on the plan template 802. As described above, the plan template includes one or more contingent inputs, as an example. At least one contingent input has an expected value; for example, the expected value for a contingent input of a password is a voice or keyboard input of that password. If the received contingent input does not match the expected value, is received at the wrong time, or otherwise is not expected, that is an exception. As used in this document, the term "exception" refers to an unexpected input or event that is not consistent with the plan to fulfill a user request 800 based on the plan template 802.

Figure 8N:
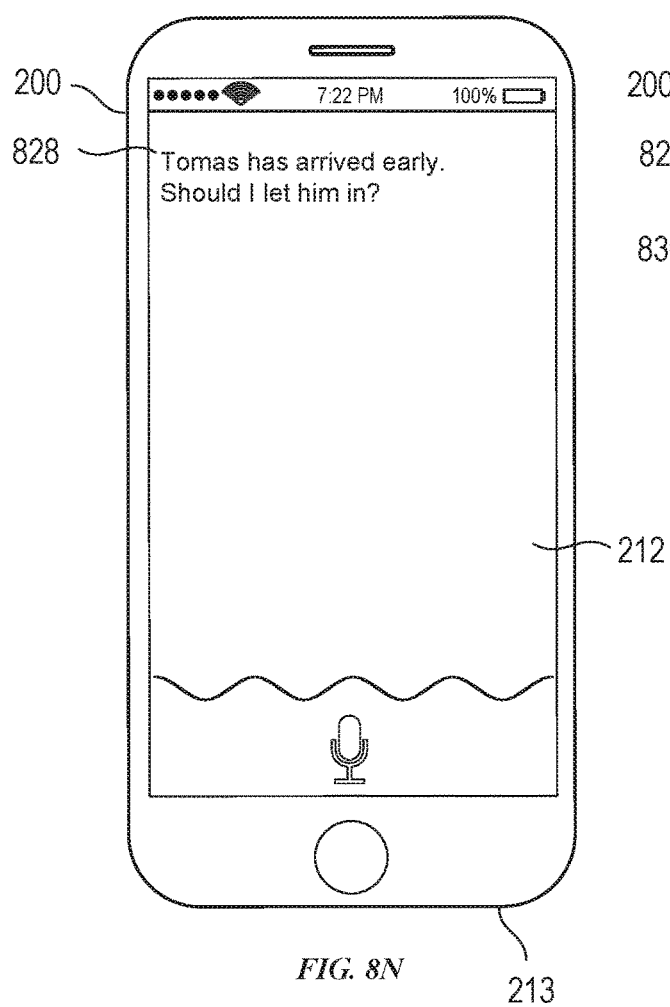
Figure 8P:
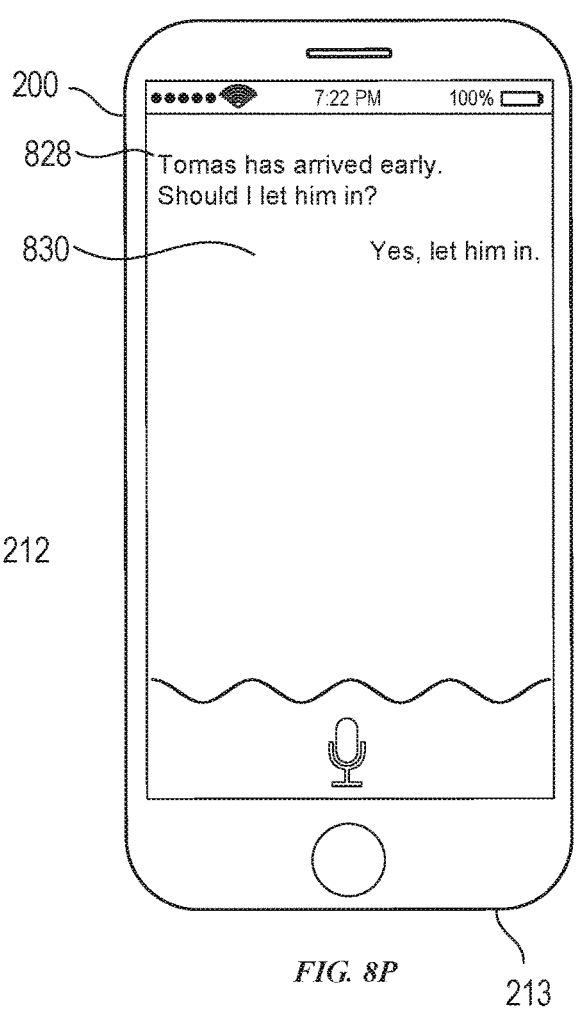
Figure 8Q:
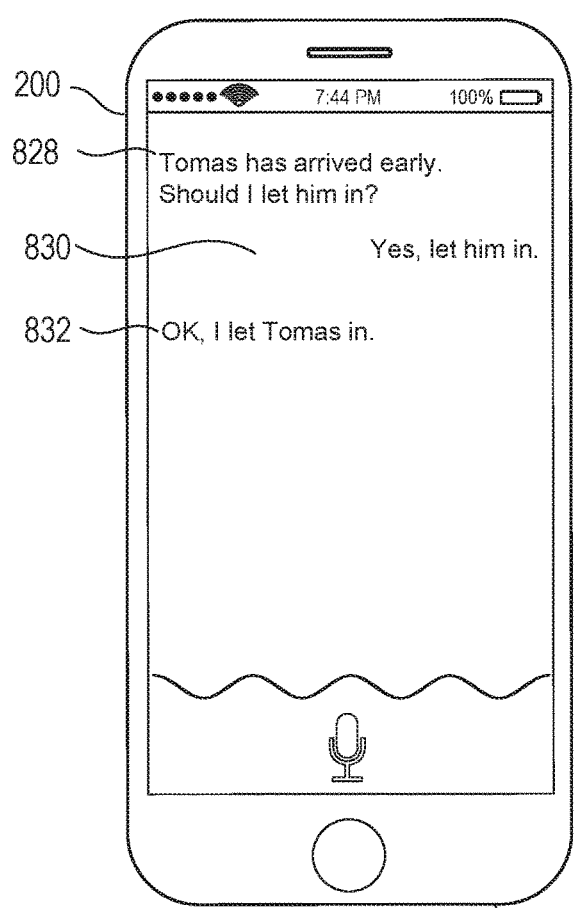

Referring to FIG. 8N, as one example of an exception, the digital assistant 700*b* associated with Pierre's apartment verifies that Tomas has arrived at the door. The digital assistant 700*b* does so as described above with regard to FIGS. 8L-8M, according to some embodiments. However, Tomas has arrived early: at 7:22 p.m. In this example, Tomas was expected at approximately 8:00 p.m. This is an exception to the plan. Referring also to FIG. 7D, according to some embodiments, the digital assistant 700*b* associated with Pierre's apartment generates a message that Tomas is at the door; that message travels through the blackboard 772 and message gateway 770 to Pierre's digital assistant, which in this example is shown as digital assistant 700*a*. Pierre's digital assistant 700*a* recognizes the time discrepancy between Tomas' actual arrival and his expected arrival, identifying the exception. Optionally, Pierre's digital assistant 700*a* first determines if a rule is present in the plan template 802 for handling the early arrival of a visitor; in this example, there is not. Finding no rule, Pierre's digital assistant 700*a* handles the exception by causing a message 828 to be displayed on the display 212 display 212 of Pierre's electronic device 200: "Tomas has arrived early. Should I let him in?" Referring to FIG. 8P, Pierre tells the digital assistant 700*a*, "Yes, let him in"; the digital assistant 700*a* displays that message 830 on the electronic device 200 according to some embodiments. Pierre's digital assistant 700*a* transmits this message to the message gateway 770, which forwards the message 830 to the blackboard 772. The digital assistant 700*b* associated with Pierre's apartment is forwarded the message 830 by the blackboard 772, or retrieves the message 830 from the blackboard 772. The digital assistant 700*b* then causes the dispatcher 776 to unlock the door lock 782, as described in the previous example. Also as described in the previous example, the digital assistant 700*b* generates a message that travels to Pierre's digital assistant 700*a*, indicating that the door has been unlocked. Referring also to FIG. 8Q, Pierre's digital assistant 700*a* displays this information to Pierre with the message 832: "OK, I let Tomas in." The plan generated to let Tomas in when he arrives is now complete.

Figure 8R:
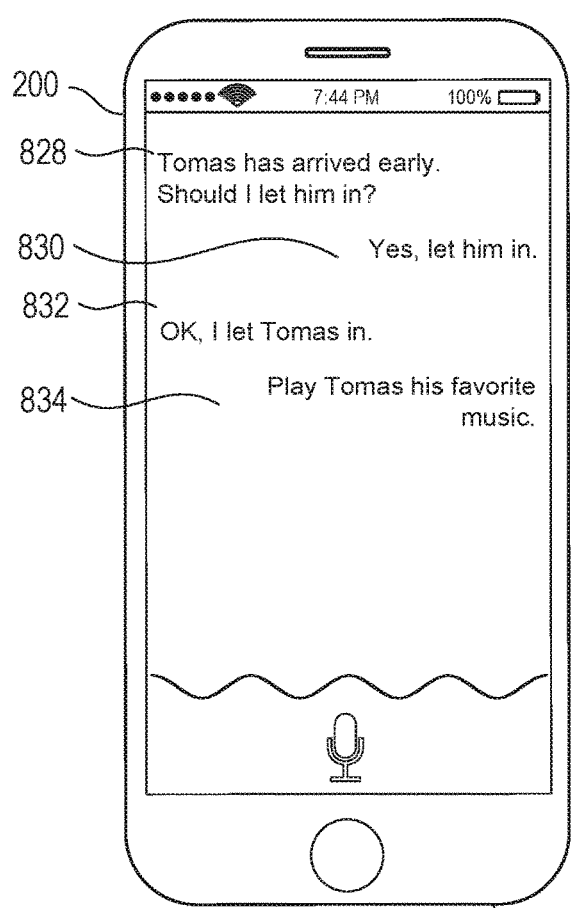

Pierre may wish to make his guest more comfortable while he waits. Referring to FIG. 8R, Pierre utters a new user request 834 for service: "Play Tomas his favorite music." As described above with the initial user request, Pierre's digital assistant 700*a* determines whether the user request corresponds to at least one of a plurality of plan templates 802. Pierre's digital assistant 700*a* finds such a plan template 802, which includes one required input associated with Tomas' favorite music.

Figure 8S:
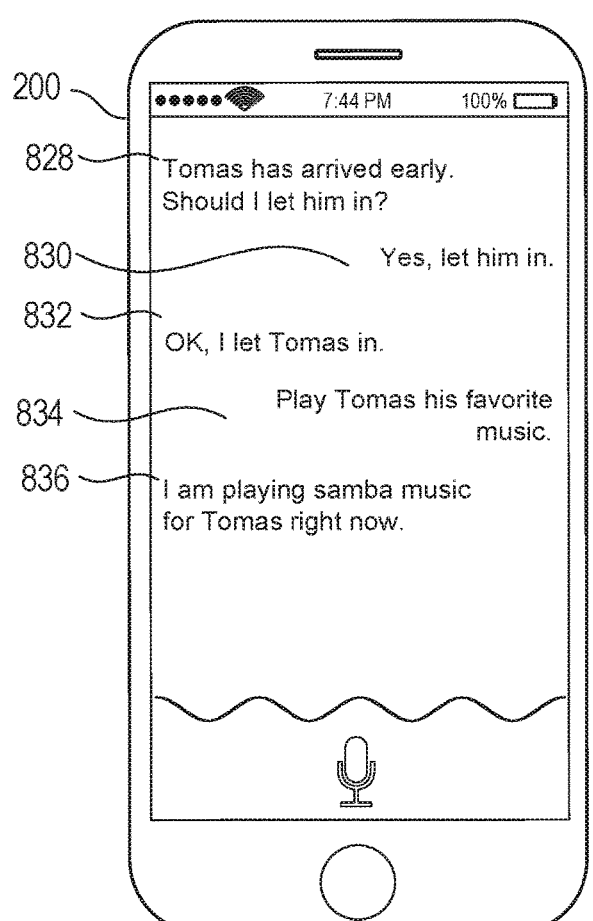

In order to obtain sufficient information to generate a plan based on that plan template, Pierre's digital assistant 700*a* obtains information about Tomas' favorite music. As one example, Pierre's digital assistant 700*a* initiates communication with Tomas' digital assistant. This communication occurs through the blackboard 772 of FIG. 7D, according to some embodiments. According to other embodiments, this communication occurs directly between the digital assistants without intermediation by the blackboard 772. Contact information for Tomas' digital assistant is associated with Tomas' contact information, allowing Pierre's digital assistant to proceed. Regardless of the path taken, Tomas' digital assistant receives a message from Pierre's digital assistant 700*a* requesting information about Tomas' favorite music. Tomas' digital assistant takes any privacy-based action here that is set by Tomas, according to some embodiments. While it may block requests for such information from unknown sources, Tomas' digital assistant recognizes that Pierre is a friend, and transmits back to Pierre's digital assistant 700a the fact that Tomas likes samba music. This information is a required input for Pierre's digital assistant 700a to generate a plan, allowing Pierre's digital assistant 700a to generate a plan based on the plan template. Pierre's digital assistant 700a transmits a message to the blackboard 772 via the message gateway 770, requesting the digital assistant 700b at Pierre's apartment to play samba music. The digital assistant 700b at Pierre's apartment is forwarded the message 830 by the blackboard 772, or retrieves the message 830 from the blackboard 772. The digital assistant 700b then causes the sound system 778 to play samba music, such as through the Apple Music or iTunes Radio$^{SM}$ streaming music services of Apple Inc. of Cupertino, Calif. Also as described in the previous example, the digital assistant 700b generates a message that travels to Pierre's digital assistant 700a, indicating that samba music is being played for Tomas. Referring to FIG. 8S, Pierre's digital assistant 700a displays this information to Pierre with the message 836: "OK, I let Tomas in." The plan generated to let Tomas in when he arrives is now complete. The message 836 "OK, I let Tomas in" implies that Pierre's digital assistant executed the plan on its own. While that is not the case, it would be cumbersome and confusing for Pierre's digital assistant to attempt to explain to Pierre the details of the digital assistant 700a, 700b interactions that executed the plan; it is simpler for Pierre's digital assistant 700a to take credit for that successful execution.

Figure 8T:
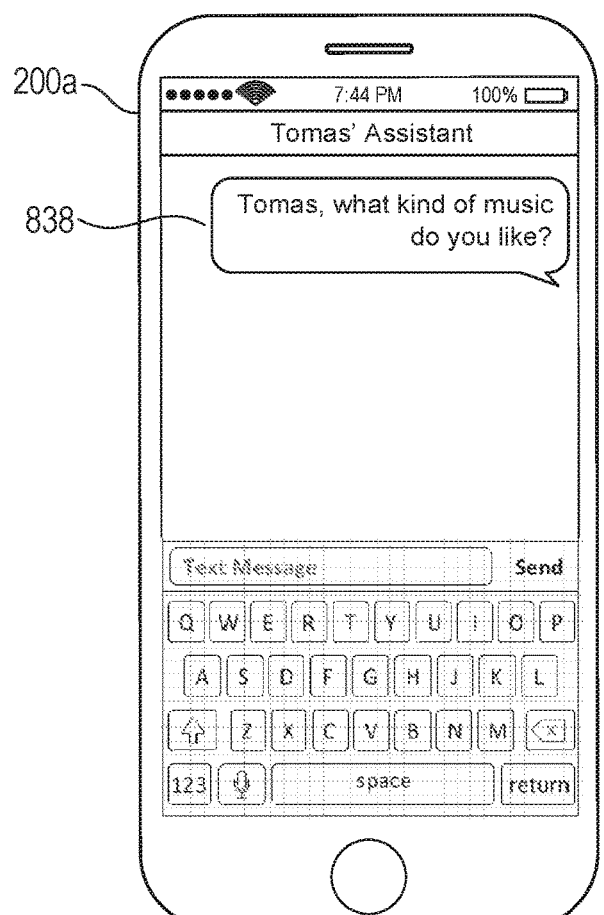
Figure 8U:
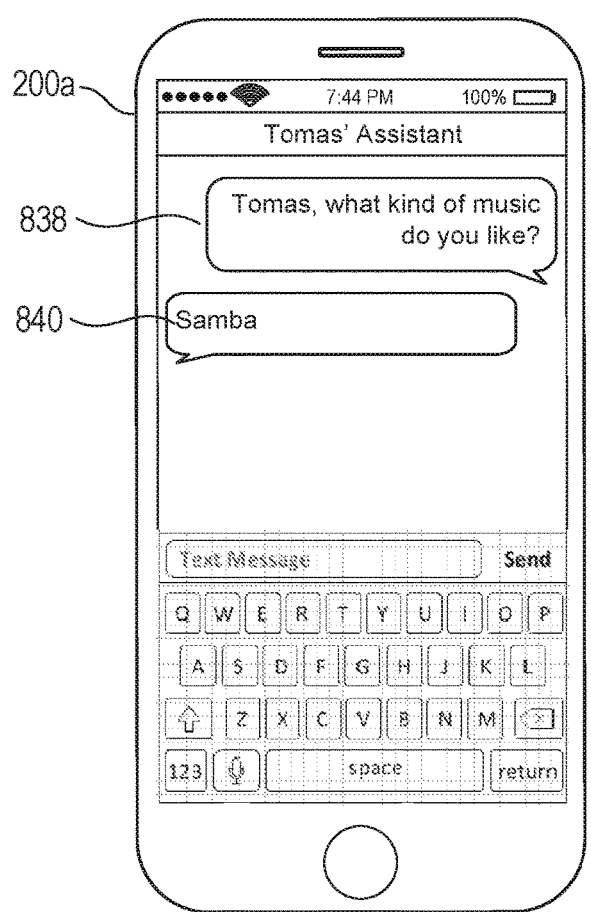
Figure 8V:
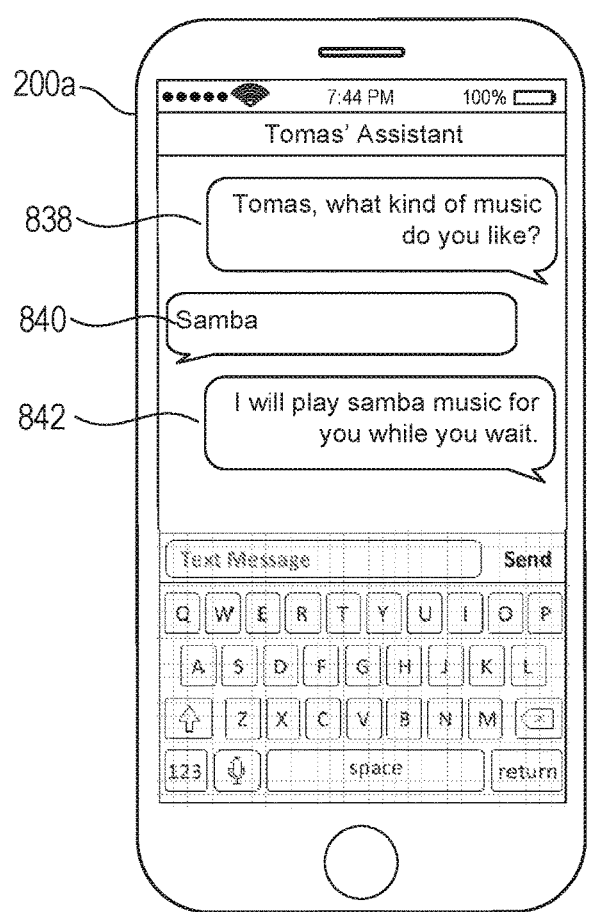
Figure 8W:
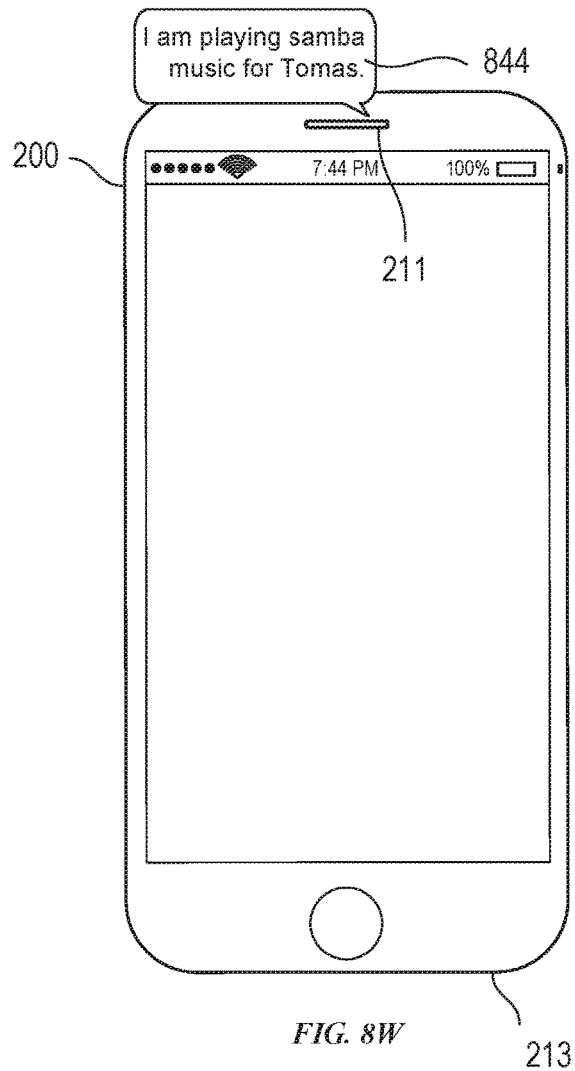

Referring to FIG. 8T, as another example, Pierre's digital assistant 700a initiates communication with Tomas to ask Tomas to identify his favorite music. This communication occurs through the blackboard 772 of FIG. 7D, according to some embodiments. According to other embodiments, this communication occurs directly between the digital assistants without intermediation by the blackboard 772, such as by phone-to-phone SMS messaging through a wireless carrier. Contact information for Tomas' digital assistant is associated with Tomas' contact information, allowing Pierre's digital assistant to proceed. Regardless of the path taken, Tomas' digital assistant receives on his electronic device 200a a message 838 from Pierre's digital assistant 700a, requesting information about Tomas' favorite music. Referring to FIG. 8U, Tomas responds 840 with "samba." Tomas' message is transmitted to Pierre's digital assistant via the blackboard 772 or by direct communication, as described above. This information is a required input for Pierre's digital assistant 700a to generate a plan, allowing Pierre's digital assistant 700a to generate a plan based on the plan template. Pierre's digital assistant 700a transmits a message to the blackboard 772 via the message gateway 770, requesting the digital assistant 700b at Pierre's apartment to play samba music. The digital assistant 700b at Pierre's apartment is forwarded the message 830 by the blackboard 772, or retrieves the message 830 from the blackboard 772. The digital assistant 700b then causes the sound system 778 to play samba music, such as through the Apple Music or iTunes Radio$^{SM}$ streaming music services of Apple Inc. of Cupertino, Calif. Also as described in the previous example, the digital assistant 700b generates a message that travels to Tomas' digital assistant, indicating that samba music will be played for Tomas. Referring to FIG. 8V, Tomas' digital assistant displays this information to Tomas with the message 842: "I will play samba music for you while you wait." The plan generated to play Tomas his favorite music is now complete. Optionally, the digital assistant 700b generates a message that travels to Pierre's digital assistant 700a, indicating that samba music is being played for Tomas. As seen in FIG. 8W, this message 844 is provided to Pierre via a speaker in the electronic device 200: "I am playing samba music for Tomas." Based on user context, device context, and/or express user preferences, messages between digital assistants are provided to their respective users in different manners, according to some embodiments. For example, when the device context indicates that the electronic device 200 is in a hands-free mode, messages received by a digital assistant associated with that electronic device may be provided to the user as audio output via the speaker 211, rather than visual output via the display 212.

Figure 8X:
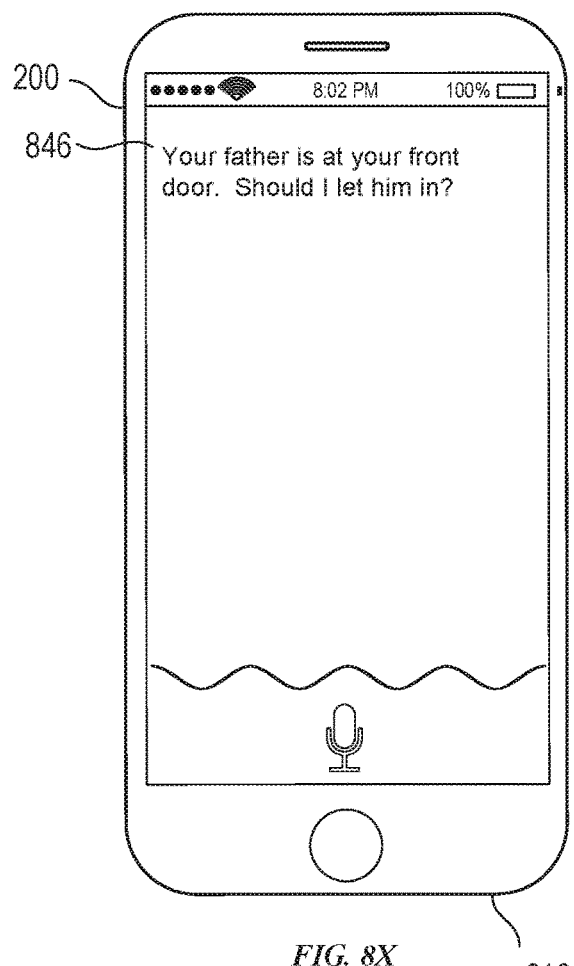
Figure 8Y:
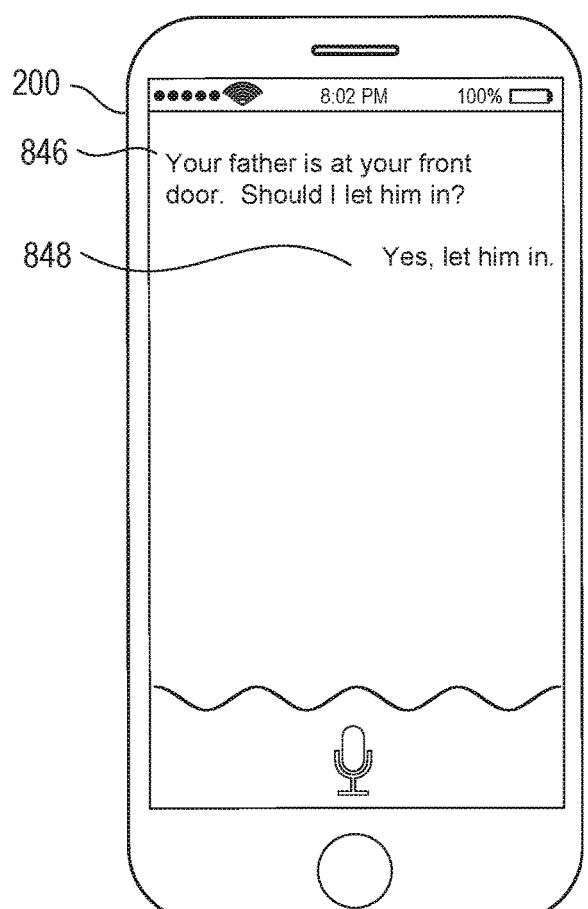

Returning to exception handling, and with reference to the first example, Pierre's digital assistant 700a generated a plan to let Tomas into his apartment. During execution of that plan, the digital assistant 700b associated with Pierre's apartment awaits contingent input associated with Tomas' arrival. Referring to FIG. 8X, as one example of an exception, the digital assistant 700b recognizes that a visitor has arrived at the door, but that visitor is not Tomas. The digital assistant 700b is expecting Tomas at approximately 8 p.m. However, a visitor other than Tomas has arrived. This is an exception to the plan. In this example, the visitor is Pierre's father. The digital assistant 700b recognizes that it is Pierre's father by matching the name given by the visitor to a contact identified as "father" in Pierre's contacts, in some embodiments. According to some embodiments, the digital assistant 700b performs facial recognition on the visitor, and based on that facial recognition, identifies the visitor as Pierre's father. According to other embodiments, the digital assistant 700b recognizes the visitor as Pierre's father in any other suitable manner. Pierre's digital assistant 700a recognizes the identity discrepancy between Tomas and Pierre's father, identifying the exception. Referring also to FIG. 7D, according to some embodiments, the digital assistant 700b associated with Pierre's apartment generates a message that Pierre's father is at the door; that message travels through the blackboard 772 and message gateway 770 to Pierre's digital assistant 700a, which in this example is shown as digital assistant 700a. Pierre's digital assistant 700a recognizes the identity discrepancy between Tomas and Pierre's father, identifying the exception. Optionally, Pierre's digital assistant 700a first determines if a rule is present in the plan template 802 for handling the arrival of a different visitor; in this example, there is not. Referring to FIG. 8X, finding no rule, Pierre's digital assistant 700a handles the exception by causing a message 846 to be displayed on the display 212 of Pierre's electronic device 200: "Your father is at your front door. Should I let him in?" Referring to FIG. 8Y, Pierre tells the digital assistant 700a, "Yes, let him in"; the digital assistant 700a displays that message 848 on the electronic device 200 according to some embodiments. Pierre's digital assistant 700a transmits this message to the message gateway 770, which forwards the message 830 to the blackboard 772. The digital assistant 700b associated with Pierre's apartment is forwarded the message 830 by the blackboard 772, or retrieves the message 830 from the blackboard 772. The digital assistant 700b then causes the dispatcher 776 to unlock the door lock 782, as described in the previous example. The plan generated to let Tomas in when he arrives is not complete, because Tomas has not yet arrived. However, the exception has been handled by admitting Pierre's father to the apartment. As a different example, the plan template 802 includes a rule to admit family members at any time, which results in admittance of Pierre's father to Pierre's apartment without the need to obtain additional information for exception handling.

Figure 8Z:
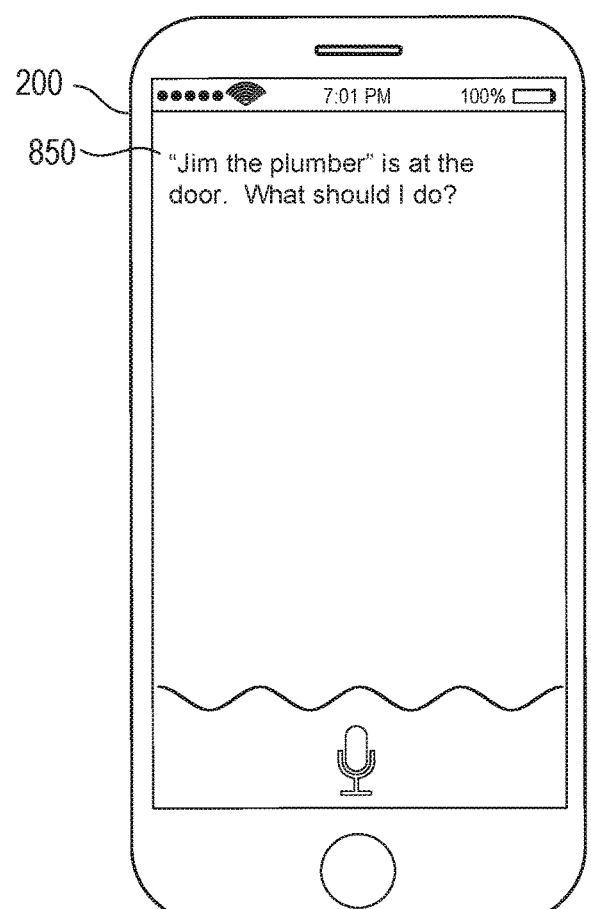
Figure 8A:
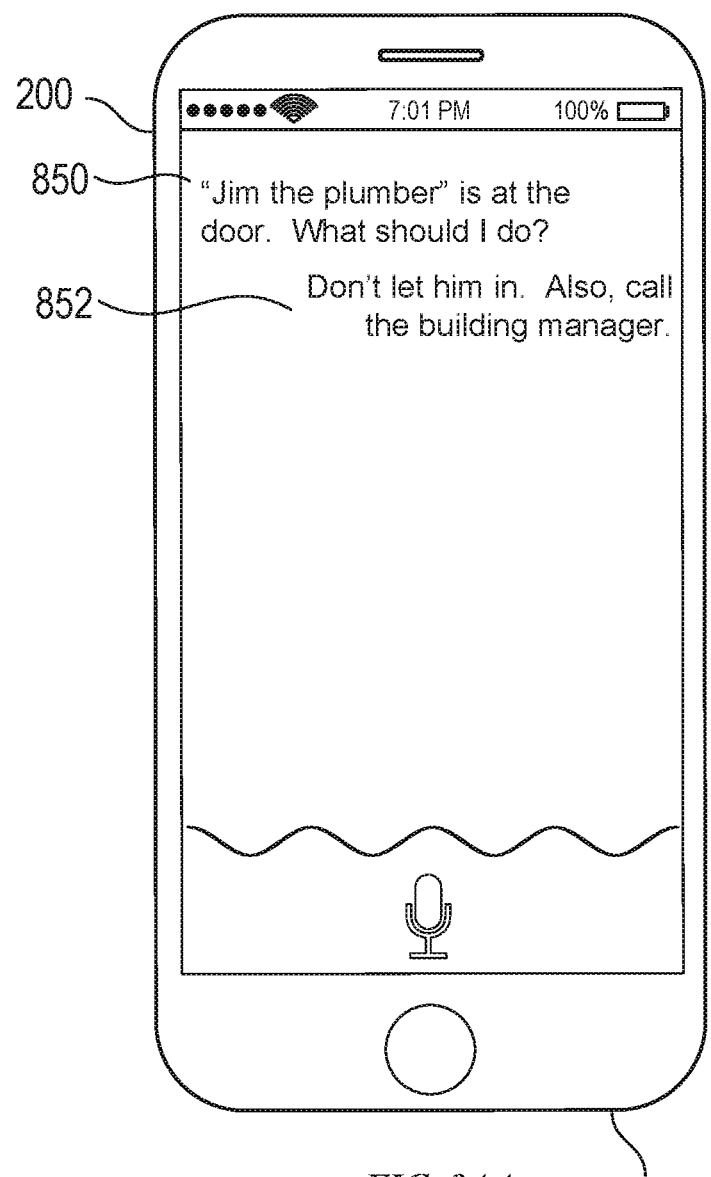

Returning to the first example, Pierre's digital assistant 700*a* generated a plan to let Tomas into his apartment. During execution of that plan, the digital assistant 700*b* associated with Pierre's apartment awaits contingent input associated with Tomas' arrival. Referring to FIG. 8Z, as one example of an exception, the digital assistant 700*b* recognizes that someone who is not Tomas has arrived at the door. The digital assistant 700*b* requests the name of the visitor, who replies "Jim the plumber." The digital assistant 700*b* is expecting Tomas at approximately 8:00 p.m. However, a visitor other than Tomas has arrived. This is an exception to the plan. Referring also to FIG. 7D, according to some embodiments, the digital assistant 700*b* associated with Pierre's apartment generates a message that a person who has identified himself as "Jim the plumber" is at the door; that message travels through the blackboard 772 and message gateway 770 to Pierre's digital assistant 700*a*, which in this example is shown as digital assistant 700*a*. Pierre's digital assistant 700*a* recognizes the identity discrepancy between Tomas and "Jim the Plumber," identifying the exception. Optionally, Pierre's digital assistant 700*a* first determines if a rule is present in the plan template 802 for handling the arrival of a different visitor; in this example, there is not. Referring to FIG. 8Z, finding no rule, Pierre's digital assistant 700*a* handles the exception by causing a message 850 to be displayed on the display 212 of Pierre's electronic device 200: "'Jim the plumber' is at your front door. What should I do?" Pierre is not expecting a plumber, and is surprised one would want entry to his apartment at 8:00 p.m. Referring to FIG. 8AA, Pierre tells the digital assistant 700*a*, "Don't let him in. Also, call the building manager"; the digital assistant 700*a* displays that message 852 on the electronic device 200 according to some embodiments. Pierre's digital assistant 700*a* transmits this message to the message gateway 770, which forwards the message 830 to the blackboard 772. The digital assistant 700*b* associated with Pierre's apartment is forwarded the message 830 by the blackboard 772, or retrieves the message 830 from the blackboard 772. The digital assistant 700*b* then leaves the door locked. Further, the digital assistant 700*b* calls the building manager, and informs the building manager that "Jim the plumber" is at the door. The plan generated to let Tomas in when he arrives is not complete, because Tomas has not yet arrived. However, the exception has been handled by refusing entry to the apartment to "Jim."

FIGS. 9A-9F illustrate a process 900 for operating a digital assistant according to various examples. More specifically, process 900 can be implemented to remember user data and generate recommendations using a digital assistant. The process 900 can be performed using one or more electronic devices implementing a digital assistant. In some examples, the process 900 can be performed using a client-server system (e.g., system 100) implementing a digital assistant. The individual blocks of the process 900 optionally can be distributed in any appropriate manner among one or more computers, systems, or electronic devices. For instance, in some examples, process 900 can be performed entirely on an electronic device (e.g., devices 104, 200, 400, or 600). References in this document to any one particular electronic device (104, 200, 400, or 600) shall be understood to encompass all of the electronic devices (104, 200, 400, or 600) unless one or more of those electronic devices (104, 200, 400 or 600) is excluded by the plain meaning of the text. For example, the electronic device (104, 200, 400 or 600) utilized in several examples is a smartphone. However, the process 900 is not limited to use with a smartphone; the process 900 optionally can be implemented on any other suitable electronic device, such as a tablet, a desktop computer, a laptop, or a smart watch. Electronic devices with greater computing power and greater battery life optionally can perform more of the blocks of the process 900. The distribution of blocks of the process 900 need not be fixed, and optionally can vary depending upon network connection bandwidth, network connection quality, server load, availability of computer power and battery power at the electronic device (e.g., 104, 200, 400, 600), and/or other factors. Further, while the following discussion describes process 900 as being performed by a digital assistant system (e.g., system 100 and/or digital assistant system 700), it should be recognized that the process or any particular part of the process is not limited to performance by any particular device, combination of devices, or implementation. The description of the process is further illustrated and exemplified by FIGS. 8A-8AA, and the description above related to those figures.

As used in the description of the flow diagram 900, and in this document as a whole, the terms "virtual assistant" and "digital assistant" are used interchangeably and have the same meaning. For the avoidance of doubt, the term "virtual assistant" means the digital assistant 700.

FIGS. 9A-9F are a flow diagram 900 illustrating a method for interacting with a virtual assistant in accordance with some embodiments. Some operations in process 900 optionally can be combined, the order of some operations optionally can be changed, and some operations optionally can be omitted. Optional operations are indicated with dashed-line shapes in FIGS. 9A-9F. Unless the specification states otherwise, the blocks of the process 900 optionally can be performed in any suitable order, and need not be performed in the order set forth in FIGS. 9A-9F.

As described below, method 900 provides an intuitive way for interacting with a digital assistant. The method reduces the cognitive burden on a user when using a digital assistant, thereby creating a more efficient human-machine interface. For battery-operated computing devices, enabling a user to utilize a digital assistant more accurately and more efficiently conserves power and increases the time between battery charges.

At the beginning of process 900, the digital assistant receives 902 an unstructured natural language user request for a service from a digital assistant. That unstructured natural language user request includes one or more words. Where the electronic device (104, 200, 400, 600) includes or is associated with a microphone 213, that user input may be received through the microphone 213. The user input may also be referred to as an audio input or audio stream. In some embodiments, the stream of audio can be received as raw sound waves, as an audio file, or in the form of a representative audio signal (analog or digital). In other embodiments, the audio stream can be received at a remote system, such as a server component of a digital assistant. The audio stream can include user speech, such as a spoken user request. In an alternate embodiment, the user input is received in textual form instead of as speech. In some embodiments, the audio stream is converted from speech to text by ASR processing prior to, or during, analysis by the digital assistant. Such conversion may be performed as described above.

Optionally, the digital assistant determines 904 whether the user request of block 902 is a plan trigger. A "plan trigger" is a request that is associated with one or more plan templates 802, as opposed to a simple task request that is not associated with one or more plan templates 802. For example, a user request in block 902 to "set an alarm for 8 a.m." is not a plan trigger; it is a task request that can be fulfilled by the digital assistant without reference to a plan template. As another example, a user request to "let my mother in my apartment when she arrives" corresponds to a plan template 802, and thus is a plan trigger. Generally speaking, more complex actions, and actions that rely upon contingent inputs, are associated with plan triggers. According to some embodiments, when the determination 904 is made, the user request is compared to the tasks that can be fulfilled by the digital assistant without reference to a plan template 802; if the user request does not match any such tasks, then the user request is analyzed as a potential plan trigger. According to other embodiments, when the determination 904 is made, the user request is compared to a list of plan triggers; if the user request does not match any such tasks, then the user request is determined to not include a plan trigger.

If the user request of block 902 is not a plan trigger, then the digital assistant processes 906 the user request other than by generation of a plan based on at least one plan template 802. In the example above, a user request to 'set an alarm for 8:00 a.m." is handled in a standard manner by the digital assistant, without the need to search for a plan template 802 or generate a plan.

If the user request of block 902 is a plan trigger, then the digital assistant determines 908 whether the user request corresponds to at least one of a plurality of plan templates 802. As set forth above, the plan templates 802 are associated with a variety of different actions. For example, plan templates 802 may include "let [guest] into my apartment when [guest] arrives," "call a [cab/shared ride] for [guest] when [guest] leaves my house," and "buy tickets for [movie] when they go on sale." The plan templates 802 need not remain static; existing plan templates 802 are modified over time to improve their functionality, and new plan templates 802 are added over time, according to some embodiments.

If the user request of block 902 does not correspond to at least one of a plurality of plan templates 802, then the digital assistant foregoes 912 selection of a plan template 802. The user request of block 902 may be out of scope of any of the plan templates 802, may be outside the capabilities of a digital assistant, or may not be capable of being understood. For example, if the user request of block 902 is "make me a chocolate soufflé," and no plan template 802 exists for making a chocolate soufflé, the digital assistant necessarily foregoes selection of a plan template 802. Optionally, the digital assistant informs the user that the user request of block 902 cannot be satisfied.

If the user request of block 902 corresponds to at least one of a plurality of plan templates, then the digital assistant selects 910 one of the plurality of plan templates 802 that best corresponds to the user request. This selection may be performed in a manner the same as, or similar to, the manner in which a domain responsive to a user request is selected, as described herein, according to some embodiments. According to other embodiments, the digital assistant selects 910 one of the plurality of plan templates 802 that best corresponds to the user request in any other suitable manner or with any other suitable methodology.

Next, the digital assistant begins 914 processing the user request according to the selected plan template 802. In order to generate a plan based on the plan template, the digital assistant determines 916 whether sufficient information is available to the digital assistant for the digital assistant to generate a plan based on the selected plan template. As described above, "sufficient information" is the minimum information with which the digital assistant can generate a plan. As described above, one or more of the inputs 806 of the plan template 802 are placeholders awaiting information. Where at least one of those inputs 806 is not optional in order for a plan to be generated, sufficient information exists where information is available to the digital assistant for the virtual assistant to populate each non-optional input field.

If sufficient information is available to the virtual assistant to generate a plan based on the selected plan template 802, the digital assistant generates 918 a plan based on the selected plan template 802. In some embodiments, once the digital assistant 700 identifies selects a plan template 802 based on the user request, the digital assistant 700 generates a plan based on the selected plan template. As used in this document, the term "plan" refers to a set of two or more instructions that is executable on at least one electronic device. A plan differs from a task request, in which a single instruction is performed based on a user request. The term "instruction," as used in the context of a plan or task request, refers to a granular step, and not a program instruction (e.g., a program language command). The plan includes at least one interaction with a user, an entity other than the user, an external service. or other entity, according to some embodiments. The plan utilizes at least one sensor (e.g., proximity sensor 780), and/or at least one actuator (e.g., door lock 782), according to some embodiments. The plan utilizes multiple devices, according to some embodiments. The plan executes at least one instruction at a future time, such as a predetermined future time (e.g., tomorrow at 8:00 a.m.) or upon being triggered by an external event (e.g., receipt of input), according to some embodiments. According to some embodiments, examples of an event include an interaction or communication with another user or users, receipt of biometric data (e.g., heart rate data from the user's Apple Watch® wrist wearable device (a product of Apple Inc. of Cupertino, Calif.), and receipt of environmental data (e.g., a weather report from an external service, local temperature as determined by a sensor)

When the digital assistant generates 918 a plan, it does so based on the content of the user request as well as the plan template 802. The user request may include at least one of the inputs to the plan template 802 that constitute sufficient information to generate a plan. The digital assistant 700 converts the passive structure of the plan template 802 into an actionable plan that can be executed by the digital assistant 700. In some embodiments, the digital assistant generates 918 a plan in part by selecting modules of the electronic device 200 and digital assistant 700 for performing at least some of the instructions and sub-tasks included in the plan. In some embodiments, the digital assistant generates 918 a plan in part by identifying other entities, such as other users, other digital assistants, and external services, to which output is provided and from which input is received, and to which performing at least one of the instructions and sub-tasks included in the plan is delegated, in order to effectuate the plan. After the plan is generated, the process 900 moves optionally to block 940 described in greater detail below.

If sufficient information is not available to the virtual assistant to generate a plan based on the selected plan template 802, in this example the digital assistant obtains 920 sufficient information to generate a plan based on the selected plan template 802. The digital assistant may retrieve sufficient information in a variety of manners. For example, the digital assistant can obtain sufficient information from the user, from entities other than the user, from external services, or from the electronic device itself.

Optionally, the digital assistant initiates 922 communication with the user to request sufficient information to generate a plan based on the selected plan template. For example, in FIGS. 8E and 8G, the digital assistant requests 810 from the user two items that are sufficient information to generate a plan: "on what date is he coming?" and "what time is he coming?" In those examples, the digital assistant displays the request on the display 212 of the electronic device 200. The digital assistant instead, or in addition, may requests 810 information from the user via audio (such as via the speaker 211). The digital assistant may instead, or also, use any other suitable contact method, such as SMS messaging, messages utilizing the iMessage® software feature of Apple Inc., of Cupertino, Calif., electronic mail, or any other suitable message format.

Optionally, in response to the initiation of communication with the user, the digital assistant receives 924 sufficient information from the user to generate a plan based on the selected plan template. For example, in FIGS. 8F and 8H above, the digital assistant receives responses from the user providing sufficient information of date and time. Such responses may be received by user speech (converted to text as described above), user typing, user gesture, SMS messaging, messages utilizing the iMessage® software feature of Apple Inc., of Cupertino, Calif., electronic mail, or any other suitable message format. Having sufficient information to generate a plan, the process continues to block 937, in which the digital assistant generates a plan based on the selected plan template 802, using the obtained information.

Optionally, the digital assistant initiates 926 communication with an entity other than the user to request sufficient information to generate a plan based on the selected plan template. For example, in FIGS. 8I and 8T, the digital assistant initiates 926 communication to a user of another device, Tomas, messaging Tomas with the queries "Tomas, when will you arrive at Pierre's apartment?" and "Tomas, what kind of music do you like?", each query associated with obtaining sufficient information to generate a plan. The digital assistant may message Tomas with SMS messaging or messages utilizing the iMessage® software feature of Apple Inc., of Cupertino, Calif., or may contact the other user in any other suitable method, such as by placing a telephone call to the other user, sending the other user electronic mail, or any other suitable form of communication. The entity other than the user is not limited to another user; as described above, the entity other than the user includes a second digital assistant under the control of the user but that is not associated with the electronic device 200, such as a digital assistant associated with the user's dwelling, according to some embodiments. According to some embodiments, the entity other than the user is a digital assistant that is not under the control of the user, such as a digital assistant associated with an electronic device 200a belonging to a friend or family member.

Optionally, in response to the initiation of communication with an entity other than the user, the digital assistant receives 928 sufficient information from the entity other than user to generate a plan based on the selected plan template. For example, in FIGS. 8J and 8U, the digital assistant receives responses from the other user providing sufficient information of arrival time and music preference, respectively. Such responses may be received by SMS messaging, messages utilizing the iMessage® software feature of Apple Inc., of Cupertino, Calif., speech of the other user (converted to text as described above), electronic mail, or any other suitable message format. Having sufficient information to generate a plan, the process continues to block 937, in which the digital assistant generates a plan based on the selected plan template 802, using the obtained information.

Optionally, the digital assistant initiates 932 communication with an external service 784 to request sufficient information to generate a plan based on the selected plan template 802. For example, in FIG. 8T, the digital assistant initiates 926 communication with a user of another device, Tomas, messaging Tomas with the query "Tomas, what kind of music do you like?" Instead of contacting Tomas, in some embodiments, the digital assistant initiates 932 communication with an external service, such as the iTunes® application program or the Apple Music™ or iTunes Radio℠ streaming music services, and determines from one of those programs or applications which music that Tomas likes. The digital assistant may determine that from a public profile of Tomas, in some embodiments. In other embodiments, Pierre and Tomas are friends, such that Tomas may have granted permission for Pierre to have more access to Tomas' likes and dislikes on a streaming music service; if so, the digital assistant utilizes that enhanced access to determine what music Tomas likes. Other external services are utilized as needed to request sufficient information to generate a plan based on the selected plan template 802. For example, if a plan template 802 exists that is matched with "make a reservation at a Chinese restaurant for dinner for 3 when I am within 10 miles of my house," and the digital assistant has no record associated with the user previously dining at a Chinese restaurant, the digital assistant initiates communication with an external service 784 to locate a Chinese restaurant that is nearby, that takes reservations, and/or that is highly rated. The digital assistant communicates with the external service 784 in any suitable manner. As another example, if a plan template 802 exists that is matched with "schedule airport transportation to depart home at 8:00 a.m.," the digital assistant initiates communication with an external service 784 before 8:00 a.m. to gather information about traffic, in order to determine the fastest route or routes to the airport for the user.

Optionally, in response to the initiation of communication with an external service, the digital assistant receives 934 sufficient information from the entity other than user to generate a plan based on the selected plan template. For example, with reference to the examples above, the digital assistant receives information from the Apple Music™ streaming radio service that Tomas likes samba, and that Great Wall of China is a Chinese restaurant within 2 miles of the user's house that takes reservations and that receives 4 out of 5 stars for food quality, respectively. Having sufficient information to generate a plan, the process continues to block 937, in which the digital assistant generates a plan based on the selected plan template 802, using the obtained information.

Optionally, the digital assistant obtains 936 sufficient information from the electronic device itself to generate a plan based on the selected plan template 802. For example, in the example described above with regard to FIGS. 8E and 8G, the digital assistant initiates communication with the user to request information about the time and date of Tomas' arrival at the apartment. However, as another example, the digital assistant searches the calendar module 248 for calendar events in the near term that include Tomas as a participant. In this example, the digital assistant finds a calendar entry or meeting entry with the subject "See Tomas," which includes Tomas as a participant, and that indicates that the calendar item begins at 8:00 p.m. on Saturday, October 31. Further in this example, the digital assistant obtains 936 specific time and date information ("8:00 p.m. on Saturday, October 31") from the calendar. Having sufficient information to generate a plan, the process continues to block 937, in which the digital assistant generates a plan based on the selected plan template 802, using the obtained information.

The digital assistant may perform more than one of the optional blocks 952, 956, 932, and 936, in series or in parallel in order to obtain sufficient information, according to some embodiments. By initiating communication with multiple different sources of information, and searching the electronic device for information, the digital assistant has a greater likelihood of finding information. In addition, if such information is available from different sources, the digital assistant can utilize the information that is received first, thereby speeding up the process of responding to the user request.

Optionally, the digital assistant generates 938 the plan based in part on at least one of device context and user context. User context includes information associated with the user of the electronic device 200. In accordance with some embodiments, user context includes the content of the user input. In accordance with some embodiments, user context includes demographic information about the user, such as the user's age, gender, or the like. In accordance with some embodiments, the user context includes media associated with the user, regardless of the storage location of the media. In accordance with some embodiments, the user context includes content associated with the user. In accordance with some embodiments, the user context includes but is not limited to the content of messages, such as SMS messages, messages utilizing the iMessage® software feature of Apple Inc., of Cupertino, Calif., instant messaging messages, and electronic mail. In accordance with some embodiments, the user context includes contact information, such as information stored in or by the contacts module 237. In accordance with some embodiments, the user context includes at least one location associated with the user. For example, the user designates one or more specific locations with unique identifiers, such as "home," "Mom's house," or "work." The user may do so by entering an address, by providing a touch input on a map displayed on the display 212, or in any other suitable manner. The user has identified a limited number of locations specifically, and the digital assistant stores those identifiers. Such identifiers are not addresses themselves, but are associated with addresses and/or navigation coordinates (such as GPS coordinates). Such locations are assumed to be significant to the user, and can be useful in responding when responding to user requests such as "make a business lunch reservation at noon tomorrow near work." According to some embodiments, user context includes biometric information about the user, such as heart rate or sleep state.

Device context includes information associated with the electronic device 200 itself. According to some embodiments, device context includes a location of the electronic device 200. According to some embodiments, device context includes motion of the electronic device 200, such as whether the electronic device 200 is stationary or moving, how fast the electronic device 200 is moving, in what direction the electronic device 200 is moving, and whether the electronic device 200 is accelerating. Such motion can be determined by utilizing the accelerometer(s) 268 and/or the GPS module 235. According to some embodiments, the device context includes proximity of the electronic device 200 to a second electronic device, such as a home automation system, a wrist wearable device such as the Apple Watch® wrist wearable device of Apple Inc. of Cupertino, Calif., a television interface such as the Apple TV® digital media extender of Apple Inc. of Cupertino, Calif., a vehicle, a different electronic device belonging to another user, or other electronic device. According to some embodiments, device context includes weather conditions in proximity to the electronic device 200, such as obtained from an external service 784 based on the location of the electronic device.

The digital assistant generates 938 the plan based in part on at least one of device context and user context by utilizing at least one context to obtain sufficient information to generate a plan, according to some embodiments. According to some embodiments, the digital assistant utilizes at least one of device context and user context to provide details of an actionable plan that can be executed by the digital assistant 700 and the electronic device 200.

Optionally, the digital assistant then executes 940 the generated plan. The digital assistant uses the plan to take action to fulfill the user request. Examples of executing the generated plan are described in FIGS. 8A-8AA and the text above that describes those figures.

Optionally, during execution of the plan, the digital assistant detects 942 an exception to the plan. As set forth above, the term "exception" refers to an unexpected input or event that is not consistent with the plan to fulfill a user request 800 based on the plan template 802.

Upon encountering an exception, optionally the digital assistant determines 946 whether the exception can be handled according to the plan. If the exception can be handled according to the plan, the digital assistant handles 948 the exception according to the plan. In the example above illustrated in FIG. 8N, Tomas arrived earlier than expected. As another example, the plan template 802 upon which the plan is based includes a relevant instruction to "let the visitor in if the visitor arrives up to 60 minutes early." This instruction may be part of a contingent branch that is not considered until the exception occurs. In such an example, the exception can be handled according to the plan; the digital assistant 700b lets Tomas in the apartment, and there is no need to contact the user or in any other way obtain additional information to allow the digital assistant to handle the exception.

If the exception cannot be handled according to plan, the digital assistant obtains 950 sufficient information for the digital assistant to handle the exception. The digital assistant does so in any suitable manner. Optionally, the digital assistant can obtain sufficient information from the user, from entities other than the user, from external services, or from the electronic device itself.

Optionally, the digital assistant initiates 952 communication with the user to request sufficient information for the digital assistant to handle the exception. For example, in FIG. 8N, the digital assistant 700 notifies 828 the user that Tomas has arrived early, and asks whether it should let Tomas in. The digital assistant 700 is aware that Tomas has arrived early based on information received from the second digital assistant 700b associated with Pierre's apartment, as described above. The digital assistant 700 displays the request on the display 212 of the electronic device 200. The digital assistant instead, or in addition, may utilize audio (such as via the speaker 211) to request information from the user. The digital assistant may instead, or also, use any other suitable contact method, such as SMS messaging, messages utilizing the iMessage® software feature of Apple Inc., of Cupertino, Calif., electronic mail, or any other suitable message format.

Optionally, in response to the initiation of communication with the user, the digital assistant receives 954 sufficient information from the user for the digital assistant to handle the exception. For example, in FIG. 8P, the digital assistant receives a response from the user to let Tomas in. Such a response may be received by user speech (converted to text as described above), user typing, user gesture, SMS messaging, messages utilizing the iMessage® software feature of Apple Inc., of Cupertino, Calif., electronic mail, or any other suitable message format. Having sufficient information, the process continues to handle 972 the exception with the received information. The digital assistant 700 transmits a message to the second digital assistant 700b at Pierre's apartment to unlock the door, as described above.

Optionally, the digital assistant initiates 956 communication with an entity other than the user from whom the request for service was received in order to request sufficient information for the virtual assistant to handle the exception. As one example, the digital assistant initiates 956 communication to Tomas, asking whether Tomas would prefer to enter, or return later. The digital assistant may message Tomas with SMS messaging or messages utilizing the iMessage® software feature of Apple Inc., of Cupertino, Calif., or may contact the other user in any other suitable method, such as by placing a telephone call to the other user, sending the other user electronic mail, or any other suitable form of communication. The entity other than the user is not limited to another user; as described above, the entity other than the user includes a second digital assistant under the control of the user but that is not associated with the electronic device 200, such as a digital assistant associated with the user's dwelling, according to some embodiments. According to some embodiments, the entity other than the user is a digital assistant that is not under the control of the user, such as a digital assistant associated with an electronic device 200a belonging to a friend or family member.

Optionally, in response to the initiation of communication with an entity other than the user, the digital assistant receives 958 sufficient information from the entity other than user for the digital assistant to handle the exception. For example, Tomas responds that he will go get a cup of coffee and come back later. Such a response may be received by SMS messaging, messages utilizing the iMessage® software feature of Apple Inc., of Cupertino, Calif., speech of the other user (converted to text as described above), electronic mail, or any other suitable message format. Having sufficient information, the process continues to handle 972 the exception with the received information. The digital assistant 700 transmits a message to the second digital assistant to leave the door locked and to continue to wait for the contingent input of Tomas' arrival, closer to the time Tomas had been expected to arrive.

Optionally, the digital assistant initiates 964 communication with an external service 784 to request sufficient information for the virtual assistant to handle the exception. For example, in FIG. 8T, the digital assistant transmits a message to Tomas asking what kind of music he likes. However, in this example Tomas does not respond. The digital assistant initiates 926 communication to an external service 784 such as the iTunes® application program or the Apple Music™ or iTunes Radio℠ streaming music services, and determines from one of those programs or applications which music that Tomas likes in a manner such as described above. The digital assistant communicates with the external service 784 in any suitable manner.

Optionally, in response to the initiation of communication with an external service, the digital assistant receives 966 sufficient information from the external service 784 for the digital assistant to handle the exception. For example, with reference to the example above, the digital assistant receives information from the Apple Music™ streaming radio service that Tomas likes samba. Having sufficient information, the process continues to handle 972 the exception with the received information. The digital assistant 700 transmits a message to the second digital assistant to play samba music for Tomas.

Optionally, the digital assistant monitors 974 execution of the plan over time for receipt of at least one input upon which execution of the plan is contingent. As defined above, contingent inputs are inputs without which the plan cannot complete execution. For example, in the example above in which the user request is to let Tomas into his apartment when he arrives, one contingent input is the presence of Tomas, and another contingent input is his utterance or entry of the password. Until one or both of those contingent inputs is received, the execution of the plan is suspended. Execution of the plan can be suspended indefinitely, according to some embodiments.

Optionally, the digital assistant receives 976 at least one contingent input. As described above, a message thread on the blackboard 772 may be retained indefinitely, allowing the digital assistant to store the progress of the plan, and providing a basis for periodic active monitoring of the plan by the digital assistant, according to some embodiments. In such embodiments, the digital assistant periodically searches for the presence of the contingent input. According to some embodiments, the digital assistant passively monitors the plan, and upon receipt of a contingent input, locates a suspended plan and matches that contingent input to the plan. The digital assistant continues 978 execution of the plan upon receipt of all conditional inputs required for the plan to proceed. Different contingent inputs may be spaced apart in time, and the receipt of the first contingent input allows the digital assistant to continue to execute the plan to the point where another contingent input is required. For example, a plan may have a first contingent input that is expected within 10 minutes, and a second contingent input required the next day. The digital assistant will execute the plan until the first contingent input is required, continue to execute the plan after the first contingent input is received, and then suspend execution until the second contingent input is required.

Optionally, execution of the plan causes 980 at least one physical output. For example, as described above, after Tomas has arrived at Pierre's apartment and provides the password, upon determining that the password provided by Tomas matches the expected password, the digital assistant 700b transmits a message to the blackboard 772, which is forwarded to or retrieved by the dispatcher 776, for the dispatcher 776 to unlock the door lock 782. The user's digital assistant 700a causes the door lock 782 to be unlocked—a physical output—by transmitting to the digital assistant 700b the conditions to be met for Tomas to be admitted. Thus, the process 900 allows and facilitates interactions between the user's digital assistant and the physical world. The virtual assistant optionally generates 982 multimodal output; that is, two or more of text, audio, messages, electronic mail, and physical output. The process 900 and the architecture 766 used to perform the method provide a rich set of outputs that are not limited in the number than can be performed at once, or across time.

Optionally, as described above in several examples, in the course of executing the plan the digital assistant initiates 984 transmission of at least one message. Such messages are SMS messages, messages utilizing the iMessage® software feature of Apple Inc., of Cupertino, Calif., electronic mail, telephone calls, instant messages, or any other suitable message format, according to some embodiments. The ability of the digital assistant to initiate transmission of a message to an entity other than the user allows the digital assistant to make complex plans and handle contingent inputs and exceptions, according to some embodiments. Such initiation may happen a substantial period of time after the user request, and differs from a communication initiated to the user immediately after the user request that is for disambiguation of that user request. Similarly, according to some embodiments, optionally the digital assistant presents 986 output to an entity other than the user. For example, as described above with regard to FIG. 8V, the digital assistant presents a message 842 to Tomas, an entity other than the user, indicating that samba music will be played, and the digital assistant causes the digital assistant 700*b* associated with the apartment to play samba music. Both the message and the music are outputs presented to an entity other than the user.

Optionally, the digital assistant notifies 988 the user after execution of the plan is complete. For example, as described above with regard to FIG. 8M, after Tomas has been let into Pierre's apartment, the digital assistant 700*b* associated with the apartment transmits a message to the blackboard 772, which is forwarded to or retrieved by the message gateway 770 and then transmitted onward to Pierre's digital assistant 700*a*. Referring to FIG. 8M, the digital assistant of Pierre displays a message 826 at the electronic device 200: "Pierre, Tomas has arrived at your apartment. I let him in." The user can be notified in other ways, such as by instant message, voice, a telephone call, or any other suitable manner.

In accordance with some embodiments, FIG. 10A shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 10A are, optionally, combined or separated into sub-blocks to implement the principles of the various described examples. Therefore, the description herein optionally supports any possible combination or separation or further definition of the functional blocks described herein.

As shown in FIG. 10A, an electronic device 1100 optionally includes a display unit 1102 configured to display a graphic user interface; optionally, a touch-sensitive surface unit 1104 configured to receive contacts; optionally, a microphone unit 1106 configured to receive audio signals; and a processing unit 1108 coupled optionally to one or more of the display unit 1102, the touch-sensitive surface unit 1104, and microphone unit 1106. In some embodiments, the processing unit 1108 includes a receiving unit 1110, a determining unit 1112, a selecting unit 1114, and a responding unit 1116.

In some embodiments, the processing unit 1108 is configured to receive (e.g., with receiving unit 1110) an unstructured natural-language user request for a service from a virtual assistant; determine (e.g., with determining unit 1112) whether the user request corresponds to at least one of a plurality of plan templates accessible to the virtual assistant, based on the content of the user request and the content of the plan templates; in accordance with a determination that the user request corresponds to at least one of the plurality of plan templates, select (e.g., with selecting unit 1114) one of the plurality of plan templates; and in accordance with a determination that the user request fails to correspond to at least one of the plurality of plan templates, forego selection (e.g., with selecting unit 1114) of a plan template; and in response to selection of one of the plan templates, begin to respond (e.g., with responding unit 1116) to the user request according to the selected plan template.

In some embodiments, the processing unit 1108 further includes a generating unit 1118 and an obtaining unit 1120, where the processing unit 1108 is further configured to determine (e.g., with determining unit 1112) whether sufficient information is available to the virtual assistant for the virtual assistant to generate a plan based on the selected plan template 802; in accordance with a determination that sufficient information is available to the virtual assistant for the virtual assistant to generate a plan based on the selected plan template, generate (e.g., with generating unit 1118) a plan based on the selected plan template with the virtual assistant; and in accordance with a determination that insufficient information is available to the virtual assistant for the virtual assistant to generate a plan based on the selected plan template: obtain (e.g., with obtaining unit 1120) sufficient information to generate a plan based on the selected plan template; and in response to sufficient information being obtained, generate (e.g., with generating unit 1118) a plan based on the selected plan template with the virtual assistant.

In some embodiments, the processing unit 1108 is further configured to in accordance with a determination that sufficient information is available to the virtual assistant for the virtual assistant to generate a plan based on the selected plan template, initiate (e.g., with initiating unit 1122) communication with the user to request sufficient information to generate a plan based on plan template; and in response to the initiation, receive (e.g., with receiving unit 1110) sufficient information to generate a plan based on the plan template.

In some embodiments, the processing unit 1108 is further configured to in accordance with a determination that sufficient information is available to the virtual assistant for the virtual assistant to generate a plan based on the selected plan template, initiate (e.g., with initiating unit 1122) communication with an entity other than the user to request sufficient information to generate a plan based on the plan template; and in response to the initiation, receive (e.g., with receiving unit 1110) sufficient information to generate a plan based on the plan template.

In some embodiments, the processing unit 1108 is further configured to in accordance with a determination that sufficient information is available to the virtual assistant for the virtual assistant to generate a plan based on the selected plan template, initiate (e.g., with initiating unit 1122) communication with an external service to request sufficient information to generate a plan based on the plan template; and in response to the initiation, receive (e.g., with receiving unit 1110) sufficient information to generate a plan based on the plan template.

In some embodiments, the processing unit 1108 is further configured to in accordance with a determination that sufficient information is available to the virtual assistant for the virtual assistant to generate a plan based on the selected plan template, obtain (e.g., with obtaining unit 1120) sufficient information from the electronic device to generate a plan based on the plan template.

In some embodiments, the sufficient information from the electronic device to generate (e.g., with generating unit 1118) a plan based on the plan template includes a time associated with task execution.

In some embodiments, the sufficient information from the electronic device to generate (e.g., with generating unit 1118) a plan based on the plan template includes a location of task execution.

In some embodiments, the sufficient information from the electronic device to generate (e.g., with generating unit 1118) a plan based on the plan template includes an identity of at least one person associated with task execution.

In some embodiments, the processing unit 1108 is further configured to: after receipt of the user request, determine (e.g., with determining unit 1112) whether the user request comprises a plan trigger; in accordance with a determination that the user request comprises a plan trigger, initiate (e.g., with initiating unit 1122) the determination whether sufficient information is available to the virtual assistant for the virtual assistant to generate a plan based on the selected plan template; and in accordance with a determination that the user request does not comprise a plan trigger, respond (e.g., with responding unit 1116) to the user request other than by generation of a plan based on at least one plan template.

In some embodiments, the processing unit 1108 is further configured to generate (e.g., with generating unit 1118) the plan based on the plan template and based in part on at least one of device context and user context.

In some embodiments, the device context includes a location of the device.

In some embodiments, the device context includes motion of the device.

In some embodiments, the device context includes proximity to a second electronic device.

In some embodiments, the device context includes weather conditions in proximity to the electronic device.

In some embodiments, the user context includes the content of the user input.

In some embodiments, the user context includes media associated with the user.

In some embodiments, the user context includes demographic information associated with the user.

In some embodiments, the user context includes data associated with user content accessible by the device.

In some embodiments, the user context includes content of messages stored on the electronic device.

In some embodiments, the user context includes contact information.

In some embodiments, the user context includes at least one location associated with the user.

In some embodiments, the user context includes biometric information.

In some embodiments, the processing unit 1108 further includes an executing unit 1124, where the processing unit 1108 is further configured to execute (e.g., with generating unit 1118) the generated plan.

In some embodiments, the processing unit 1108 further includes a detecting unit 1126 and a handling unit 1128; where the processing unit 1108 is further configured to: during execution of the plan, detect (e.g., with detecting unit 1126) an exception to the plan; and determine (e.g., with determining unit 1112) whether the exception can be handled according to the plan; in accordance with a determination that the exception can be handled according to the plan, handle (e.g., with handling unit 1128) with the virtual assistant, the exception with information associated with the plan; and in accordance with a determination that the exception cannot be handled according to the plan: obtain (e.g., with obtaining unit 1120) sufficient information for the virtual assistant to handle the exception; and handle (e.g., with handling unit 1128) with the virtual assistant, the exception with the obtained information.

In some embodiments, the processing unit 1108 is further configured to in accordance with a determination that the exception cannot be handled according to the plan, initiate (e.g., with initiating unit 1122) communication with the user from whom the request for service was received to request sufficient information for the virtual assistant to handle the exception; and in response to the initiation, receive (e.g., with receiving unit 1110) sufficient information for the virtual assistant to handle the exception.

In some embodiments, the processing unit 1108 is further configured to in accordance with a determination that the exception cannot be handled according to the plan, initiate (e.g., with initiating unit 1122) communication with an entity other than the user to request sufficient information for the virtual assistant to handle the exception; and in response to the initiation, receive (e.g., with receiving unit 1110) sufficient information for the virtual assistant to handle the exception.

In some embodiments, the processing unit 1108 is further configured to in accordance with a determination that the exception cannot be handled according to the plan, initiate (e.g., with initiating unit 1122) communication with an external service to request sufficient information for the virtual assistant to handle the exception; and in response to the initiation, receive (e.g., with receiving unit 1110) sufficient information for the virtual assistant to handle the exception.

In some embodiments, the processing unit 1108 further includes a monitoring unit 1132; wherein the processing unit 1108 is further configured to: monitor (e.g., with monitoring unit 1132) execution of the plan over time with the virtual assistant for receipt of at least one input upon which execution of the plan is contingent; receive (e.g., with receiving unit 1110) the at least one input; and continue (e.g., with generating unit 1118) execution of the plan. In some embodiments, at least one input includes multimodal input.

In some embodiments, the processing unit 1108 further includes a causing unit 1134; wherein the processing unit 1108 is configured to execute (e.g., with generating unit 1118) the plan; the processing unit 1108 accordingly further configured to cause (e.g., with causing unit 1130) at least one physical output.

In some embodiments, the processing unit 1108 is configured to execute (e.g., with generating unit 1118) the plan; the processing unit 1108 accordingly further configured to generate (e.g., with generating unit 1118) multimodal output.

In some embodiments, the processing unit 1108 is configured to execute (e.g., with generating unit 1118) the plan; the processing unit 1108 accordingly further configured to initiate (e.g., with initiating unit 1122) transmission of at least one message.

In some embodiments, the processing unit 1108 is further configured to cause (e.g., with causing unit 1130) presentation of output to an entity other than the user.

In some embodiments, the processing unit 1108 further includes a notifying unit 1136; wherein the processing unit 1108 is further configured to notify (e.g., with notifying unit 1136) the user after execution of the plan is complete.

The operations described above with reference to FIGS. 9A-9F are, optionally, implemented by components depicted in FIGS. 1A-7D or FIG. 10A. It would be clear to a person having ordinary skill in the art how processes can be implemented based on the components depicted in FIGS. 1A-7D or FIG. 10A.

FIGS. 9G-9H are a flow diagram 1000 illustrating a method for handling messages to and from one or more virtual assistants in accordance with some embodiments. Some operations in process 1000 optionally can be combined, the order of some operations optionally can be changed, and some operations optionally can be omitted. Optional operations are indicated with dashed-line shapes in FIGS. 9G-9H. Unless the specification states otherwise, the blocks of the process 1000 optionally can be performed in any suitable order, and need not be performed in the order set forth in FIGS. 9G-9H.

As described below, method 1000 provides an intuitive way for handling messages to and from one or more virtual assistants. The method reduces the cognitive burden on a user when using a digital assistant, thereby creating a more efficient human-machine interface. For battery-operated computing devices, enabling a user to utilize a digital assistant more accurately and more efficiently conserves power and increases the time between battery charges.

At the beginning of process 1000, an electronic device receives 1002 from a virtual assistant a message associated with an action. Referring to FIG. 7D and as the terms are utilized in the description of the process 1000, according to some embodiments, the electronic device is the blackboard 772 or executes the blackboard 772, and the message is a message posted to the blackboard 772 by the digital assistant 700*a*, or any other digital assistant 700 to which the blackboard 772 is accessible. The receipt of the message at the blackboard 772 may be performed substantially as described above. The electronic device, stores 1004 the message. Such storage can be local or may be remote, such as on a server, in the cloud, or on a separate client device, for example.

Next, according to some embodiments, the electronic device communicates 1006 the message to a second electronic device associated with the action. Such communication is performed in any suitable manner, such as described above with regard to the process 900. For example, such communication is "push" communication (e.g., initiated by the electronic device) or "pull" communication (e.g., initiated from outside the electronic device) according to some embodiments. Whether such communication is push communication, pull communication, a combination thereof, or a different kind of communication depends on whether the blackboard 772 is operating in orchestration mode, subscription mode, distribution mode, or a combination thereof, according to some embodiments.

According to some embodiments, the electronic device transmits 1008 the message to a second electronic device associated with the action. For example, this transmission can be a push communication that is associated with the orchestration mode. Such transmission is performed as described above, according to some embodiments. According to some embodiments, the electronic device 1008 receives 1010 a request for the message from a second electronic device associated with the action. For example, that second electronic device is the dispatcher 776, or a second electronic device associated with the second digital assistant 700*b*. In accordance with receipt of the request, the electronic device transmits the message to the second electronic device associated with the action. For example, this transmission can be a pull communication that is associated with the subscription mode. Such transmission is performed as described above, according to some embodiments.

According to some embodiments, communicating the message to a second electronic device associated with the action includes communicating 1014 the message to a second virtual assistant associated with the second electronic device. According to some embodiments, where the second electronic device is a dispatcher 776 or executes the dispatcher, the electronic device communicates 1016 the message to the dispatcher 776. Like the blackboard 772, physical location of execution of the dispatcher 776 is flexible. As one example, the dispatcher 776 runs on a server cluster in the cloud. As another example, the dispatcher 776 runs on a portable electronic device 200 of the user, such as an iPhone® iPhone® or iPad® device from Apple Inc. of Cupertino, Calif. As another example, the dispatcher 776 runs on a server or home automation device locally at the user's dwelling and/or office. As another example, the dispatcher 776 is itself distributed among a number of different devices associated with the user. According to some embodiments, in response to communication of the message to the dispatcher 776, the electronic device receives 1018 information from the dispatcher 776 related to at least one sensor associated with the dispatcher 776. As one example, a sensor is the proximity sensor 780, although at least one sensor can be configured to sense one or more other physical properties. The information received from the dispatcher 776 related to at least one sensor is used to provide contingent input to a plan template 802 during plan execution, such as described above. According to some embodiments, in response to communication of the message to the dispatcher 776, the electronic device receives 1020 information from the dispatcher 776 related to at least one actuator associated with the dispatcher 776. For example, the actuator is a sound system 778 and/or door lock 782, although at least one actuator can be configured to cause at least one physical effect. The information received from the dispatcher 776 related to at least one actuator confirms the actuation of such one or more actuators, and is used to provide notification to the user that the actuation has occurred, according to some embodiments.

Optionally, the electronic device receives 1020 a message from at least one additional virtual assistant, each message associated with an action. As described above, the blackboard 772 facilitates communication between multiple virtual assistants in a simple and scalable manner. The electronic device stores 1024 each such message, such as described above.

Optionally, the electronic device receives 1026 a message from at least one additional electronic device, each message associated with an action. Such electronic devices need not execute a complete or even partial virtual assistant, but include at least the capability to transmit messages to the blackboard 772 useful for task execution. The electronic device stores 1024 each such message, such as described above.

In accordance with some embodiments, FIG. 10B shows an exemplary functional block diagram of an electronic device 1200 configured in accordance with the principles of the various described embodiments. In accordance with some embodiments, the functional blocks of electronic device 1200 are configured to perform the techniques described above with regard to FIGS. 9G-9H. The functional blocks of the device 1200 are, optionally, implemented by hardware, software, or a combination of hardware and software to carry out the principles of the various described examples. It is understood by persons of skill in the art that the functional blocks described in FIG. 10B are, optionally, combined or separated into sub-blocks to implement the principles of the various described examples. Therefore, the description herein optionally supports any possible combination or separation or further definition of the functional blocks described herein.

As shown in FIG. 10B, an electronic device 1200 optionally includes a display unit 1202 configured to display a graphic user interface; optionally, a touch-sensitive surface unit 1204 configured to receive contacts; optionally, a microphone unit 1206 configured to receive audio signals; and a processing unit 1208 coupled optionally to one or more of the display unit 1202, the touch-sensitive surface unit 1204, and microphone unit 1206. In some embodiments, the processing unit 1108 includes a receiving unit 1210, a storing unit 1212, and a communicating unit 1214. In accordance with some embodiments, FIG. 10B shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 10B are, optionally, combined or separated into sub-blocks to implement the principles of the various described examples. Therefore, the description herein optionally supports any possible combination or separation or further definition of the functional blocks described herein.

As shown in FIG. 10B, an electronic device 1200 optionally includes a display unit 1202 configured to display a graphic user interface; optionally, a touch-sensitive surface unit 1204 configured to receive contacts; optionally, a microphone unit 1206 configured to receive audio signals; and a processing unit 1208 coupled optionally to one or more of the display unit 1202, the touch-sensitive surface unit 1204, and microphone unit 1206. In some embodiments, the processing unit 1208 includes a receiving unit 1210, a determining unit 1212, a selecting unit 1214, and a responding unit 1216.

In some embodiments, the processing unit 1208 is configured to receive (e.g., with receiving unit 1210) from a virtual assistant a message associated with an action; store (e.g., with storing unit 1212) the message, and communicate (e.g., with communicating unit 1214) the message to a second electronic device associated with the action.

In some embodiments, the processing unit further includes a transmitting unit, where the processing unit is configured to communicate (e.g., with communicating unit 1214), the message to a second electronic device associated with the action; the processing unit accordingly further configured to transmit (e.g., with transmitting unit 1216) the message to a second electronic device associated with the action.

In some embodiments, the processing unit is configured to communicate (e.g., with communicating unit 1214), the message to a second electronic device associated with the action; the processing unit accordingly further configured to receive (e.g., with receiving unit 1210) a request for the message from a second electronic device associated with the action; and in accordance with receipt of the request, transmit (e.g., with transmitting unit 1216) the message to the second electronic device associated with the action.

In some embodiments, the processing unit is configured to communicate (e.g., with communicating unit 1214) the message to a second electronic device associated with the action; the processing unit accordingly further configured to communicate (e.g., with communicating unit 1214) the message to a second virtual assistant associated with the second electronic device.

In some embodiments, the second electronic device is a dispatcher; and the processing unit is configured to communicate (e.g., with communicating unit 1214) the message to a second electronic device associated with the action; the processing unit accordingly further configured to communicate (e.g., with communicating unit 1214) the message to the dispatcher.

In some embodiments, the processing unit is further configured to, in response to communication of the message to the dispatcher, receive (e.g., with receiving unit 1210) information from the dispatcher related to at least one sensor associated with the dispatcher.

In some embodiments, the processing unit is further configured to, in response to communication of the message to the dispatcher, receive (e.g., with receiving unit 1210) confirmation from the dispatcher related to performance by at least one actuator associated with the dispatcher of at least one action associated with the message.

In some embodiments, the processing unit is further configured to receive (e.g., with receiving unit 1210) a message from at least one additional virtual assistant, each message associated with an action; and store (e.g., with storing unit 1212) each message.

In some embodiments, the processing unit is further configured to receive (e.g., with receiving unit 1210) a message from at least one additional electronic device, each message associated with an action; and store (e.g., with storing unit 1212) each message.

The electronic device of claim 76, wherein at least one message is in SMS format.

The operations described above with reference to FIGS. 9G-9H are, optionally, implemented by components depicted in FIGS. 1A-7D or FIG. 10B. It would be clear to a person having ordinary skill in the art how processes can be implemented based on the components depicted in FIGS. 1A-7D or FIG. 10B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium storing one or more programs, the one or more programs comprising instructions, which when executed by an electronic device, cause the electronic device to:
    receive an unstructured natural-language user request for a service from a virtual assistant;
    determine whether the user request corresponds to at least one of a plurality of plan templates accessible to the virtual assistant, based on the content of the user request and the content of the plan templates, wherein a plan template of the plurality of plan templates includes a set of sequential instructions and corresponding one or more inputs and outputs, and at least one of the one or more inputs is a contingent input that corresponds to a subsequent action;
    in accordance with a determination that the user request corresponds to at least one of the plurality of plan templates;
        select one of the plurality of plan templates;
        determine whether sufficient information is available to the virtual assistant for the virtual assistant to generate a plan based on the selected plan template;
        in accordance with a determination that sufficient information is available to the virtual assistant for the virtual assistant to generate the plan based on the selected plan template, generate the plan based on the selected plan template with the virtual assistant, wherein an execution of at least a portion of the plan is contingent upon receiving the contingent input at a time subsequent to generating the plan; and
        in accordance with a determination that insufficient information is available to the virtual assistant for the virtual assistant to generate the plan based on the selected plan template:
            obtain sufficient information to generate the plan based on the selected plan template; and
            in response to sufficient information being obtained, generate the plan based on the selected plan template with the virtual assistant; and
    in accordance with a determination that the user request fails to correspond to at least one of the plurality of plan templates, forego selection of a plan template;
    in response to selection of one of the plan templates, begin to respond to the user request according to the selected plan template by causing execution of a first instruction of the set of sequential instructions; and
    in response to receiving the contingent input, continue to respond to the user request by causing execution of a second instruction of the set of sequential instructions according to the subsequent action.

2. The non-transitory computer-readable storage medium of claim 1, wherein the instructions to cause the electronic device to obtain sufficient information to generate a plan based on the plan template further comprise instructions to cause the electronic device to:
    initiate communication with the user to request sufficient information to generate a plan based on plan template; and
    in response to the initiation, receive sufficient information to generate a plan based on the plan template.

3. The non-transitory computer-readable storage medium of claim 1, wherein the instructions to cause the electronic device to obtain sufficient information to generate a plan based on the plan template further comprise instructions to cause the electronic device to:
    initiate communication with an entity other than the user to request sufficient information to generate a plan based on the plan template; and
    in response to the initiation, receive sufficient information to generate a plan based on the plan template.

4. The non-transitory computer-readable storage medium of claim 1, wherein the instructions to cause the electronic device to obtain sufficient information to generate a plan based on the plan template further comprise instructions to cause the electronic device to:
   initiate communication with an external service to request sufficient information to generate a plan based on the plan template; and
   in response to the initiation; receive sufficient information to generate a plan based on the plan template.

5. The non-transitory computer-readable storage medium of claim 1, wherein the instructions to cause the electronic device to obtain sufficient information to generate a plan based on the plan template further comprise instructions to cause the electronic device to:
   obtain sufficient information from the electronic device to generate a plan based on the plan template.

6. The non-transitory computer-readable storage medium of claim 1, wherein the sufficient information from the electronic device to generate a plan based on the plan template includes a time associated with task execution.

7. The non-transitory computer-readable storage medium of claim 1, wherein the sufficient information from the electronic device to generate a plan based on the plan template includes a location of task execution.

8. The non-transitory computer-readable storage medium of claim 1, wherein the sufficient information from the electronic device to generate a plan based on the plan template includes an identity of at least one person associated with task execution.

9. The non-transitory computer-readable storage medium of claim 1, further comprising instructions to cause the electronic device to:
   after receipt of the user request, determine whether the user request comprises a plan trigger;
      in accordance with a determination that the user request comprises a plan trigger, initiate the determination whether sufficient information is available to the virtual assistant for the virtual assistant to generate a plan based on the selected plan template; and
   in accordance with a determination that the user request does not comprise a plan trigger; respond to the user request other than by generation of a plan based on at least one plan template.

10. The non-transitory computer-readable storage medium of claim 1, wherein the instructions to cause the electronic device to generate a plan based on the selected plan template further comprise instructions to cause the electronic device to:
   generate the plan based in part on at least one of device context and user context.

11. The non-transitory computer-readable storage medium of claim 10, wherein the device context includes a location of the device.

12. The non-transitory computer-readable storage medium of claim 10, wherein the device context includes motion of the device.

13. The non-transitory computer-readable storage medium of claim 10, wherein the device context includes proximity to a second electronic device.

14. The non-transitory computer-readable storage medium of claim 10, wherein the device context includes weather conditions in proximity to the electronic device.

15. The non-transitory computer-readable storage medium of claim 10, wherein the user context includes the content of the user input.

16. The non-transitory computer-readable storage medium of claim 10, wherein the user context includes media associated with the user.

17. The non-transitory computer-readable storage medium of claim 10, wherein the user context includes demographic information associated with the user.

18. The non-transitory computer-readable storage medium of claim 10, wherein the user context includes data associated with user content accessible by the device.

19. The non-transitory computer-readable storage medium of claim 10, wherein the user context includes content of messages stored on the electronic device.

20. The non-transitory computer-readable storage medium of claim 10, wherein the user context includes contact information.

21. The non-transitory computer-readable storage medium of claim 10, wherein the user context includes at least one location associated with the user.

22. The non-transitory computer-readable storage medium of claim 10, wherein the user context includes biometric information.

23. The non-transitory computer-readable storage medium of claim 1, further comprising instructions to cause the electronic device to:
   execute the generated plan.

24. The non-transitory computer-readable storage medium of claim 23, further comprising instructions to cause the electronic device to:
   during execution of the plan, detect an exception to the plan; and
   determine whether the exception can be handled according to the plan;
      in accordance with a determination that the exception can be handled according to the plan, handle, with the virtual assistant, the exception with information associated with the plan; and
      in accordance with a determination that the exception cannot he handled according to the plan:
         obtain sufficient information for the virtual assistant to handle the exception; and
         handle, with the virtual assistant, the exception with the obtained information.

25. The non-transitory computer-readable storage medium of claim 24, wherein the instructions to cause the electronic device to obtain sufficient information for the virtual assistant to handle the exception further comprise instructions to cause the electronic device to:
   initiate communication with the user from whom the request for service was received to request sufficient information for the virtual assistant to handle the exception; and
   in response to the initiation, receive sufficient information for the virtual assistant to handle the exception.

26. The non-transitory computer-readable storage medium of claim 24, wherein the instructions to cause the electronic device to obtain sufficient information for the virtual assistant to handle the exception further comprise instructions to cause the electronic device to:
   initiate communication with an entity other than the user to request sufficient information for the virtual assistant to handle the exception; and
   in response to the initiation, receive sufficient information for the virtual assistant to handle the exception.

27. The non-transitory computer-readable storage medium of claim 24, wherein the instructions to cause the electronic device to obtain sufficient information for the virtual assistant to handle the exception further comprise instructions to cause the electronic device to:
    initiate communication with an external service to request sufficient information for the virtual assistant to handle the exception; and
    in response to the initiation, receive sufficient information for the virtual assistant to handle the exception.

28. The non-transitory computer-readable storage medium of claim 24, wherein the instructions to cause the electronic device to execute the plan further comprise instructions to cause the electronic device to:
    monitor execution of the plan over time with the virtual assistant for receipt of at least one input upon which execution of the plan is contingent;
    receive the at least one input; and
    continue execution of the plan.

29. The non-transitory computer-readable storage medium of claim 28, wherein at least one input includes multimodal input.

30. The non-transitory computer-readable storage medium of claim 24, wherein the instructions to cause the electronic device to execute the plan further comprise instructions to cause the electronic device to:
    cause at least one physical output.

31. The non-transitory computer-readable storage medium of claim 24, wherein the instructions to cause the electronic device to execute the plan further comprise instructions to cause the electronic device to:
    generate multimodal output.

32. The non-transitory computer-readable storage medium of claim 24, wherein the instructions to cause the electronic device to execute the plan further comprise instructions to cause the electronic device to:
    initiate transmission of at least one message.

33. The non-transitory computer-readable storage medium of claim 24, further comprising instructions to cause the electronic device to:
    cause presentation of output to an entity other than the user.

34. The non-transitory computer-readable storage medium of claim 24, further comprising instructions to cause the electronic device to:
    notify the user after execution of the plan is complete.

35. The non-transitory computer-readable storage medium of claim 1, wherein the one or more programs comprise further instructions to cause the electronic device to:
    determine whether additional information is required for the virtual assistant to generate a plan for responding to the user request based on the selected plan template;
    in accordance with a determination that additional information is required,
        query the user based on at least one of the set of instructions from the plan template, and
        receive, from the user, at least one of the one or more inputs.

36. A method of using a virtual assistant, comprising:
at an electronic device configured to transmit and receive data,
    receiving an unstructured natural-language user request for a service from a virtual assistant;
    determining whether the user request corresponds to at least one of a plurality of plan templates accessible to the virtual assistant, based on the content of the user request and the content of the plan templates, wherein a plan template of the plurality of plan templates includes a set of sequential instructions and corresponding one or more inputs and outputs, and at least one of the one or more inputs is a contingent input that corresponds to a subsequent action;
    in accordance with a determination that the user request corresponds to at least one of the plurality of plan templates;
        selecting one of the plurality of plan templates;
        determining whether sufficient information is available to the virtual assistant for the virtual assistant to generate a plan based on the selected plan template;
        in accordance with a determination that sufficient information is available to the virtual assistant for the virtual assistant to generate the plan based on the selected plan template, generating the plan based on the selected plan template with the virtual assistant; and
        in accordance with a determination that insufficient information is available to the virtual assistant for the virtual assistant to generate the plan based on the selected plan template, wherein an execution of at least a portion of the plan is contingent upon receiving the contingent input at a time subsequent to generating the plan:
            obtain sufficient information to generate the plan based on the selected plan template; and
            in response to sufficient information being obtained, generating the plan based on the selected plan template with the virtual assistant; and
    in accordance with a determination the user request fails to correspond to at least one of the plurality of plan templates, foregoing selection of a plan template;
in response to selection of one of the plan templates, beginning to respond to the user request according to the selected plan template by causing execution of a first instruction of the set of sequential instructions; and
in response to receiving the contingent input, continue to respond to the user request by causing execution of a second instruction of the set of sequential instructions according to the subsequent action.

37. An electronic device, comprising:
one or more processors;
a memory; and
one or more programs, wherein the one or more programs are stored in the memory and configured to be executed by the one or more processors, the one or more programs including instructions for:
receiving an unstructured natural-language user request for a service from a virtual assistant;
determining whether the user request corresponds to at least one of a plurality of plan templates accessible to the virtual assistant, based on the content of the user request and the content of the plan templates, wherein a plan template of the plurality of plan templates includes a set of sequential instructions and corresponding one or more inputs and outputs, and at least one of the one or more inputs is a contingent input that corresponds to a subsequent action;
in accordance with a determination that the user request corresponds to at least one of the plurality of plan templates;
    selecting one of the plurality of plan templates;

determining whether sufficient information is available to the virtual assistant for the virtual assistant to generate a plan based on the selected plan template;

in accordance with a determination that sufficient information is available to the virtual assistant for the virtual assistant to generate the plan based on the selected plan template, generating the plan based on the selected plan template with the virtual assistant; and in accordance with a determination that insufficient information is available to the virtual assistant for the virtual assistant to generate the plan based on the selected plan template, wherein an execution of at least a portion of the plan is contingent upon receiving the contingent input at a time subsequent to generating the plan:
- obtain sufficient information to generate the plan based on the selected plan template; and
- in response to sufficient information being obtained, generating the plan based on the selected plan template with the virtual assistant; and in accordance with a determination the user request fails to correspond to at least one of the plurality of plan templates, foregoing selection of a plan template;

in response to selection of one of the plan templates, beginning to respond to the user request according to the selected plan template by causing execution of a first instruction of the set of sequential instructions; and in response to receiving the contingent input, continue to respond to the user request by causing execution of a second instruction of the set of sequential instructions according to the subsequent action.

* * * * *

UNITED STATES PATENT AND TRADEMARK OFFICE
CERTIFICATE OF CORRECTION

PATENT NO. : 10,956,666 B2
APPLICATION NO. : 15/164630
DATED : March 23, 2021
INVENTOR(S) : Marcos Regis Vescovi et al.

It is certified that error appears in the above-identified patent and that said Letters Patent is hereby corrected as shown below:

In the Claims

In Column 77, Line 9, Claim 4, delete "initiation;" and insert -- initiation, --, therefor.

In Column 77, Line 43, Claim 9, delete "trigger;" and insert -- trigger, --, therefor.

In Column 78, Line 39, Claim 24, delete "he" and insert -- be --, therefor.

Signed and Sealed this
Nineteenth Day of July, 2022

Katherine Kelly Vidal
*Director of the United States Patent and Trademark Office*